United States Patent
Mohan et al.

(10) Patent No.: US 8,064,594 B2
(45) Date of Patent: Nov. 22, 2011

(54) INTEGRATED CELLULAR/PCS-POTS COMMUNICATION SYSTEM

(75) Inventors: Chandra Mohan, Carmel, IN (US); Jayanta Majumdar, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 568 days.

(21) Appl. No.: 10/579,422

(22) PCT Filed: May 12, 2004

(86) PCT No.: PCT/US2004/014854
§ 371 (c)(1),
(2), (4) Date: May 11, 2006

(87) PCT Pub. No.: WO2005/057956
PCT Pub. Date: Jun. 23, 2005

(65) Prior Publication Data
US 2007/0105548 A1     May 10, 2007

Related U.S. Application Data

(60) Provisional application No. 60/519,595, filed on Nov. 13, 2003.

(51) Int. Cl.
*H04M 1/00* (2006.01)
(52) U.S. Cl. .................................. 379/413.03
(58) Field of Classification Search ............. 379/413.03; 455/445
See application file for complete search history.

(56) References Cited

U.S. PATENT DOCUMENTS

| | | | |
|---|---|---|---|
| 5,812,637 A | 9/1998 | Schornack et al. | |
| 6,112,091 A | 8/2000 | Van Puuenbroek et al. | |
| 2006/0019666 A1* | 1/2006 | Tell et al. ................ | 455/445 |

FOREIGN PATENT DOCUMENTS

| | | |
|---|---|---|
| JP | 7307795 | 11/1995 |
| JP | H10023521 | 1/1998 |
| JP | 11504776 | 4/1999 |
| JP | 2000-115401 | 4/2000 |
| JP | 2000134286 | 5/2000 |
| JP | 2000134356 | 5/2000 |
| JP | 2000253130 | 9/2000 |
| JP | 2000-504192 | 10/2002 |
| JP | 2002-314680 | 10/2002 |
| JP | 2003061146 | 2/2003 |
| JP | 2003256649 | 9/2003 |
| JP | 2004151863 | 5/2004 |
| WO | WO9741650 | 11/1997 |

OTHER PUBLICATIONS

International Search Report dated Oct. 18, 2004.

* cited by examiner

*Primary Examiner* — Alexander Jamal
(74) *Attorney, Agent, or Firm* — Robert D. Shedd; Robert B. Levy; Jeffrey D. Hale

(57) ABSTRACT

There is provided a system for integrating at least one residential Plain Old Telephone System (POTS) phone to a cellular phone network. A Subscriber Line Interface Circuit (SLIC 120) interfaces audio from the cellular phone network to the at least one residential POTS phone. A line switcher (122), connected to the SLIC, connects the at least one residential POTS phone to any one of a POTS line or a cellular line. An audio gateway (116), connected to the SLIC, wirelessly receives the audio from a cellular phone connected to the cellular phone network for subsequent transmission to the at least one residential phone and wirelessly transmits the audio from the POTS line to the cellular phone.

18 Claims, 29 Drawing Sheets

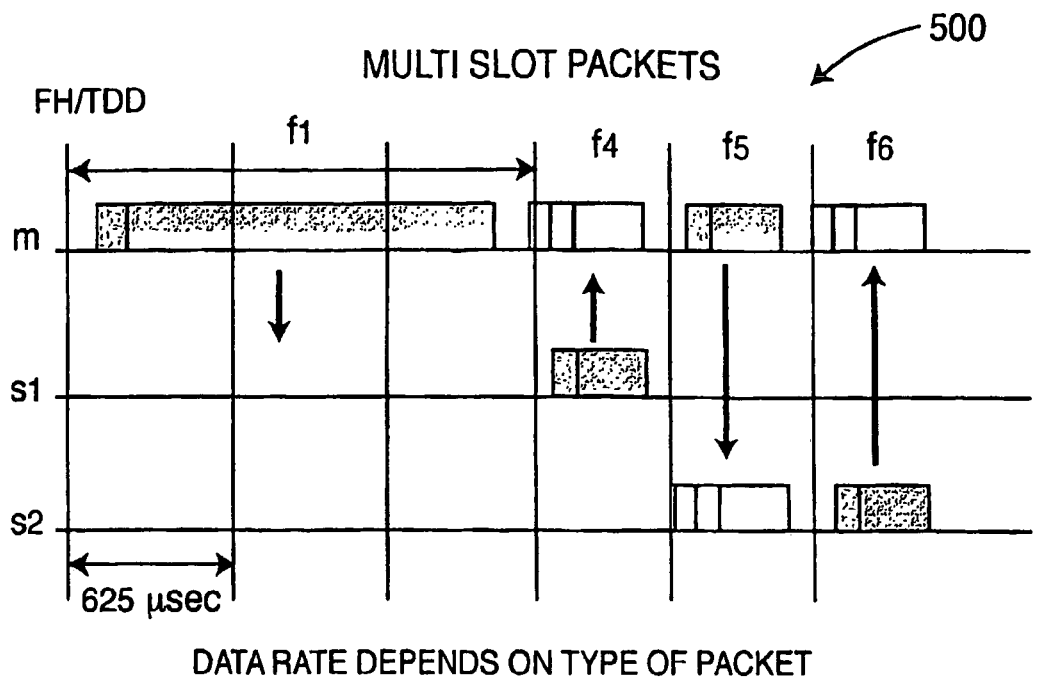
DATA RATE DEPENDS ON TYPE OF PACKET
FIG. 5
- SYNCHRONOUS CONNECTION ORIENTED (SCO) LINK
  ▷ SLOT RESERVATION AT FIXED INTERVALS
- ASYNCHRONOUS CONNECTION-LESS (ACL) LINK
  – POLLING ACCESS METHOD
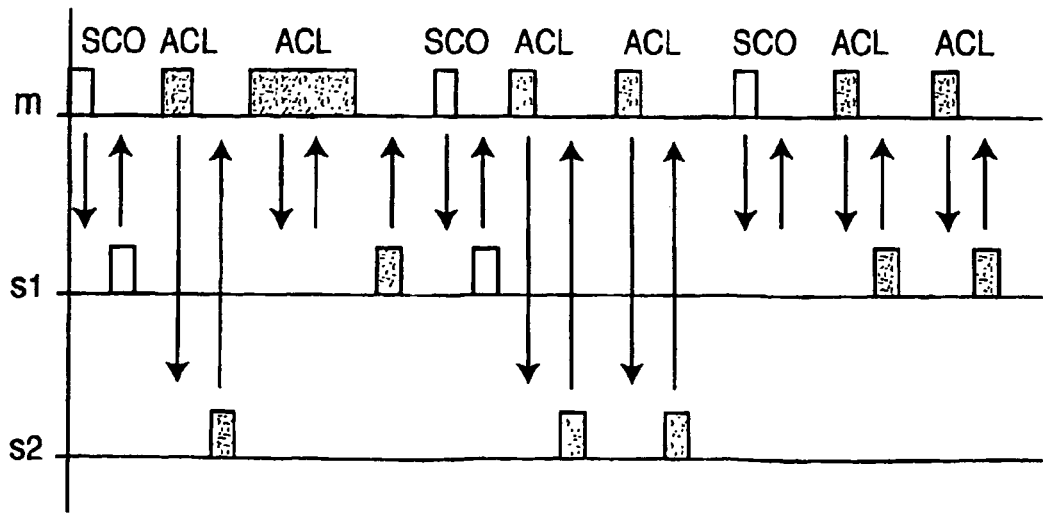
FIG. 6

| | FEATURE | SUPPORT IN AG |
|---|---|---|
| 1. | CONNECTION MANAGEMENT | M |
| 2. | PHONE STATUS INFORMATION | M |
| 3. | AUDIO CONNECTION HANDLING | M |
| 4. | ACCEPT AN INCOMING VOICE CALL | M |
| 5. | REJECT AN INCOMING VOICE CALL | O |
| 6. | TERMINATE A CALL | M |
| 7. | AUDIO CONNECTION TRANSFER DURING AN ONGOING CALL | M |
| 8. | PLACE A CALL WITH A PHONE NUMBER SUPPLIED BY THE HF | M |
| 9. | PLACE A CALL USING MEMORY DIALING | M |
| 10. | PLACE A CALL TO THE LAST NUMBER DIALED | M |
| 11. | CALL WAITING NOTIFICATION | M |
| 12. | THREE WAY CALLING | O(note 3) |
| 12. | CALLING LINE IDENTIFICATION (CLI) | M |
| 14. | ECHO CANCELING (EC) AND NOISE REDUCTION (NR) | O |
| 15. | VOICE RECOGNITION ACTIVATION | O |
| 16. | ATTACH A PHONE NUMBER TO A VOICE TAG | O |
| 17. | ABILITY TO TRANSMIT DTMF CODES | M |
| 18. | REMOTE AUDIO VOLUME CONTROL | O |

| | FEATURE | SUPPORT IN HF |
|---|---|---|
| 1. | CONNECTION MANAGEMENT | M |
| 2. | PHONE STATUS INFORMATION | M(note 1) |
| 3. | AUDIO CONNECTION HANDLING | M |
| 4. | ACCEPT AN INCOMING VOICE CALL | M |
| 5. | REJECT AN INCOMING VOICE CALL | M |
| 6. | TERMINATE A CALL | M |
| 7. | AUDIO CONNECTION TRANSFER DURING AN ONGOING CALL | M |
| 8. | PLACE A CALL WITH A PHONE NUMBER SUPPLIED BY THE HF | O |
| 9. | PLACE A CALL USING MEMORY DIALING | O |
| 10. | PLACE A CALL TO THE LAST NUMBER DIALED | O |
| 11. | CALL WAITING NOTIFICATION | O |
| 12. | THREE WAY CALLING | O(note 2) |
| 12. | CALLING LINE IDENTIFICATION (CLI) | O |
| 14. | ECHO CANCELING (EC) AND NOISE REDUCTION (NR) | O |
| 15. | VOICE RECOGNITION ACTIVATION | O |
| 16. | ATTACH A PHONE NUMBER TO A VOICE TAG | O |
| 17. | ABILITY TO TRANSMIT DTMF CODES | O |
| 18. | REMOTE AUDIO VOLUME CONTROL | O |

FIG. 34

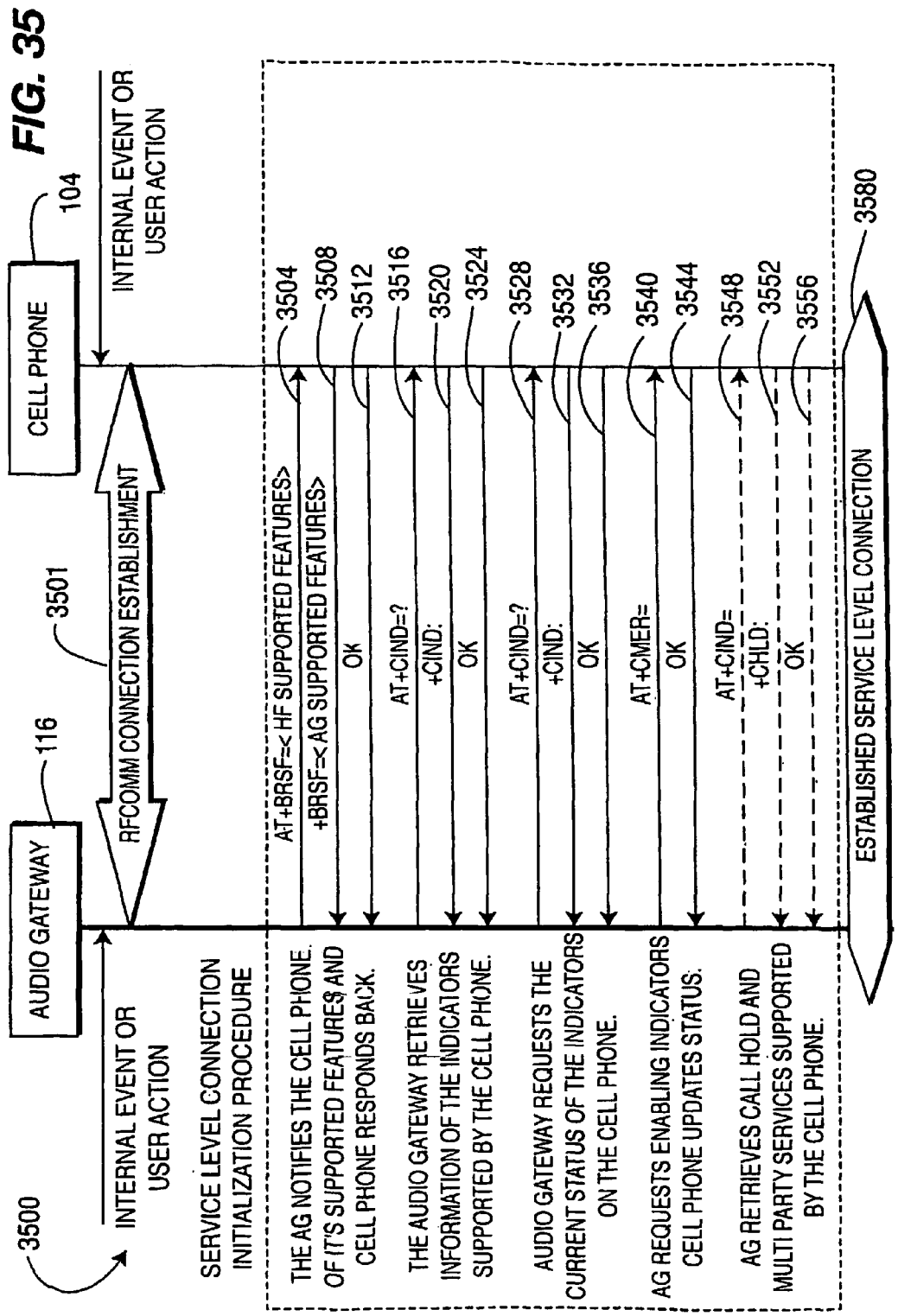

INTEGRATED CELLULAR/PCS-POTS COMMUNICATION SYSTEM

This application claims the benefit, under 35 U.S.C. §365 of International Application PCT/US04/14854, filed May 12, 2004 which was published in accordance with PCT Article 21(2) on Jun. 23, 2005 in English and which claims the benefit of U.S. provisional patent application No. 60/519,595 filed Nov. 13, 1003.

FIELD OF THE INVENTION

The present invention generally relates to wired and wireless communications and, more particularly, to an integrated cellular/Personal Communications System-Plain Old Telephone Service (PCS-POTS) communication system.

BACKGROUND OF THE INVENTION

Currently, there is no consistent way to bridge the cellular/Personal Communications System (PCS) system with the Plain Old Telephone Service (POTS) landline in a residential scenario. Due to this inadequacy the residential user has to put up with at least three inconveniences: (1) a cell/PCS call cannot be received at home on other land line phones, which means that you have to either go to the cell phone to pick up the call or move around the home with a cell/PCS phone on your body (which means that you cannot charge the cell phone); (2) most of the cellular carriers offer unlimited weekend minutes and a hefty amount of "any time" call minutes that is not available for use by everyone at home, unless the particular cell phone is used in every instance to make the call; and (3) homes that have both POTS as well as cell/PCS phones have to pay for two bills, (a) one to the cellular carrier and (b) another for the POTS usage.

Accordingly, it would be desirable and highly advantageous to have an integrated cellular/PCS-POTS communication system that overcomes at least the above-identified deficiencies.

SUMMARY OF THE INVENTION

The problems stated above, as well as other related problems of the prior art, are solved by the present invention, which is directed to an integrated cellular/Personal Communications System-Plain Old Telephone Service (PCS-POTS) communication system.

According to an aspect of the present invention, there is provided a system for integrating at least one residential Plain Old Telephone System (POTS) phone to a cellular phone network. A Subscriber Line Interface Circuit (SLIC) interfaces audio from the cellular phone network to the at least one residential POTS phone. A line switcher, connected to the SLIC, connects the at least one residential POTS phone to any one of a POTS line or a cellular line. An audio gateway, connected to the SLIC, wirelessly receives the audio from a cellular phone connected to the cellular phone network for subsequent transmission to the at least one residential phone and wirelessly transmits the audio from the POTS line to the cellular phone.

These and other aspects, features and advantages of the present invention will become apparent from the following detailed description of preferred embodiments, which is to be read in connection with the accompanying drawings.

BRIEF DESCRIPTION OF THE DRAWINGS

FIG. 5 is a diagram illustrating multi-slot packets 500, according to an illustrative embodiment of the present invention;

FIG. 6 is a diagram illustrating physical link types 600, according to an illustrative embodiment of the present invention;

FIG. 34 is a diagram illustrating features 3400 supported in the Audio Gateway 116 and features 3450 supported in the Hands-Free unit (HF), according to an illustrative embodiment of the present invention;

FIG. 35 is a diagram illustrating service level connection initialization 3500, according to an illustrative embodiment of the present invention;

DETAILED DESCRIPTION OF THE INVENTION

Figure 1:
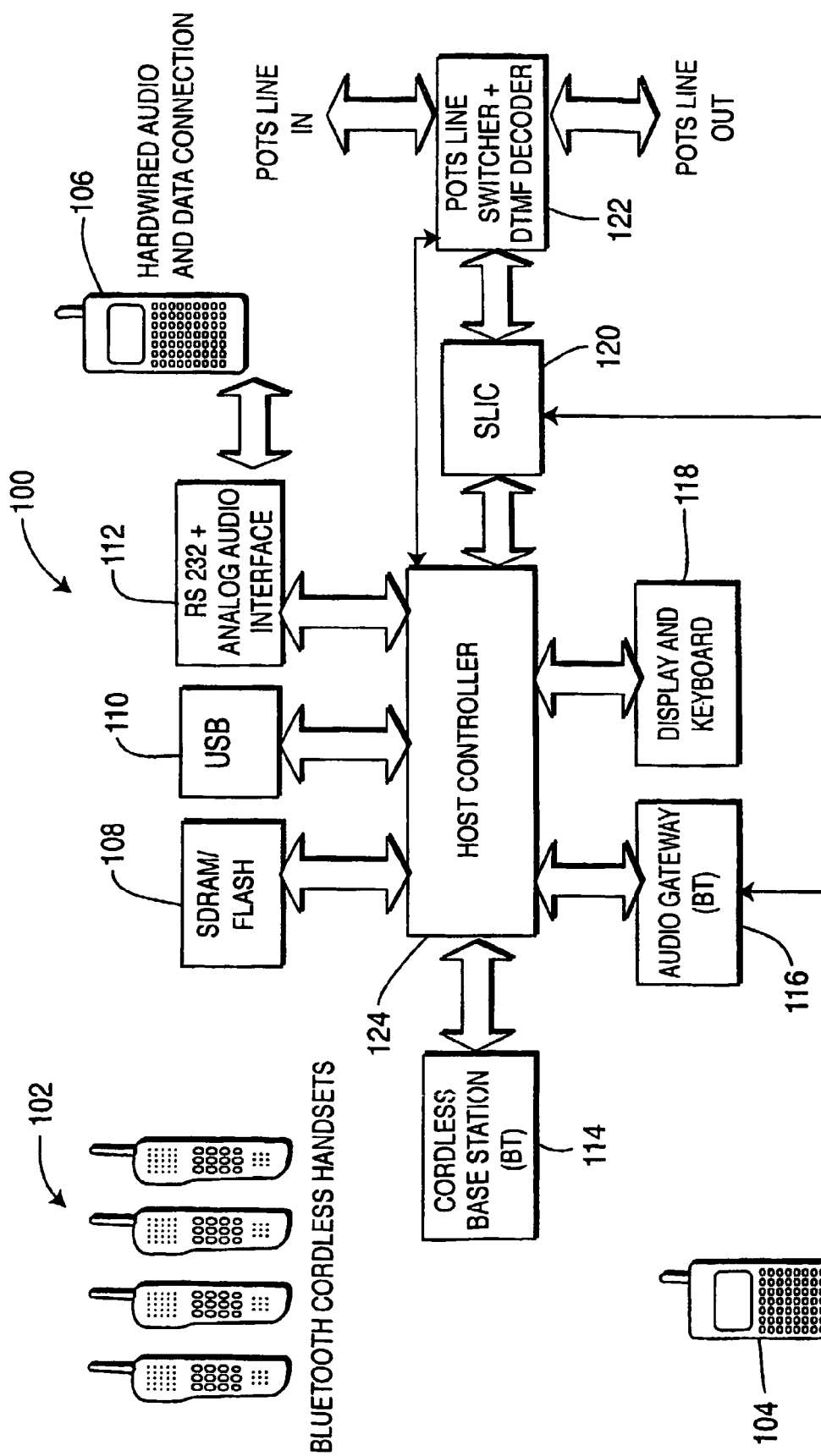
FIG. 1 is a diagram illustrating an integrated communication system 100 employing a BLUETOOTH (BT) enabled Audio Gateway, according to an illustrative embodiment of the present invention.

The present invention is directed to an integrated cellular/Personal Communications System-Plain Old Telephone Service (PCS-POTS) communication system.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Advantageously, the present invention provides the capability to integrate the existing residential corded and cordless products to the cellular infrastructure (Telephone Access Point), irrespective of the cellular standards (including, but not limited to, Global System for Mobile Communications (GSM), General Packet Radio Service (GPRS), Enhanced Data for GSM Evolution (EDGE), Universal Mobile Telecommunications System (UMTS), International Mobile Telephony 2000 (IMT2000), Code Division Multiple Access (CDMA), Narrowband Advanced Mobile Phone Service (NAMPS), Wideband Code Division Multiple Access (WCDMA), Time Division Code Division Multiple Access (TDCDMA), Advanced Mobile Phone System (AMPS)).

Moreover, the present invention advantageously provides connectivity for a residential network of POTS line phones with cell/PCS phones through the use of wired/wireless connections, either through a Data terminal on the cellular/PCS handset or through embedded Wireless data connectivity solutions including, but not limited to, 802.11/802.15/Infrared Data Association (IrDA)/BLUETOOTH/Ultra-Wide Bandwidth (UWB) on the cell/PCS phones. The present invention may provide such connectivity using wired and/or wireless solutions.

The present may provide such connectivity using wired solutions that employ any of all known standards including, but not limited to, Universal Serial Bus (USB)/802.11 over wire/Recommended Standard-232 (RS-232)/RS-485/Home Phoneline Networking Alliance (PNA)/Proprietary protocols, etc., with the capability for Analog, g.711 (a/mu law Pulse-Code Modulation (PCM))/Adaptive Delta/Differential Pulse Code Modulation (ADPCM) or Voice over Internet Protocol (VoIP) types of voice delivery.

The present may provide such connectivity using wireless solutions including, but not limited to, BLUETOOTH/802.11/UWB/802.15/Nearfield communication/IrDA (optical). Communication and control may be implemented by an embedded Wireless Data Communication system on the cell/PCS phone or through the connection of external Wireless dongles to the cell/PCS handset data port that are compliant with either proprietary or established using, e.g., the above mentioned standards, with capability for Analog, g.711 (a/mu law PCM)/ADPCM or VoIP types of voice delivery.

Both Wired and Wireless solutions may be employed using, e.g., AT commands (Data Circuit-terminating Equipment—Data Circuit-terminating Equipment (DCE-DCE)) mode or (Data Terminal Equipment—Data Circuit-terminating Equipment (DTE-DCE) mode) to access the cell/PCS data port.

Further, the present invention advantageously provides a Subscriber Line interface circuit to interface the audio and data from the cell/PCS phone to the residential phones, either attached directly to the TAP (Telephone Access Point) or at various locations in the home through wired/wireless means, devices, and so forth. The type of signals on the POTS line can vary between traditional analog audio to g.711 (a/mu law PCM)/ADPCM or VoIP type.

Also, the present invention advantageously provides the capability for existing home Corded/Cordless phones to make/receive calls, receive Caller ID information of a cell/PCS call, have three party conversation, call Hold, Call duration indication and many other features offered by cell/PCS handset through the TAP.

Additionally, the present invention advantageously provides the capability to distribute data from the cell/PCS network, in the form of Instant Message (IM), MM, and email to any of the residential phones/terminals.

Moreover, the present invention advantageously allows download of new drivers (for new cell/PCS models) and system software updates into the Telephone Access Point (TAP), either directly from the Internet through a dial-up modem or through an USB/RS-232 port on the Telephone Access Point connected to a Personal Computer (PC) or a data storage device.

Further, the present invention advantageously facilitates the synchronization and exchange of address books, ring tones and other items between the cell/PCS handset and Personal Digital Assistants (PDAs) through the Telephone Access Point, without the need of a PC.

FIG. 1 is a diagram illustrating an integrated communication system 100 employing a BLUETOOTH (BT) enabled Audio Gateway, according to an illustrative embodiment of the present invention. BLUETOOTH is employed as the wire replacement technology to connect the cell/PCS phone.

The integrated communication system 100 includes BLUETOOTH cordless handsets 102, a Base Station {BLUETOOTH} enabled cell phone 104, a hardwired audio and data connection phone 106, a Synchronous Dynamic Random Access Memory (SDRAM)/flash memory 108, a USB interface 110, an RS_232+ analog audio interface 112, a cordless Base Station {BLUETOOTH} 114, an Audio Gateway {BLUETOOTH} 116, a display and keyboard 118, a Subscriber Line Interface Circuit (SLIC) 120, a POTS line switcher and Dual Tone Multi-Frequency (DTMF) decoder (collectively or individually represented by reference numeral 122), and a host controller (also referred to herein as "Host Control Processor" (HCP)) 124.

Figure 2:
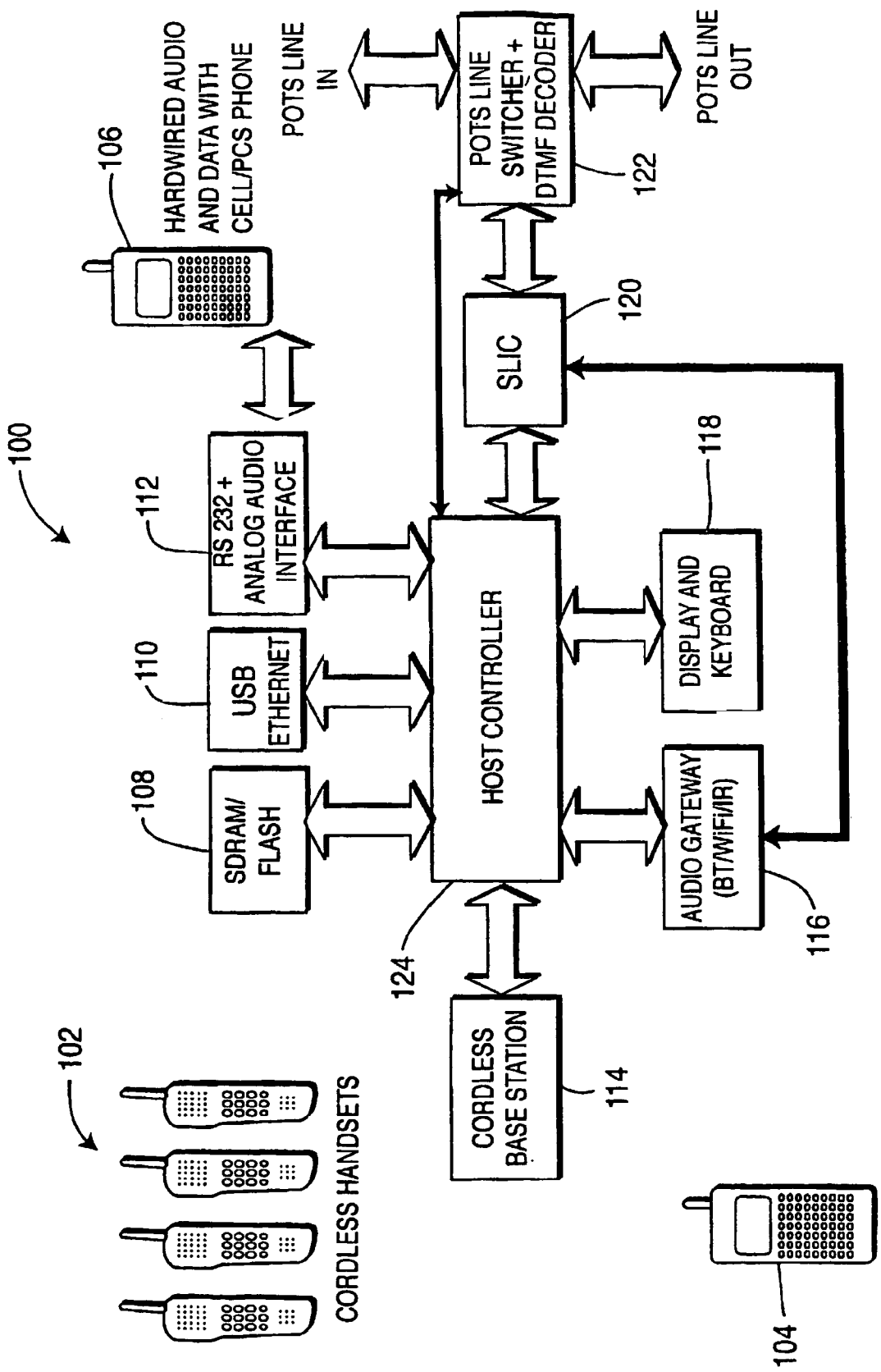
FIG. 2 is a diagram illustrating a more generic implementation of another integrated communication system 200, according to an illustrative embodiment of the present invention.

FIG. 2 is a diagram illustrating a more generic implementation of another integrated communication system 200, according to an illustrative embodiment of the present invention.

The integrated communication system 200 includes cordless handsets 202, a Wireless Fidelity (WiFi)/BLUETOOTH/Infrared (IR) enabled cell phone 204, a hardwired audio and data with cell/PCS phone 206, an SDRAM/flash memory 108, a USB/Ethernet interface 110, an RS_232+ analog audio interface 212, a cordless Base Station {BLUETOOTH} 214, an Audio Gateway {BLUETOOTH/WiFi/IR} 216, a display and keyboard 218, a Subscriber Line Interface Circuit (SLIC) 220, a POTS line switcher and DTMF decoder 222, and a host controller 224.

BLUETOOTH has become the de-facto global standard for short-range wireless data communications that allows devices to communicate with each other using secure radio waves, and is the basis for the Institute of Electrical & Electronics (IEEE) 802.15.1 standard. BLUETOOTH was originally conceived as a basic cable replacement technology, although it is inevitable that new applications and usage patterns will evolve as the technology becomes more pervasive.

BLUETOOTH operates in the 2.4 GHz Industrial, Scientific, and Medical (ISM) band, which is unlicensed and available for use everywhere. Since this frequency band is already crowded, BLUETOOTH has been designed to be robust enough to operate in noisy environments.

BLUETOOTH is designed for use in mobile devices, where size, cost, and battery life are key factors. It nominally operates with a 10-meter range, although higher-powered versions are available yielding a range up to 100 meters. Since it is a radio link, BLUETOOTH is not limited to line-of-sight and can pass through walls. It uses frequency hopping to change its frequency 1600 times a second in a pseudo-random pattern, making it hard to eavesdrop, and employs 128-bit encryption at the link layer for added security.

One of the most important characteristics of the BLUETOOTH specification is that it should allow devices from lots of different manufacturers to work with one another. For that reason, BLUETOOTH doesn't only define a radio system, but also a software stack that enables applications to find other BLUETOOTH devices in the area, discover what services they can offer, and use the services. BLUETOOTH allows up to eight devices to connect together in a group called a piconet. Different piconets can be linked into scatternets, but the data rate between scatternets will be lower than the rate within a single piconet.

BLUETOOTH devices operate at 2.4 GHz, in the globally available, license-free, ISM band. That is the bandwidth reserved for general use by Industrial, Scientific and Medical applications worldwide. Since this radio band is free to be used by any radio transmitter as long as it satisfies the regulations, the intensity and the nature of interference cannot be predicted. Therefore, interference immunity is very important issue for BLUETOOTH. Generally, interference immunity can be obtained by interference suppression or avoidance. Suppression can be obtained by coding or direct-sequence spreading, but the dynamic range of interfering signals in ad hoc networks can be huge, so practically attained coding and processing gains are usually inadequate. Avoidance in frequency is more practical. Since 2.4 GHz ISM band provides about 83 MHz of bandwidth and all radio systems are band limited, there is a high probability that a part of the spectrum can be found without a strong interference.

Considering all this, a Frequency Hopping—Code Division Multiple Access (FH-CDMA) technique has been chosen to implement the multiple access scheme for BLUETOOTH. The FH-CDMA technique combines a number of properties, which make it the best choice for an ad hoc radio system. The FH-CDMA technique fulfills the spreading requirements set in the ISM band, i.e., on average the signal can be spread over a large frequency range, but instantaneously only a small part of the bandwidth is occupied, avoiding most of potential interference. Additionally, BLUETOOTH does not require rigorous time synchronization schemes (as in Time Division Multiple Access (TDMA)) or the coordinated Transmit power control schemes (as in Direct Sequence Code Division Multiple Access (DS-CDMA)), for normal operation. In the 2.45 GHz ISM band, a set of 79 hop carriers has been defined, at 1 MHz spacing. A nominal hop dwell time of 625 us is used in the system and every dwell time happens at a different frequency. If multiple slots are used to transmit data, then the frequency remains unchanged during the multi slot data transmission period. Full-duplex communication is achieved by applying Time-Division Duplex (TDD) techniques, and since transmission and reception take place at different time slots, they also take place at different hop carriers. A large number of optimal pseudo-random hopping sequences have been identified and the BLUETOOTH unit that is commonly connected to the various BLUETOOTH peripheral devices determines the choice of a specific pseudo-random hop sequence used in a piconet. The unit to which the peripheral BLUETOOTH units commonly connect is usually called the master and it also defines timing parameters during the communication session. All other devices involved in the session, the slaves, have to adjust their spreading sequences and clocks to the master.

BLUETOOTH uses Gaussian-shaped Frequency Shift Keying (GFSK) modulation with a nominal modulation index of k=0.3. This binary modulation was chosen for its robustness and, with the accepted bandwidth restrictions, can provide raw data rates up to 1 Mbps. Non-coherent demodulation can be accomplished with a limiting Frequency Modulation (FM) discriminator. This simple modulation scheme allows the implementation of low-cost radio units, which is one of the main aims of the BLUETOOTH system.

A Frequency Hopping (FH) BLUETOOTH channel is associated with the piconet. As mentioned earlier, the master unit defines the piconet channel by providing the hop sequence and the hop phase. All other units participating in the piconet are slaves. However, since the BLUETOOTH is based on peer-peer communications, the master/slave role is only attributed to a unit for the duration of the communication session in a piconet. When the communication session is completed, the master and slaves roles are canceled too. In addition to defining the piconet, the master also controls the traffic on the piconet and takes care of access control. The time slots are alternatively used for master and slaves transmission. In order to prevent collisions on the channel due to multiple slave transmissions, the master applies a polling technique, for each slave-to-master transmission slot and decides which slave is allowed to transmit in which slot. If the master has no information to send, it still has to poll the slave explicitly with a short poll packet. This master control effectively prevents collisions between the participants in the piconet, but independent collocated piconets may interfere with one another when they occasionally use the same hop carrier. This can happen because units don't check for a clear carrier (no listen-before-talk). If the collision occurs, data are retransmitted at the next transmission opportunity. Due to the short dwell time, collision avoidance schemes are less appropriate for FH system.

The topology used in BLUETOOTH technology is referred to as Scattered net. It is basically made up of an architecture of cells called a piconet. A piconet is a set of BLUETOOTH devices sharing a common channel. Four modes of operations are identified to be: Master, Slave, Standby, and Parked or hold. The Master mode of operation can handle up to 7 simultaneous links and 200 active slaves. The slave mode of operation can participate in one or more piconets. The Standby mode of operation is the default state in BLUETOOTH devices. Standby and Parked modes are low power states.

Figure 3:
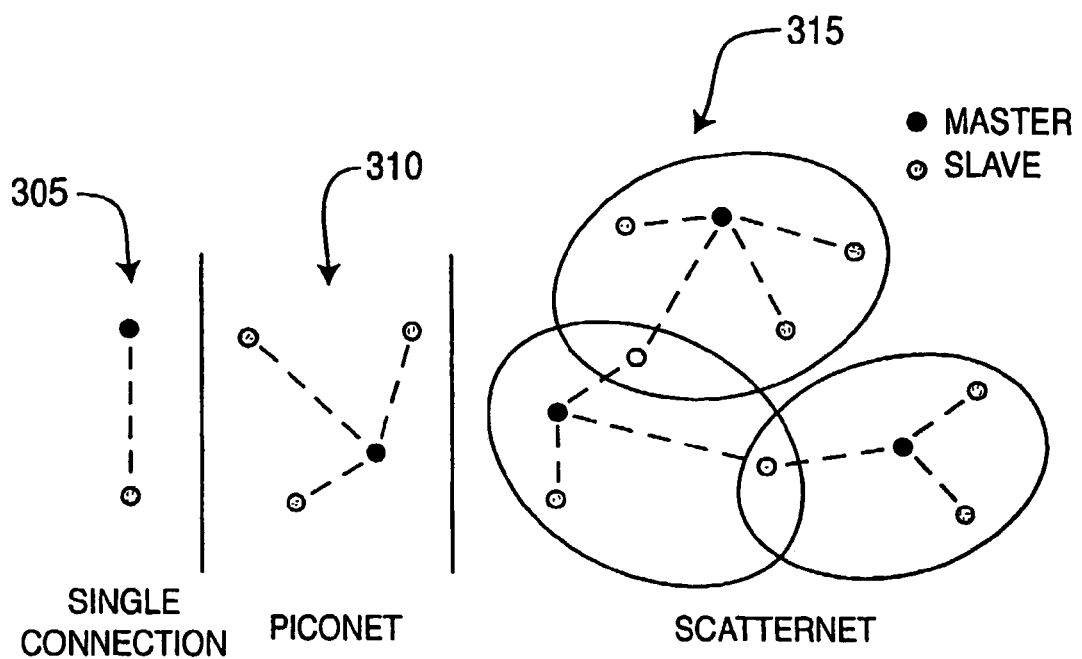
FIG. 3 is a diagram illustrating a single connection 305, a piconet 310, and a scatternet 315 to which the present invention may be applied, according to an illustrative embodiment of the present invention.

Basically a piconet is a star-shaped connection where the center one is the master and the other devices are slaves. FIG. 3 is a diagram illustrating a single connection 305, a piconet 310, and a scatternet 315 to which the present invention may be applied, according to an illustrative embodiment of the present invention.

Thus, in a piconet, a master device can serve up to seven slave devices. If more than seven devices have to be connected then the slave devices have to be turned to low-power park mode. After turning them to park mode, other devices (that have to be connected) have to be invited to become active. The master also controls the flow of data transmission.

A Scatternet is a group of piconets that are interconnected with each other. These piconets are connected to each other by bridge nodes. The function of the bridge node is to stay in each piconet for sometime and, thus, can cycle through all the attached piconets. In this way, it is able to receive and transmit data from each piconet to other piconets.

Figure 4:
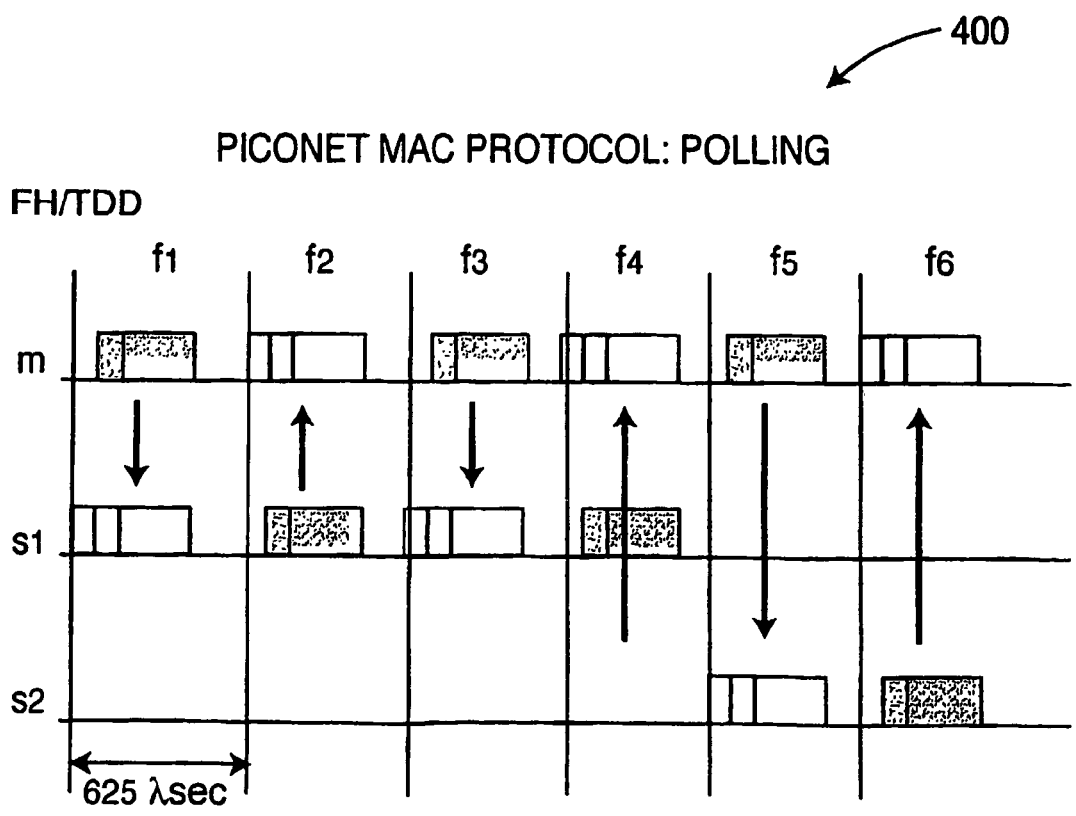
FIG. 4 is a diagram illustrating a BLUETOOTH frame structure 400 to which the present invention may be applied, according to an illustrative embodiment of the present invention.

The Physical channel is created by 79 hop channels defined by the pseudo-random hopping sequence. The Physical channel is divided into time slots where each slot corresponds to an RF hop frequency. The nominal hop frequency is 1600 hops/s. FIG. 4 is a diagram illustrating a BLUETOOTH frame structure 400 to which the present invention may be applied, according to an illustrative embodiment of the present invention.

Thus, each time slot is 625 microseconds in length. In the TDD scheme shown in the FIG. 3, the Slave and Master can transmit simultaneously as the transmissions happen at different frequencies. RF Hop frequency should remain fixed for the duration of the packet.

Two types of physical links can be established between master and slaves, a Synchronous Connection-Oriented (SCO) link and an Asynchronous Connection-Less (ACL) link.

The SCO link is the point-to-point link between the master and slave in the piconet. This helps in reserving a time slot in both directions at regular intervals. Thus, this link is able to transmit voice, which is a time-bounded information. The master device can support up to three SCO links to the same or different slaves. SCO packets are sent by the master device at regular intervals. The addressed slave device responds with an SCO packet. The SCO link is established by the master by sending an SCO setup message that includes the required timing parameters.

The ACL link provides packet switched connection between the master and all active slaves participating in the piconet. This takes care of the data payload protection by Cyclic Redundancy Check (CRC). This also makes good use of piconet channels. The slave is not allowed to transmit ACL packets only if it had been addressed in the previous master-to-slave slot, otherwise the slave is not allowed to transmit.

FIG. 5 is a diagram illustrating multi-slot packets 500, according to an illustrative embodiment of the present invention. FIG. 6 is a diagram illustrating physical link types 600, according to an illustrative embodiment of the present invention.

A description will now be given of various SCO and ACL connection scenarios, according to an illustrative embodiment of the present invention.

If a BLUETOOTH device has an ACL, but no SCO, the device can request any type of HVx packet type. But once it has requested the SCO, all future SCO connections, if possible based on resources, must be of the same type.

Figure 7:
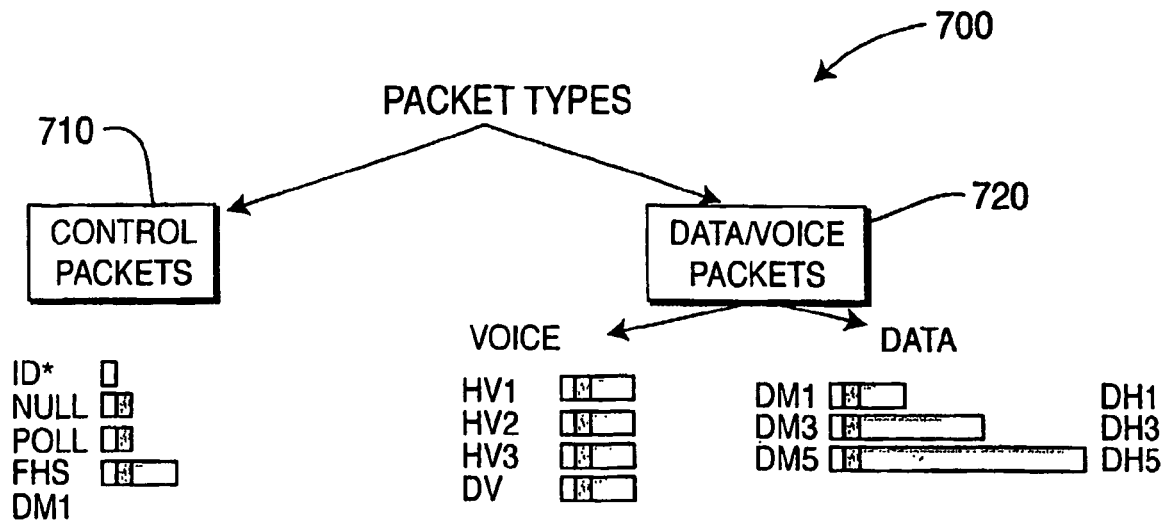
FIG. 7 is a diagram various packet types, according to an illustrative embodiment of the present invention.

FIG. 7 is a diagram various packet types 700, according to an illustrative embodiment of the present invention. The various packet types 700 include control packets 710 and data/voice packets 720.

According to a first illustrative connection scenario, the BLUETOOTH device wants to establish an SCO using HV1. If so, then no more SCO links can be established because all slots are used for this one and only SCO/HV1 link.

According to a second illustrative connection scenario the BLUETOOTH device wants to establish an SCO using HV2. If so, then only one more SCO link can be established and it can only be another SC0 using HV2 due to slot allocations.

According to a third connection scenario, the BLUETOOTH device wants to establish an SCO using HV3. If so, then if one or two more SCO links are to be established, then they must be SCO links using HV3.

If one SCO connection is already made then: (a) if the original SCO link used HV1, then unless the first SCO link is modified to use either HV2 or HV3, the additional SCO link is refused due to resource constraints; (b) if the original SCO link used HV2, then this additional SCO link must use HV2 OR if the original link is modified to use HV3, then the additional SOC link could be set up using HV3 also; and (c) if the original SCO link used HV3, then this additional SCO link must use HV3; (d) if the original two SCO links use HV2, then the additional SCO request would be refused, unless the two previous SCO links are modified to use HV3 first, then the third SCO link could be established using HV3; and (e) if the original two SCO links use HV3, then the additional SCO request must use HV3.

Figure 8:
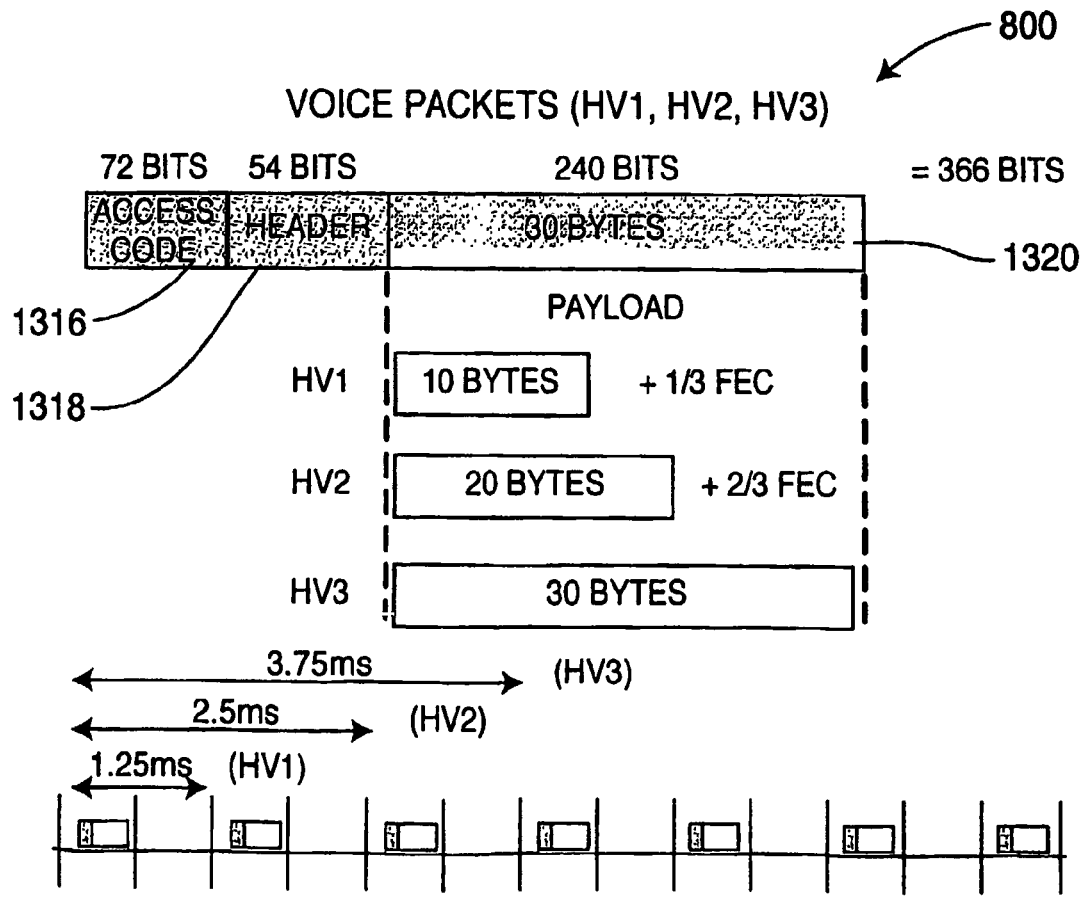
FIG. 8 is a diagram illustrating voice packets, according to an illustrative embodiment of the present invention.

FIG. 8 is a diagram illustrating voice packets 800, according to an illustrative embodiment of the present invention. Such voice packets 800 may include, for example, HV1, HV2, and HV3 voice packets. Moreover, such voice packets 800 may include an access code field 1316, a header field 1318, and a payload field 1320.

HV1 packets transmit every 1.25 usecs, with a payload of 80 (10×8) bits. The throughput rate in this mode is computed as follows:

Bits/slot×Slots/sec=80×(1600/2)=64 Kbps.

HV2 packets transmit every 2.5 usecs, with a payload of 160 (20×8) bits. The throughput rate in this mode is computed as follows:

Bits/slot×Slots/sec=160×(1600/4)=64 Kbps.

HV3 packets transmit every 3.75 usecs, with a payload of 240 (30×8) bits. The throughput rate in this mode is computed as follows:

Bits/slot×Slots/sec=240×(1600/6)=64 Kbps.

A description will now be given for the case when a slave has two different masters. In this case the SCO links from the slave to each of the masters must be an SCO using HV3. If not, there is no way for the slave to hop back and forth between the two piconets. Note that some of the cases above describing a modification of the link cannot occur without disrupting the SCO link's data.

Figure 9:
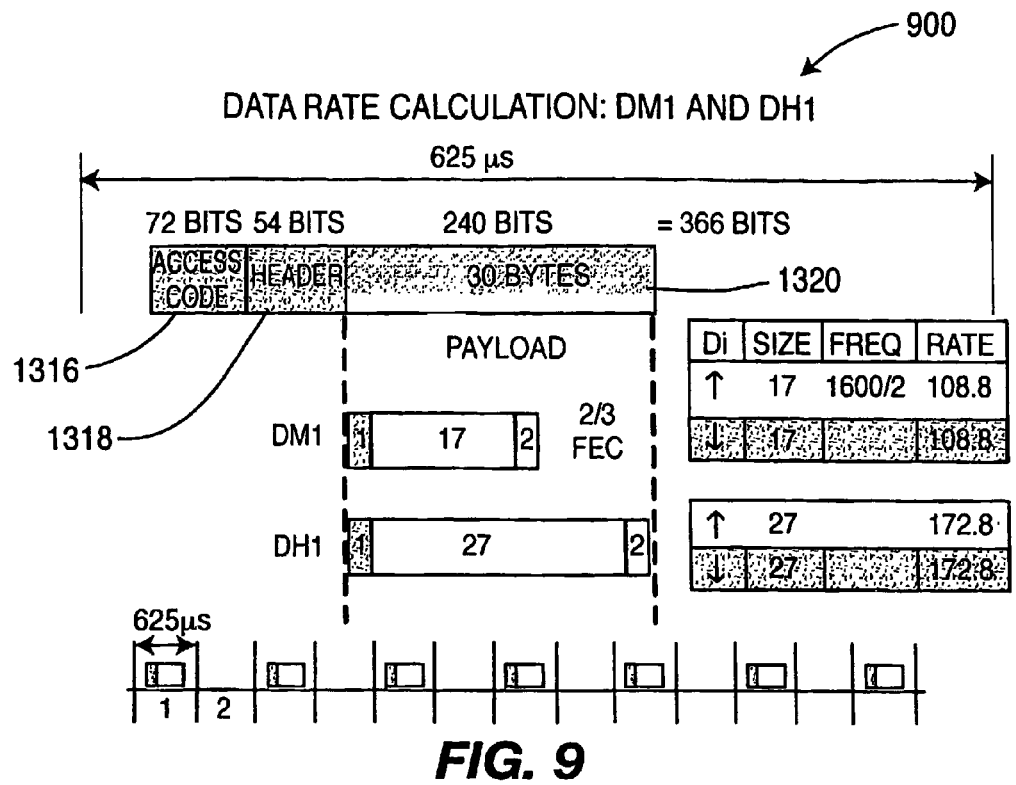
FIG. 9 is a diagram illustrating data rate calculation 900 for DM1 and DH1 packets, according to an illustrative embodiment of the present invention.

FIG. 9 is a diagram illustrating data rate calculation 900 for DM1 and DH1 packets, according to an illustrative embodiment of the present invention. DM1 packets transmit every 1.25 usecs, with a payload of (17×8) 136 bits. The throughput rate in this mode is computed as follows:

Bits/slot×Slots/sec=136×(1600/2)=108.8 Kbps.

DH1 packets transmit every 1.25 usecs, with a payload of (27×8) 216 bits. The throughput rate in this mode is computed as follows:

Bits/slot×Slots/sec=216×(1600/2)=172.8 Kbps.

Figure 10:
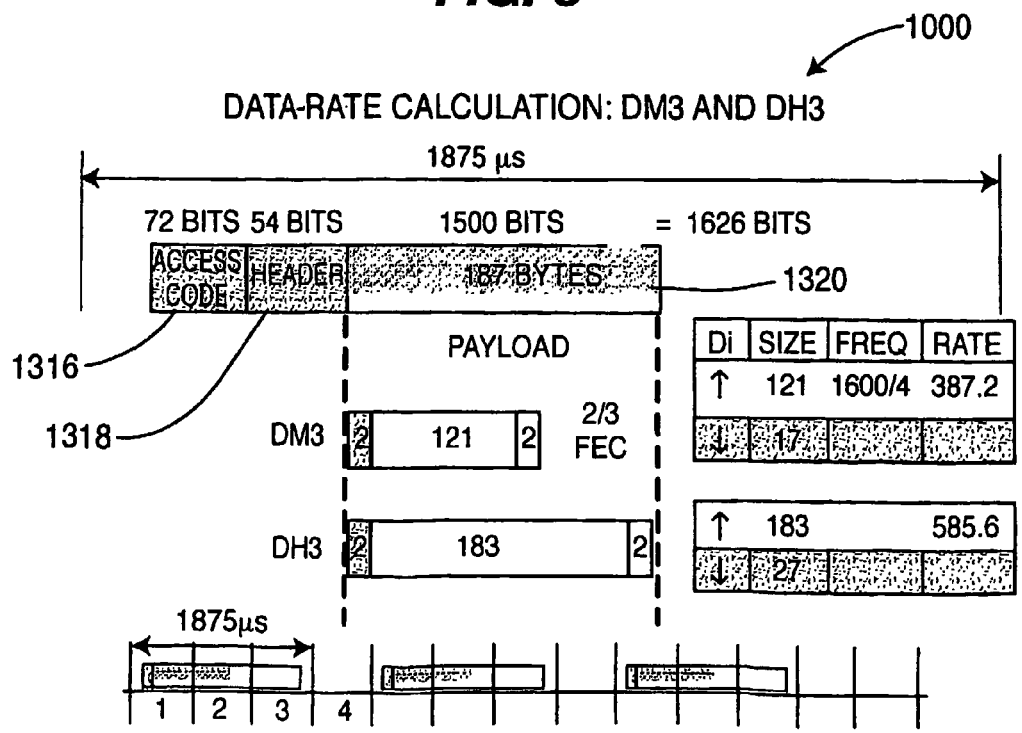
FIG. 10 is a diagram illustrating data rate calculation 1000 for DM3 and DH3 packets, according to an illustrative embodiment of the present invention.

FIG. 10 is a diagram illustrating data rate calculation 1000 for DM3 and DH3 packets, according to an illustrative embodiment of the present invention. DH3 packets transmit every 1.875 usecs, with a payload of (183×8) 1464 bits. The throughput rate in this mode is computed as follows:

Bits/slot×Slots/sec=1464×(1600/4)=585.6 Kbps.

DM3 packets transmit every 1.875 usecs, with a payload of (121×8) 968 bits. The throughput rate in this mode is computed as follows:

Bits/slot×Slots/sec=968×(1600/4)=387.2 Kbps.

Figure 11:
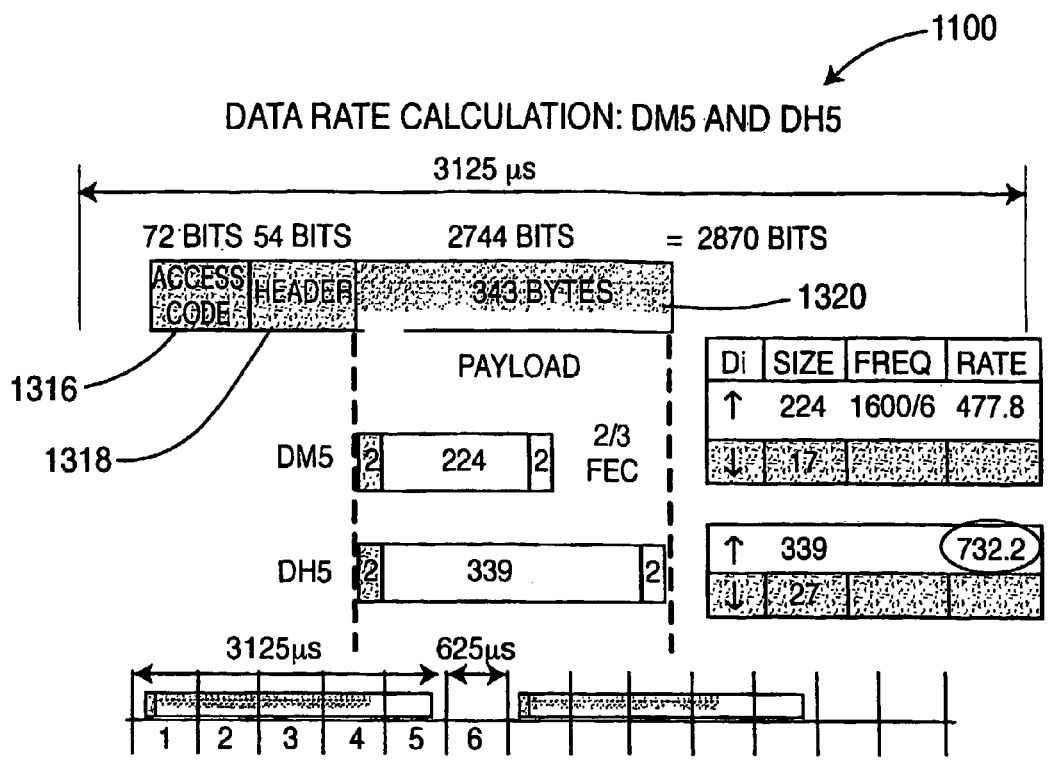
FIG. 11 is a diagram illustrating data rate calculation 1100 for DM5 and DH5 packets, according to an illustrative embodiment of the present invention.

FIG. 11 is a diagram illustrating data rate calculation 1100 for DM5 and DH5 packets, according to an illustrative embodiment of the present invention. DH5 packets transmit every 3.125 usecs, with a payload of (339×8) 2712 bits. The throughput rate in this mode is computed as follows:

Bits/slot×Slots/sec=2712×(1600/6)=723.2 Kbps.

DM5 packets transmit every 3.125 usecs, with a payload of (224×8) 1792 bits. The throughput rate in this mode is computed as follows:

Bits/slot×Slots/sec=1792×(1600/6)=477.8 Kbps.

Figure 12:
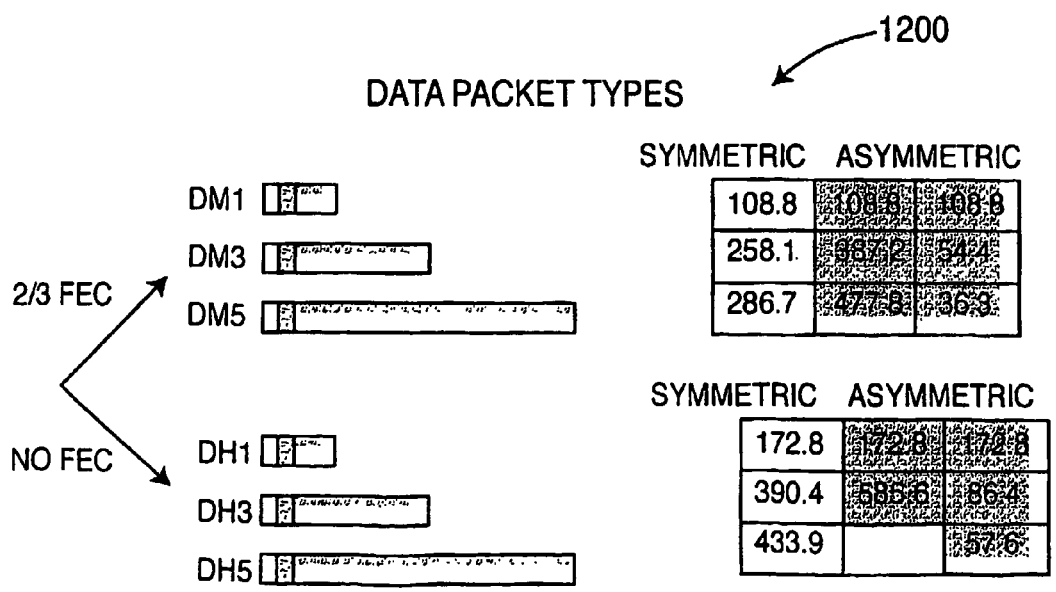
FIG. 12 is a diagram illustrating data packet types 1200, according to an illustrative embodiment of the present invention.

FIG. 12 is a diagram illustrating data packet types 1200, according to an illustrative embodiment of the present invention.

DV packet is a special packet transferred over SCO link. It contains an 80 bits voice field and an up to 150 bits data field. Up to 10 bytes of data could be sent in one DV packet. The data and a 16 bits Cyclic Redundancy Code (CRC) together are encoded using ⅔ rate Forward Error Correction (FEC).

The DV packet format provides some time-bounded applications an effective means to transfer data through circuit switched data path.

There are 4 types of control packets used: ID, NULL, POLL and FHS. They are common to both SCO and ACL links. They are used for synchronization, polling and other channel control functions.

Figure 13:
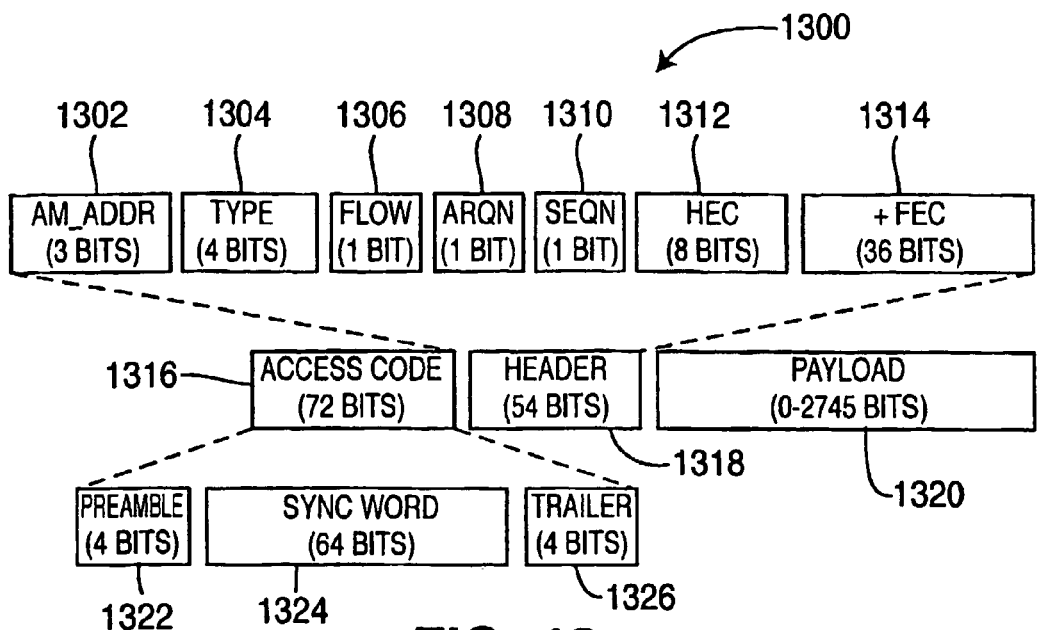
FIG. 13 is a diagram illustrating the BLUETOOTH packet structure 1300 to which the present invention may be applied, according to an illustrative embodiment of the present invention.

FIG. 13 is a diagram illustrating the BLUETOOTH packet structure 1300 to which the present invention may be applied, according to an illustrative embodiment of the present invention. The BLUETOOTH packet structure 1300 includes an AM_ADDR field (3 bits) 1302, a type field (4 bits) 1304, a flow field (1 bit) 1306, an ARQB field (1 bit) 1308, a SEQN field (1 bit) 1310, a Header Error Correction (HEC) field (8 bits) 1312, a +FEC field (36 bits) 1314, an access code field (72 bits) 1316, a header field (54 bits) 1318, a payload field (0-2745 bits) 1320, a preamble field 1322, a sync word field (64 bits) 1324, and a trailer field (4 bits) 1326.

Thus, each packet has 72-bits of access code, 54-bits of header and a payload of variable size. Compared to 802.11b, a BLUETOOTH packet is much smaller, giving it an advantage of a lower probability of error.

Figure 14:
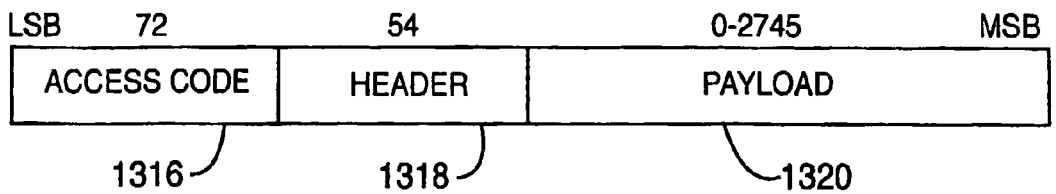
FIG. 14 is a diagram further illustrating the access code field 1316, the header field 1318, and the payload field 1320 of FIG. 13, according to an illustrative embodiment of the present invention.

FIG. 14 is a diagram further illustrating the access code field 1316, the header field 1318, and the payload field 1320 of FIG. 13, according to an illustrative embodiment of the present invention.

The access code is the same for all packets transmitted in one piconet. It includes a 4-bit preamble, a 64 bit synchronization word and possibly a 4-bit trailer. The receiver of one BLUETOOTH unit uses a slide correlator to correlate against the sync word to determine the timing. Depending on the state of the piconet, the sync word is generated in different ways. The preamble and trailer are used for DC compensation.

Figure 15:
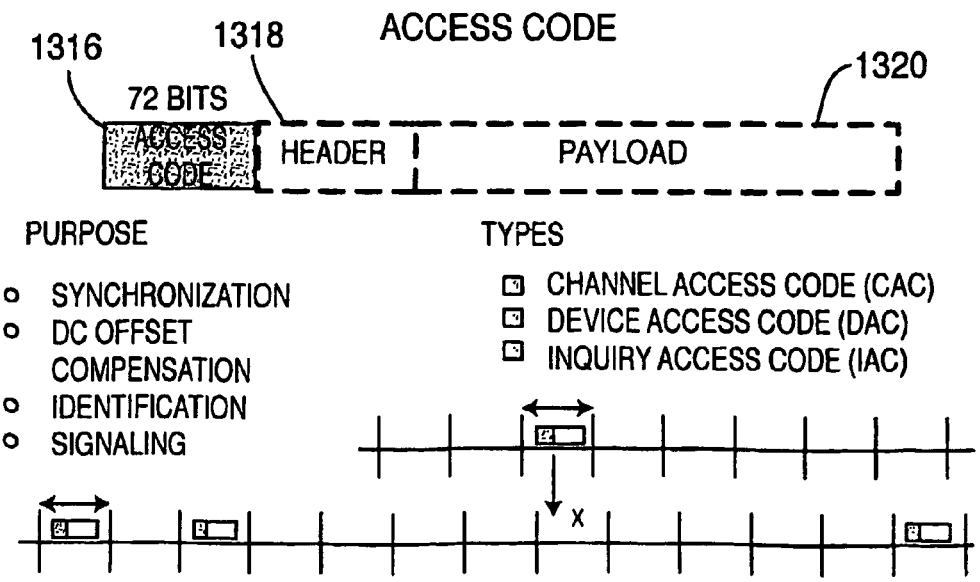
FIG. 15 is a diagram illustrating access code types 1500, according to an illustrative embodiment of the present invention.

FIG. 15 is a diagram further illustrating the access code field 1316, according to an illustrative embodiment of the present invention. The access code field 1316 may include various types of access codes. The access code types 1500 include, but are not limited to, Channel Access Code (CAC), Device Access Code (DAC), and Inquiry Access Code (IAC).

One unit can find if the packet is addressed to it simply by looking at the header 1318, it will go back to sleep for the rest of the slot if it is not for it. This design will reduce the power consumption even in the active mode.

Figure 16:
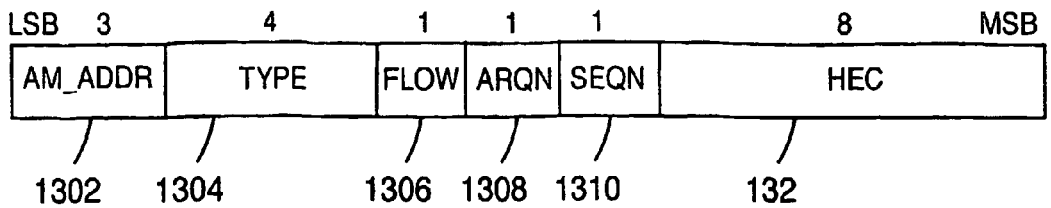
FIG. 16 is a diagram further illustrating various fields of the BLUETOOTH packet structure 1300 of FIG. 13, according to an illustrative embodiment of the present invention.

FIG. 16 is a diagram further illustrating various fields of the BLUETOOTH packet structure 1300 of FIG. 13, according to an illustrative embodiment of the present invention.

The packet header has six fields. The AM_ADDR field 1302 is the address of the active member the master used to distinguish them. The TYPE field 1304 includes information such as, e.g., how long the packet will last, the error correction scheme it uses and the type of the packet, for example it may be used to poll the slave or synchronization only. The FLOW bit 1306 is used for flow control in the ACL link. The ARQN field 1308 is used for ARQ. The SEQN bit 1310 is used to differentiate retransmitted packets from new ones. The HEC field 1312 is an 8-bit header error check.

For further protection, the whole header including the HEC field 1312 is encoded to ⅓ rate FEC of 54 bits to achieve more robustness. The payload 1320 is of variable size, depending on the type of packet. The SCO link has only fixed-length voice field (with exception of DV packet, which has both voice and data field).

Figure 17:
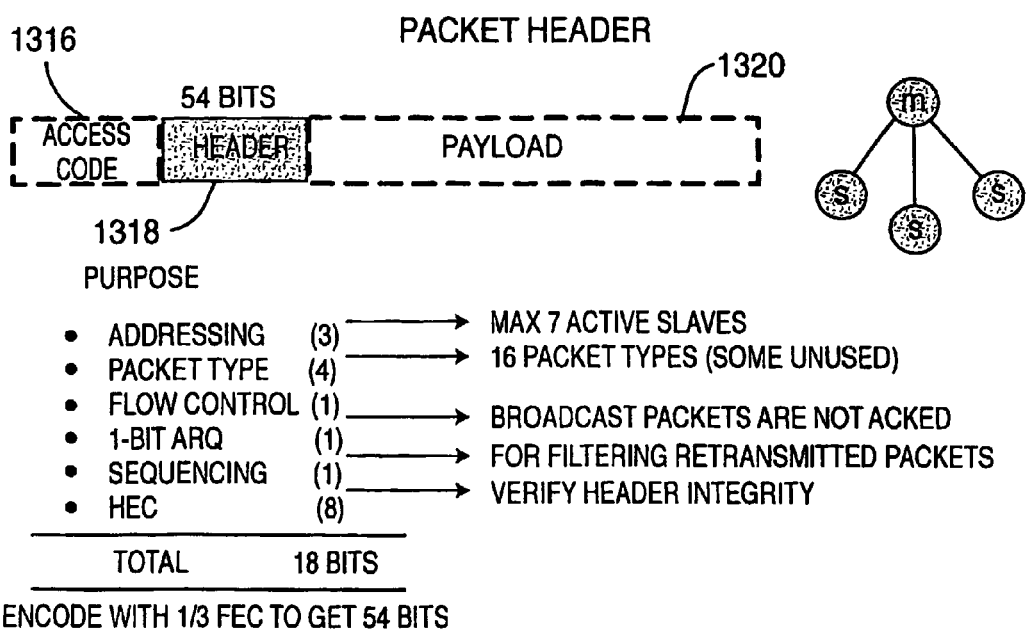
FIG. 17 is a diagram further illustrating the packet header field 1318 of the BLUETOOTH packet structure 1300 of FIG. 13, according to an illustrative embodiment of the present invention.

FIG. 17 is a diagram further illustrating the packet header field 1318 of the BLUETOOTH packet structure 1300 of FIG. 13, according to an illustrative embodiment of the present invention. On the ACL link, the data field itself includes a payload header, a payload body and possibly a payload CRC code.

The payload header includes the following 3 fields:
2-bit L_CH, used to identify logical channels
1-bit FLOW for flow control
5-bit LENGTH (8-bit for multi-slot packets) to indicate the variable payload size.

Figure 18:
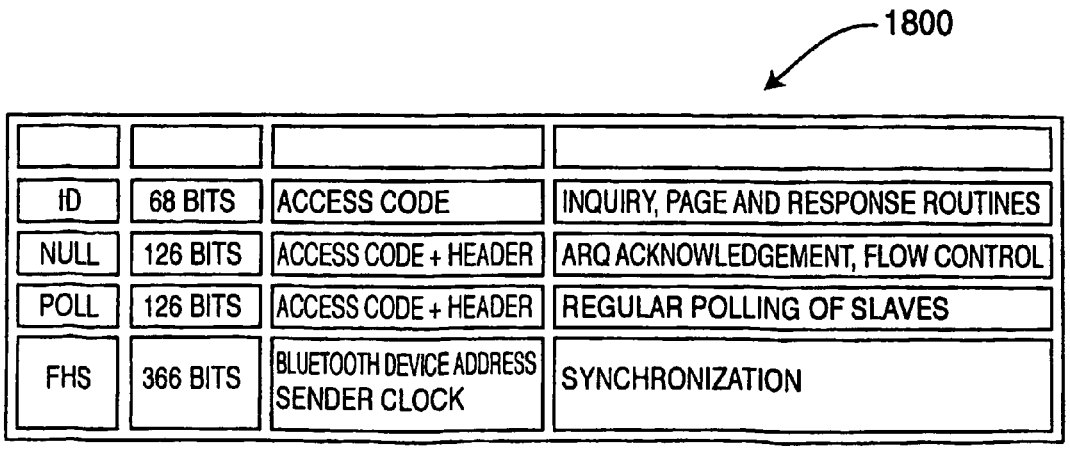
FIG. 18 is a diagram illustrating packet type characteristics 1800, according to an illustrative embodiment of the present invention.

FIG. 18 is a diagram illustrating packet type characteristics 1800, according to an illustrative embodiment of the present invention.

However, ACL packets not addressed to a specific slave are considered broadcast Packets and are read by every slave device.

A Brief Discussion will now be given regarding channel capacity and link efficiency, according to an illustrative embodiment of the present invention.

BLUETOOTH is implemented in a bandwidth of 83.5 MHz. Frequency Hop Spread Spectrum, a form of Code Division Multiple Access is used for multiplexing. There is a 2.0 MHz lower guard band and a 3.5 MHz upper guard band. In between these guard bands there are 79 RF channels spaced at 1.0 MHz. The nominal bandwidth is therefore BW=1.0 MHz.

The operating distance for a BLUETOOTH link with antenna power 0 dBm is 10 m. The bandwidth-distance product is: BWD=100.0 MHz m.

The operating distance for a BLUETOOTH link with antenna power 20 dBm is 100 m. The bandwidth-distance product is: BWD=100.0 MHz m.

The signal is modulated using Gaussian Frequency Shift Keying with two symbols, therefore M=2. By the Nyquist theorem, the theoretical channel capacity, C, is defined as follows:

$$C = 2W \log_2(M)$$

where C is channel capacity and W is bandwidth. Substituting actual values, we obtain the following:

$$C = 2*1.0 \text{ MHz} \log_2(2) = 2.0 \text{ Mbps}$$

The stated transmission rate for BLUETOOTH is 1.0 Mbps. The minimum power requirement at the receiver is −70 dBm.

Now the Shannon-Hartley theorem relates the channel capacity to the SNR.

$$C = W \log_2(1+S/N) \text{ substituting 1.0 Mbps for C and 1.0 MHz for } W.$$

This implies that a noise power, $N_P$ of −70 dBm ($10^{-10}$ watts) is the maximum tolerated noise level.

BLUETOOTH implements a Time Division Duplex media access scheme in order to provide a full duplex connection. For example, consider the following scenarios:

(a) Three SCO links at 64 kbps=192 kbs Full Duplex connections 192 kbs*2=384 kbps uses HV3 packets. No FEC on payload. Total frame size 54 bits header+240 bits payload=294 bits. Overhead is 54 bits/294 bits=18.37% and net throughput is 81.63% or 313.5 kbps.

(b) Two SCO links at 64 kbps=128 kbs Full Duplex connections at 128 kbs*2=256 kbps using HV2 packets and ⅔ FEC on the payload packets. Total frame size 54 bits header+240 bits payload=294 bits. Overhead is 134 bits/294 bits=45.58%. Actual throughput is 54.42% or 139.3 kbps.

(c) One SCO link at 64 kbps Full Duplex connection at 64 kbs*2=128 kbps using HV1 packets with ⅓ FEC on the payload packets. Total frame size 54 bits header+240 bits payload=294 bits. Overhead is 214 bits/294 bits=72.79%. Actual throughput is 27.21% or 34.8 kbps.

(d) One SCO link at 64 kbps Full Duplex connections at 64 kbps*2=128 kbps uses HV3 packets. No FEC on payload packets. Total frame size 54 bits header+240 bits payload=294 bits. Overhead is 54 bits/294 bits=18.37%. Actual throughput is 81.63% or 104.5 kbps.

In addition, symmetric ACL link 433.9 kbps*2=867.8 kbps. For maximum actual throughput use DH5 packet with no FEC on the payload packets: Total frame size 54 bits header+16 bits payload header+16 bits CRC+2728 bits of data=2814 bits. Overhead is 86 bits/2814 bits=3%. Actual throughput is 97% or 841.3 kbps. Total throughput is computed as kbps+841.3 kbs=945.8 kbps (forward link+ return link).

The BLUETOOTH protocol stack is defined as a series of layers, though there are some features that cross several layers. A BLUETOOTH device can be made up of two parts: a host implementing the higher layers of the protocol stack, and a module implementing the lower layers. This separation of the layers can be useful for several reasons. For example, hosts such as PCs have spare capacity to handle higher layers, allowing the BLUETOOTH device to have less memory and a less powerful processor, which leads to cost reduction. Also, the host device can sleep and be awoken by an incoming BLUETOOTH connection. Of course, an interface is needed between the higher and lower layers, and for that purpose the BLUETOOTH defines the Host Controller Interface (HCI). However, for some small and simple systems, it is still possible to have all layers of the protocol stack run on one processor. An example of such a system is a headset in hands-free mode.

Figure 19:
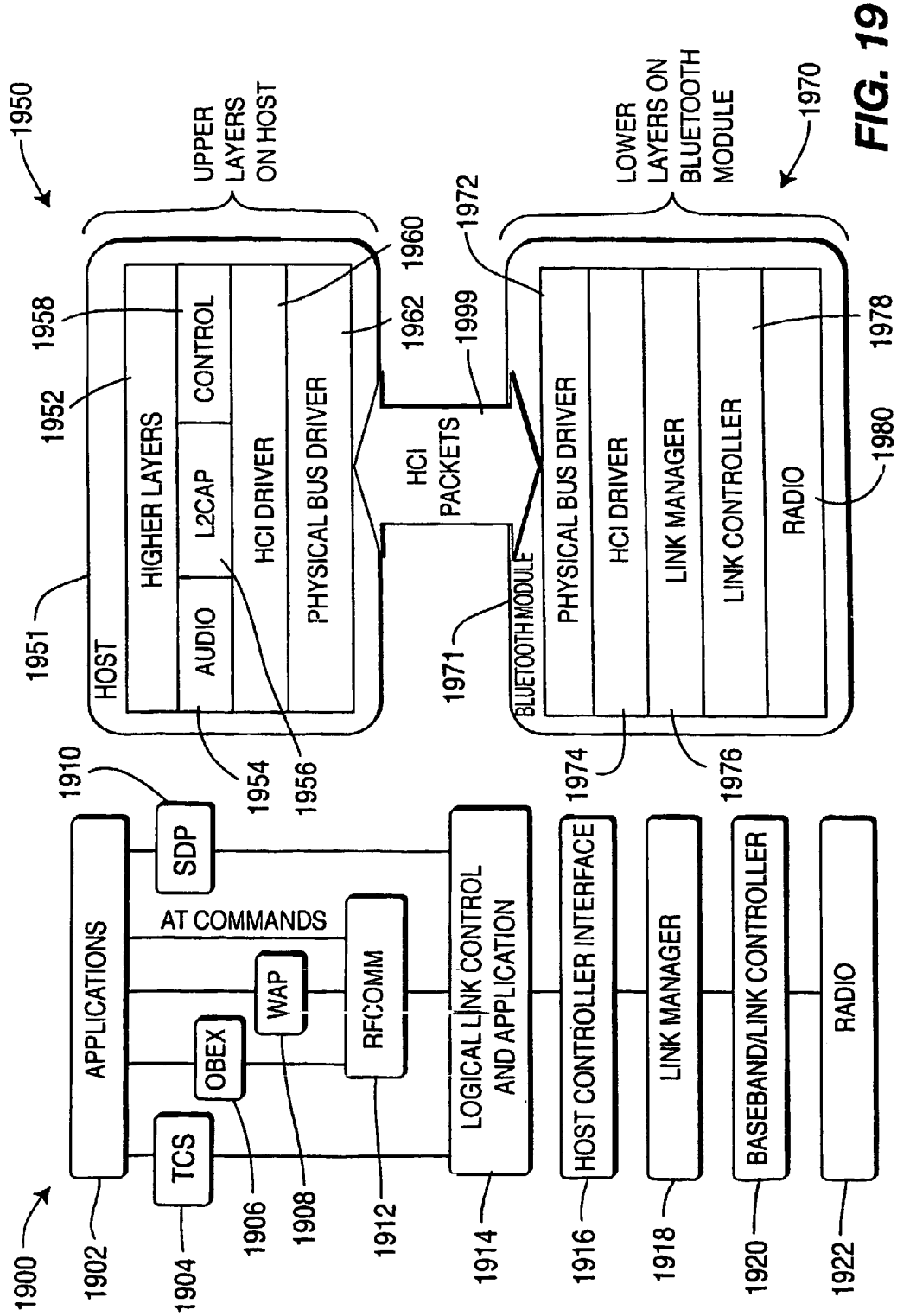
FIG. 19 is a diagram illustrating the BLUETOOTH protocol stack 1900, according to an illustrative embodiment of the present invention.

FIG. 19 is a diagram illustrating the BLUETOOTH protocol stack 1900, according to an illustrative embodiment of the present invention. The BLUETOOTH protocol stack 1900 includes an applications layer 1902, a TCS layer 1904, an OBEX layer 1906, a WAP layer 1908, an SDP layer 1910, a Radio Frequency Communication (RFCOMM) layer 1912, a logical link control and application layer 1914, a host controller interface 1916, a link manager 1918, a baseband/link controller 1920, and a radio layer 1922.

Upper layers 1950 on a host 1951 include higher layers 1952, an audio layer 1954, an L2CAP layer 1956, a control layer 1958, an HCI driver 1960, and a physical bus driver 1962.

Lower layers 1970 on a BLUETOOTH module 1971 include a physical bus driver 1972, an HCI driver 1974, a link manager layer 1976, a link controller layer 1978, and a radio layer 1980.

HCI packets 1999 are exchanged between the higher layers 1950 and the lower layers 1970.

Regarding the baseband layer 1920, there are two basic types of physical links that can be established between a master and a slave: Synchronous Connection Oriented (SCO); and Asynchronous Connection-Less (ACL)

An SCO link provides a symmetric link between the master and the slave, with regular periodic exchange of data in the form of reserved slots. Thus, the SCO link provides a circuit-switched connection where data are regularly exchanged, and as such it is intended for use with time-bounded information as audio. A master can support up to three SCO links to the same or to different slaves. A slave can support up to three SCO links from the same master.

An ACl link is a point-to-multipoint link between the master and all the slaves on the piconet. It can use all of the remaining slots on the channel not used for SCO links. The ACL link provides a packet-switched connection where data are exchanged sporadically, as they become available from higher layers of the stack. The traffic over the ACL link is completely scheduled by the master.

Each BLUETOOTH device has a 48 bit IEEE (Media Access Control (MAC) address that is used for the derivation of the access code. The access code has pseudo-random properties and includes the identity of the piconet master. All the packets exchanged on the channel are identified by this master identity. This prevents packets sent in one piconet to be falsely accepted by devices in another piconet that happens to use the same hopping frequency in the certain time slot. All packets have the same format, starting with an access code, followed by a packet header and ending with the user payload.

Figure 20:
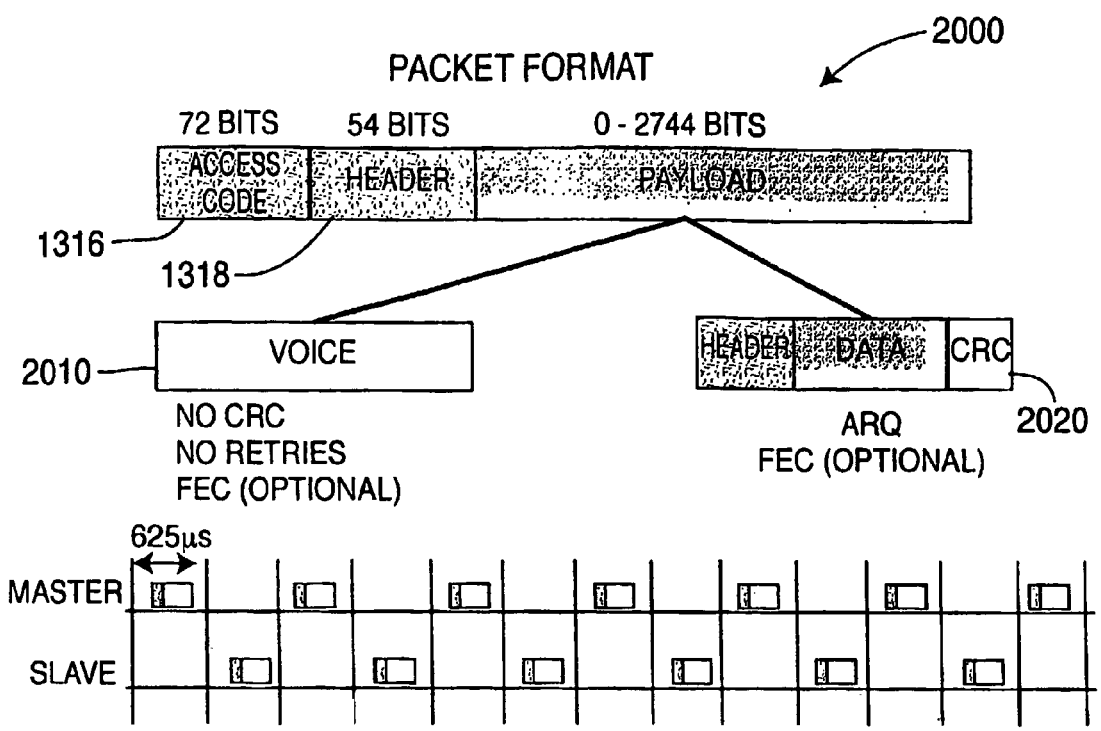
FIG. 20 is a diagram illustrating the BLUETOOTH packet structure 2000 to which the present invention may be applied, according to an illustrative embodiment of the present invention.

FIG. 20 is a diagram illustrating the BLUETOOTH packet format 2000 to which the present invention may be applied, according to an illustrative embodiment of the present invention. The packet format 2000 may include an access code field 1316, a header field 1318, and a payload field 1320. The payload included in the payload field 1320 may include voice 2010 or data 2020.

The access code included in the access field 1316 is used to address the packet to a specific device. The header field 1318 includes all the control information associated with the packet and the link. The payload field 1320 includes the actual message information. The BLUETOOTH packets can be 1, 3, or 5 slots long, but the multi-slot packets are always sent on a single-hop carrier.

The link control layer 1920 is responsible for managing device discoverability, establishing connections and maintaining them. In BLUETOOTH, three elements have been defined to support connection establishment: scan, page and inquiry.

Inquiry is a process in which a device attempts to discover all the BLUETOOTH enabled devices in its local area. A unit that wants to make a connection broadcasts an inquiry message that induces the recipients to return their addresses. Units that receive the inquiry message return Frequency Hopping Synchronization (FHS) packet that includes, among other things, their identity and clock information. The identity of the recipient is required to determine the page message and wake-up sequence. For the return of FHS packets, a random back-off mechanism is used to prevent collisions.

Figure 21:
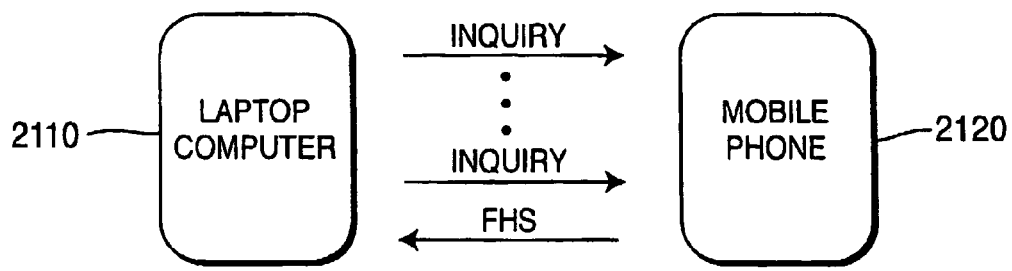
FIG. 21 is a diagram illustrating the discovery process relating to the discovery of a BLUETOOTH device by another device, according to an illustrative embodiment of the present invention.

FIG. 21 is a diagram illustrating the discovery process relating to the discovery of a BLUETOOTH device by another device, according to an illustrative embodiment of the present invention. In the illustrative embodiment of FIG. 21, the two devices include a laptop computer 2110 and a mobile phone 2120.

Inquiries are sent from the laptop computer 2110 to the mobile phone 2120 and an FHS packet is then sent from the mobile phone 2120 to the laptop computer 2110.

A unit in idle mode wants to sleep most of the time to save power, but, from time to time, it also has to listen whether other units want to connect (page scan). In a truly ad hoc system, there is no common control channel a unit can lock to in order to listen for page messages. So, every time the unit wakes up, it scans at a different hop carrier for an extended time. A trade-off has to be made between idle mode power consumption and response time: increasing the sleep time reduces power consumption but prolongs the time before an access can be made. The unit that wants to connect has to solve the frequency-time uncertainty: that unit does not know when the idle unit will wake up and on which frequency. For that reason, the paging unit transmits the access code repeatedly at different frequencies: every 1.25 ms the paging unit transmits two access codes and listens twice for a response. In a 10 ms period, 16 different hop carriers are visited. If the idle unit wakes up in any of these 16 frequencies, the idle will receive the access code and start with a connection setup procedure. First, the idle will notify the paging unit by returning a message, and then the idle will transmit a FHS packet that contains all of the pager's information. This information is then used by both units to establish the piconet. Once a baseband link is established, the master and slave can exchange roles if they wish, so that the slave becomes the master and the master becomes the slave.

It should be noted that the control of links rests completely with the local device. If the local device does not make itself discoverable by page scanning then the local device cannot be found. If the local device does not make itself connectable by page scanning, then the local device cannot be linked with, and once in a connection the local device is free to disconnect without warning at any time.

Audio data is carried via SCO (Synchronous Connection Oriented) channels. These SCO channels use pre-reserved slots to maintain temporal consistency of the audio carried on them. This allows us to build devices such as wireless headsets, microphones and headphones using BLUETOOTH for many consumer products such as cellular phones, call center switchboards, or even personal musical playback.

There are two routes for audio to pass through a BLUETOOTH system: through the HCI as data in HCI packets, and via direct PCM connection to the baseband CODECs.

Figure 22:
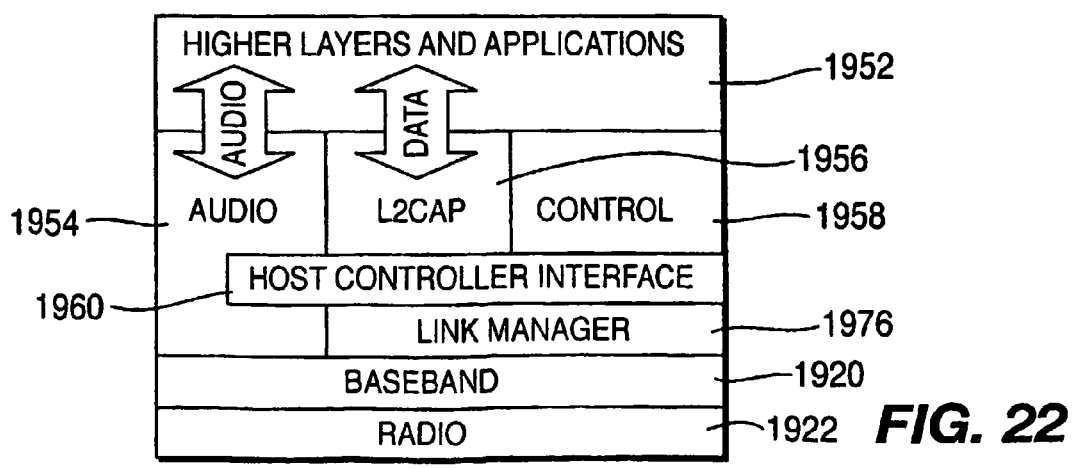
FIG. 22 is a diagram illustrating the position of audio in the BLUETOOTH stack 1950 of FIG. 19, according to an illustrative embodiment of the present invention.

FIG. 22 is a diagram illustrating the position of audio in the BLUETOOTH stack 1950 of FIG. 19, according to an illustrative embodiment of the present invention.

The HCI route has some deficiencies in carrying audio data, i.e. packets crossing the HCL are subject to flow control and therefore to variable latency due to microcontroller executing the HCI and LM (Link Manager) tasks. The direct PCM route is not well specified in the BLUETOOTH specifications, but is very common in commercial implementations.

Regarding the link manager 1918, the host drives a BLUETOOTH device through Host Controller Interface (HCI) commands, but it is the link manager 1918 that translates those commands into operations at the baseband level. Its main functions are to control piconet management (establishment and destruction the links and role change), link configuration, and security and QoS functions.

The link manager 1918 communicates with its peers on other devices using the Link Management Protocol (LMP) 1976. Every LMP message begins with a flag bit that is 0 if a master initiated the transaction and 1 if the slave initiated the transaction. That bit is followed by a 7-bit Operation Code, and by the message's parameters.

Figure 23:
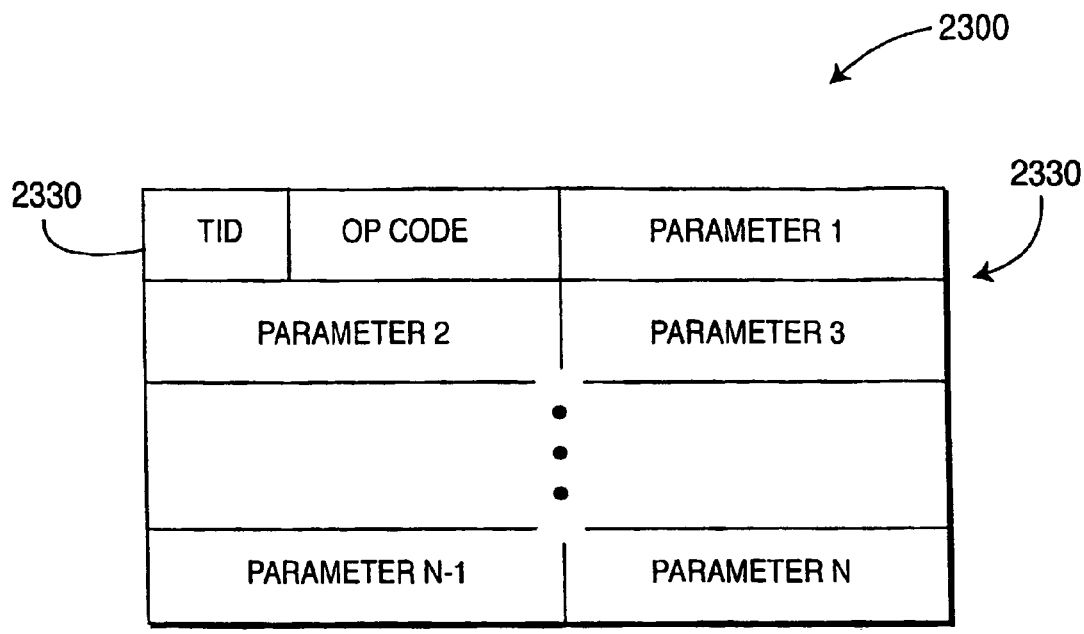
FIG. 23 is a diagram illustrating the Link Management Protocol (LMP) Protocol Data Unit (PDU) payload body 2300, according to an illustrative embodiment of the present invention.

FIG. 23 is a diagram illustrating the Link Management Protocol (LMP) Protocol Data Unit (PDU) payload body 2300, according to an illustrative embodiment of the present invention. The LMP PDU payload body 2300 includes a TID field 2310, an OpCode field 2320, and parameter fields 1 through N 2330.

When a link is first set up, it uses single-slot packets by default. Multi-slot packets make more efficient use of the band, but there are some occasions when they can't be used, for example on noisy links or if SCO links don't leave sufficient space between their slots for multi-slot packets.

The LMP 1976 also provides a mechanism for negotiating encryption modes and coordinating encryption keys used by devices on both ends of the link. In addition, the LMP 1976 supports messages for configuration of the quality of service on a connection. Packet types can automatically change according to the channel quality, so that the data can be transferred at a higher rate when the channel quality is good, and on lower rates with more error protection if the channel quality deteriorates.

Logical Link Control and Adaptation Protocol (L2CAP) 1914 takes data from higher layers 1952 of the BLUETOOTH stack and from applications and sends them over the lower layers of the stack. L2CAP 1914 passes packets either to the HCI 1974, or in a host-less system directly to the Link Manager 1976.

One of the major functions of the L2CAP 1914 is multiplexing between different higher layer protocols to allow several higher layer links to share a single ACL connection. L2CAP uses channel numbers to label packets so that, when they are received, they can be routed to the correct place.

Another one of the major functions of the L2CAP 1914 is segmentation and reassembly that allows transfer of larger packets than what lower layers support. All applications must use L2CAP 1914 to send data. The L2CAP 1914 is also used by BLUETOOTH's higher layers such as RFCOMM 1912 and SDP 1910 and, thus. L2CAP 1914 may be considered a compulsory part of every BLUETOOTH system.

RFCOMM 1912 is a simple, reliable transport protocol that provides emulation of the serial cable line settings and status of an RS-232 serial port. RFCOMM 1912 provides connections to multiple devices by relying on L2CAP 1914 to handle multiplexing over single connection. RFCOMM s1912 supports two types of devices as follows:

Type 1—Internal emulated serial port. These devices usually are the end of a communication path, for example a PC or printer.

Type 2—Intermediate device with physical serial port. These are devices that sit in the middle of a communication path, for example a modem.

Up to 30 data channels can be set up, so RFCOMM 1912 can theoretically support 30 different services at once. RFCOMM 1912 is based on the GSM TS 07.10 standard, which is an asymmetric protocol used by GSM cellular phones to multiplex several streams of data onto one physical serial cable.

The Service Discovery Protocol (SDP) 1910 is one of the most important members of the BLUETOOTH protocol stack 1900. SDP 1910 provides a means for an SDP client to access information about services offered by SDP servers. An SDP server is any BLUETOOTH device that offers services to other BLUETOOTH devices. Information about services is maintained in SDP databases. There is no centralized database, so each SDP server maintains its own database. The SDP database is simply a set of records describing all the services that a BLUETOOTH device can offer to another BLUETOOTH device, and service discovery protocol provides a means for another device to look at these records. To make it easier to find the service you want, services are arranged in a hierarchy structure as a tree that can be browsed. Clients begin by examining the root of the tree, then follow the hierarchy out to the leaf nodes where individual services are described.

To browse service classes, or get information about a specific service, SDP clients and servers exchange messages that are carried in SDP Protocol Data Units (PDUs). The first byte of PDU is an ID 2410, identifying the message in the PDU. Services have Universally Unique Identifiers (UUIDS) that describe them. The services defined by the BLUETOOTH profiles have UUIDs assigned by the standard, but service providers can define their own services and assign their own UUIDs to those services.

Figure 24:
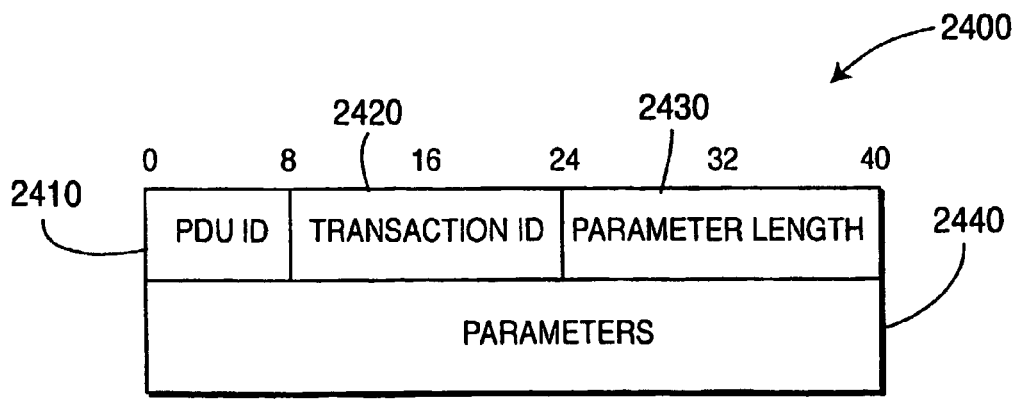
FIG. 24 is a diagram illustrating the structure of a Service Discovery Protocol (SDP) Protocol Data Unit (PDU) 2400, according to an illustrative embodiment of the present invention.

FIG. 24 is a diagram illustrating the structure of a Service Discovery Protocol (SDP) Protocol Data Unit (PDU) 2400, according to an illustrative embodiment of the present invention. The SDP PDU 2400 includes a PDU TID field 2410, a transaction ID field 2420, a parameter length field 2430, and a parameters field 2440.

SDP relies on L2CAP links being established between the SDP client 2501 and the SDP server 2502, before retrieving SDP information.

Figure 25:
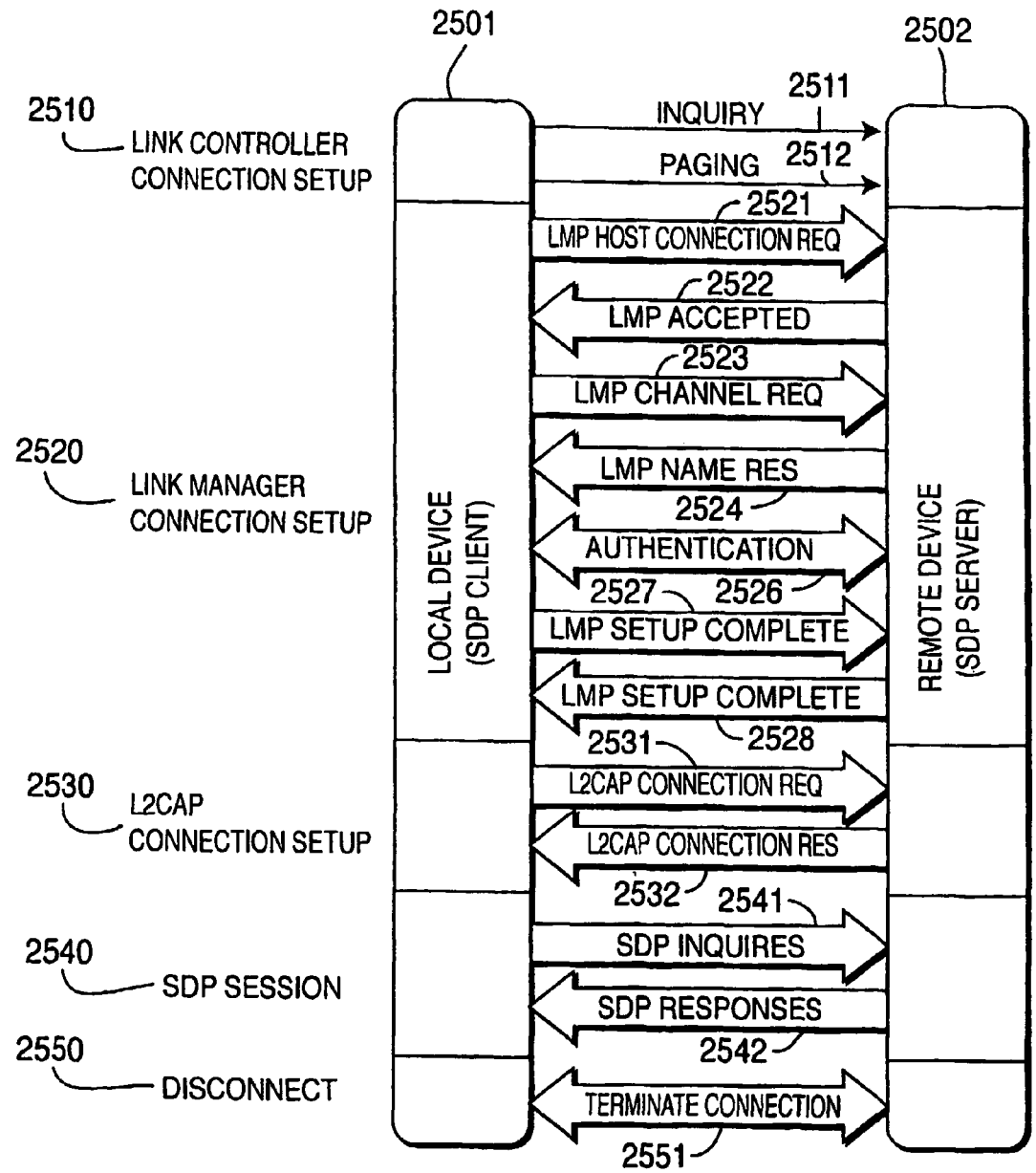
FIG. 25 is a diagram illustrating various steps for setting up a Service Discovery Protocol (SDP) session, according to an illustrative embodiment of the present invention.

FIG. 25 is a diagram illustrating various steps for setting up a Service Discovery Protocol (SDP) session, according to an illustrative embodiment of the present invention. The session is conducted between a local device (SDP client) 2501 and a remote device (SDP server) 2502. The steps shown in FIG. 25 broadly include link controller connection setup 2510, link manager connection setup 2520, L2CAP connection setup 2530, SDP session 2540, and disconnect 2550.

More specifically, the link connection setup 2510 includes an inquiry step 2511 and a paging step 2512.

The link manager connection setup step 2520 includes an LMP host connection request 2521, an LMP accepted response 2522, an LMP name request 2523, an LMP name response 2524, authentication 2525, an LMP setup complete message 2526 and another LMP setup complete message 2527.

The L2CAP connection step 2530 includes an L2CAP connection request 2531 and an L2CAP connection response 2532.

The SDP session 2540 includes SDP inquiries 2541 and SDP responses 2542.

The disconnect 2550 includes a terminate connection message 2551.

Regarding supported Protocols, as mentioned above, one of the most important characteristics of the BLUETOOTH specification is that it should allow devices from lots of different manufacturers to work with one another. For that reason, BLUETOOTH is designed in such a way as to allow many different protocols to be run on top of it. Some of these protocols are: Wireless Access Protocol (WAP); Object Exchange Protocol (OBEX); and Telephony Control Protocol.

WAP provides a protocol stack similar to the Internet Protocol (IP) stack, but WAP is tailored for the needs of mobile devices. WAP supports the limited display size and resolution typically found on mobile devices by providing special formats for Web pages that suit their capabilities. WAP also provides for the low bandwidth of mobile devices by defining a method for WAP content to be compressed before the WAP content is transmitted across a wireless link. WAP can use BLUETOOTH as a bearer layer in the same way as it can use GSM, CDMA and other wireless services. The WAP stack is joined to the BLUETOOTH stack using User Datagram Protocol (UDP), Internet Protocol (IP) and Point-to-Point Protocol (PPP).

OBEX is a protocol designed to allow a variety of devices to exchange data simply and spontaneously. BLUETOOTH has adopted this protocol from the Infrared Data Association (IrDA) specifications. OBEX has a client/server architecture and allows a client to push data to a server or pull data from the server. For example, a PDA might pull a file from a laptop, or a phone synchronizing an address book might push it to a PDA. The similarities between the two communications protocols' lower layers mean that IrDA's OBEX protocol is ideally suited to transferring objects between BLUETOOTH devices.

BLUETOOTH's Telephony Control Protocol Specification (TCS) defines how telephone calls should be sent across a BLUETOOTH link. TCS gives guidelines for the signaling needed to set up both point to point and point to multipoint calls. By use of TCS, calls from an external network can be directed to other BLUETOOTH devices. For instance, a cellular phone could receive a call and use TCS to redirect the call to a laptop, allowing the laptop to be used as a hands-free phone. TCS is driven by a telephony application that provides the user interface, and provides the source of voice or data transferred across the connection set up by TCS.

A description will now be given of BLUETOOTH profiles associated with certain applications. That is, in addition to protocols that guarantee that two units speak the same language, BLUETOOTH specification defines the profiles. The profiles specify which protocol elements are mandatory in certain applications. This concept prevents devices with little memory and processing power implementing the entire BLUETOOTH stack when they only require a small fraction of the BLUETOOTH stack. Simple devices like a headset or mouse can thus be implemented with a strongly reduced protocol stack.

The BLUETOOTH profiles are organized into groups, with each profile building upon the one beneath and inheriting features from below. For developers, this means that key features of one BLUETOOTH solution can be reused in other solutions, bringing down development costs and speeding up the development cycle.

Figure 26:
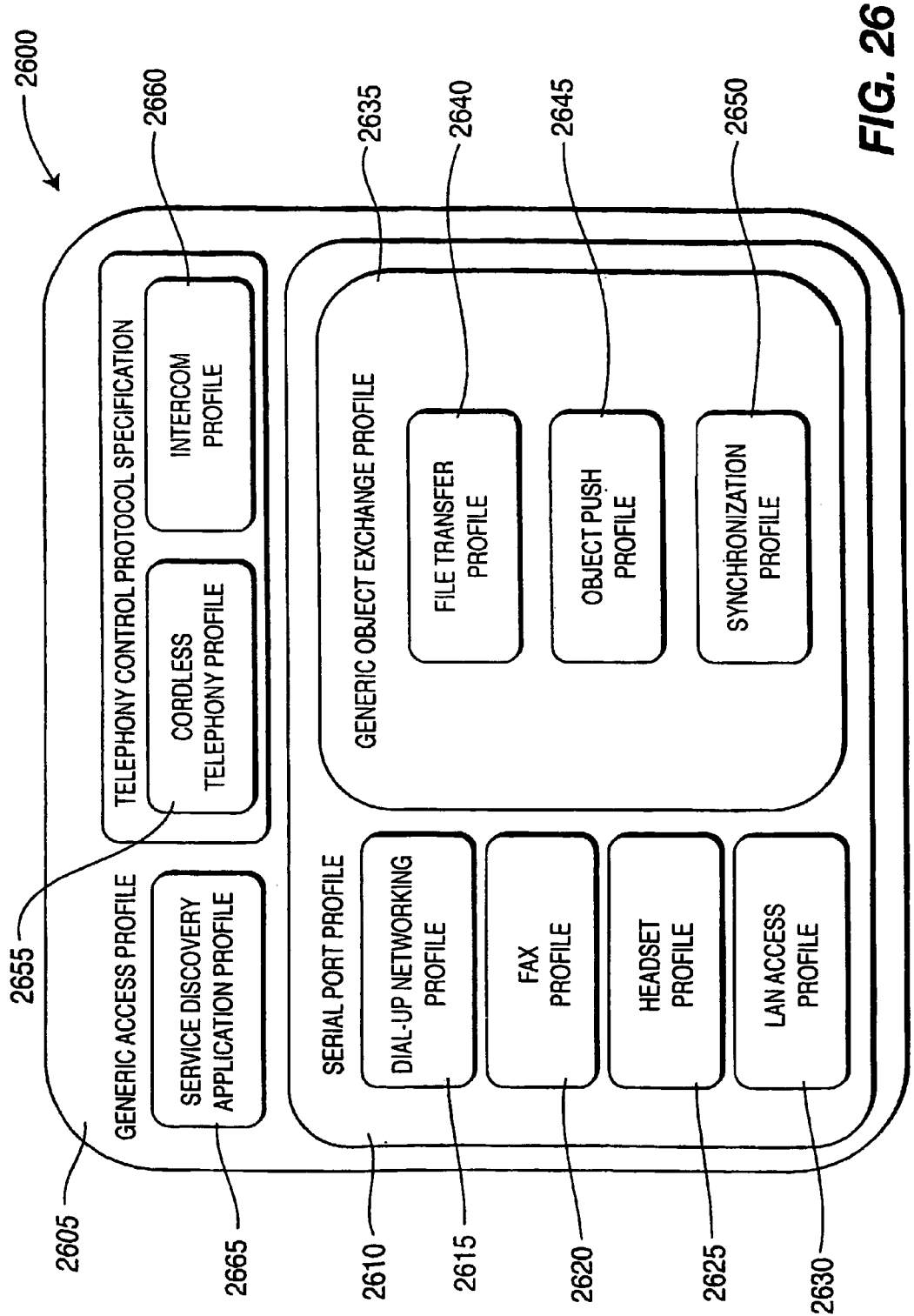
FIG. 26 is a diagram illustrating BLUETOOTH profiles 2600 to which the present invention may be applied, according to an illustrative embodiment of the present invention.

FIG. 26 is a diagram illustrating BLUETOOTH profiles 2600 to which the present invention may be applied, according to an illustrative embodiment of the present invention.

The profiles implemented by BLUETOOTH are: Generic Access 2605; Serial Port 2610; Dial-up Networking 2615; FAX 2620; Headset 2625; Local Area Network (LAN) Access Point 2630; Generic Object Exchange 2635; File Transfer 2640; Object Push 2645; Synchronization 2650; Cordless Telephony 2655; and Intercom 2660.

Generic Access 2605 defines the basic rules for using the protocol stack. Serial Port 2610 defines how to use RFCOMM's serial port emulation capabilities in BLUETOOTH products. Dial-up Networking 2615 defines a BLUETOOTH link to a modem. FAX 2620 defines how to transfer a fax over BLUETOOTH. Regarding headset 2625, a duplex link to a headset, controlled by an audio gateway such as cellular phone. LAN Access Point 2630 defines a link to LAN via BLUETOOTH. Generic Object Exchange 2635 defines a set of rules for using OBEX, which supports file transfer, object push and synchronization profiles. File Transfer 2640 relates to transferring files between BLUETOOTH devices. Object Push 2645 relates to pushing objects from a BLUETOOTH enabled server to a client. Synchronization 2650 relates to synchronizing objects between BLUETOOTH devices. Cordless Telephony 2655 relates to forwarding telephone calls to BLUETOOTH devices. Intercom 2660 relates to short-range voice connections between BLUETOOTH devices.

The BLUETOOTH profiles 2600 further include a Service Discovery Application Profile 2665.

Basic security elements need to be considered to prevent unauthorized usage and eavesdropping in a BLUETOOTH system though it is mainly intended for short-range connectivity between personal devices. Security features are included at the link level and are based on a secret link key that is shared by a pair of devices. To generate this key, a pairing procedure is used when the two devices communicate for the first time.

At connection establishment, an authentication process is carried out to verify the identities of the units involved. The authentication process uses a conventional challenge-response routine. The verifier compares signed response (SRES) produced by the claimant with its own SRES and decides if the challenger may continue with connection establishment. To prevent eavesdropping on the link, which is a danger inherent to radio communications, the payload of each packet is encrypted. Encryption is based on stream ciphering; the payload bits are modulo-2 added to a binary key stream.

The central element in the security process is the 128-bit link key. This link key is a secret key residing in the BLUETOOTH hardware and is not accessible by the user. The link key is generated during an initialization phase. Once the initialization has been carried out, the 128-bit link keys reside in the devices and can from then on be used for automatic authentication without user interaction. In addition, methods are available to use the same encryption keys for all slaves in a single piconet.

BLUETOOTH provides a limited number of security elements at the lowest level. More advanced security procedures can be implemented at higher layers.

As many BLUETOOTH devices are operated by batteries, special attention has been paid to the reduction of power consumption in the design. Also, many tests have been performed to prove that BLUETOOTH devices are too low in power to have any negative impact on health. Three low-power modes, which extend battery life by reducing activity on a connection, have been defined. These modes are called Park, Hold, and Sniff.

Park mode provides the greatest opportunities for power saving. The device only wakes up in periodic beacon slots when the device listens for unpark transmissions from the Master. If it is not unparked, the device goes back to sleep, switching off its receiver. Devices that are parked give up their active member addresses, so one Master can have more devices in Park mode at once. In Sniff mode, the slave does not scan at every master-to-slave slot, but has a larger interval between scans. Devices in Sniff mode keep their active member address. Typically, sniffing devices will be active more often than parked devices. Both Park and Sniff modes involve putting devices into a state where they wake up periodically while Hold mode just puts a connection in a low-power state for a single period. So, a Master needs to perform an inquiry to be able to service the connections again.

In the connection state, current consumption is minimized and wasteful interference prevented by only transmitting when data is available. In longer periods of silence, the master needs to send a packet on the channel once in a while such that all slaves can resynchronize their clocks and compensate for drift. During continuous TX/RX operations, a unit starts to scan for the access code at the beginning of the RX slot. If the access code is not found, or even if the access code is found but the slave address does not match the recipient, the unit goes to sleep until the next slot. The header indicates what type of packet it is and how long the packet will last; therefore, the non-addressed recipients can determine how long they can sleep.

The nominal transmit power used by most BLUETOOTH applications for short-range connectivity is 0 dBm. This restricts current consumption and keeps interference to other systems to a minimum. However, the BLUETOOTH radio specifications allow TX power up to 20 dBm. Above 0 dBm, closed-loop received signal strength indication power control is mandatory. This power control can compensate for propagation losses and slow fading.

In low-power modes many layers of the BLUETOOTH protocol stack are involved: as after periods of inactivity, the device may lose synchronization and need to listen for transmissions over a wider window than usual, the baseband layer alters correlator properties. The link manager provides a variety of messages to configure and negotiate the low-power modes between ends of a connection. HCI 1960 provides a set of commands that may be used by a host to configure and control the power-saving capabilities of a module. L2CAP 1914 must be aware of low-power modes for its quality of service commitments.

Different BLUETOOTH devices may have different requirements for data rate, delay variance, and reliability. The specification provides Quality Of Service (QOS) configurations for the properties of links according to the requirements of higher layer applications or protocols. These properties include the type of QOS, token rate, token rate bucket size, peak bandwidth, latency, and delay variation.

Figure 27:
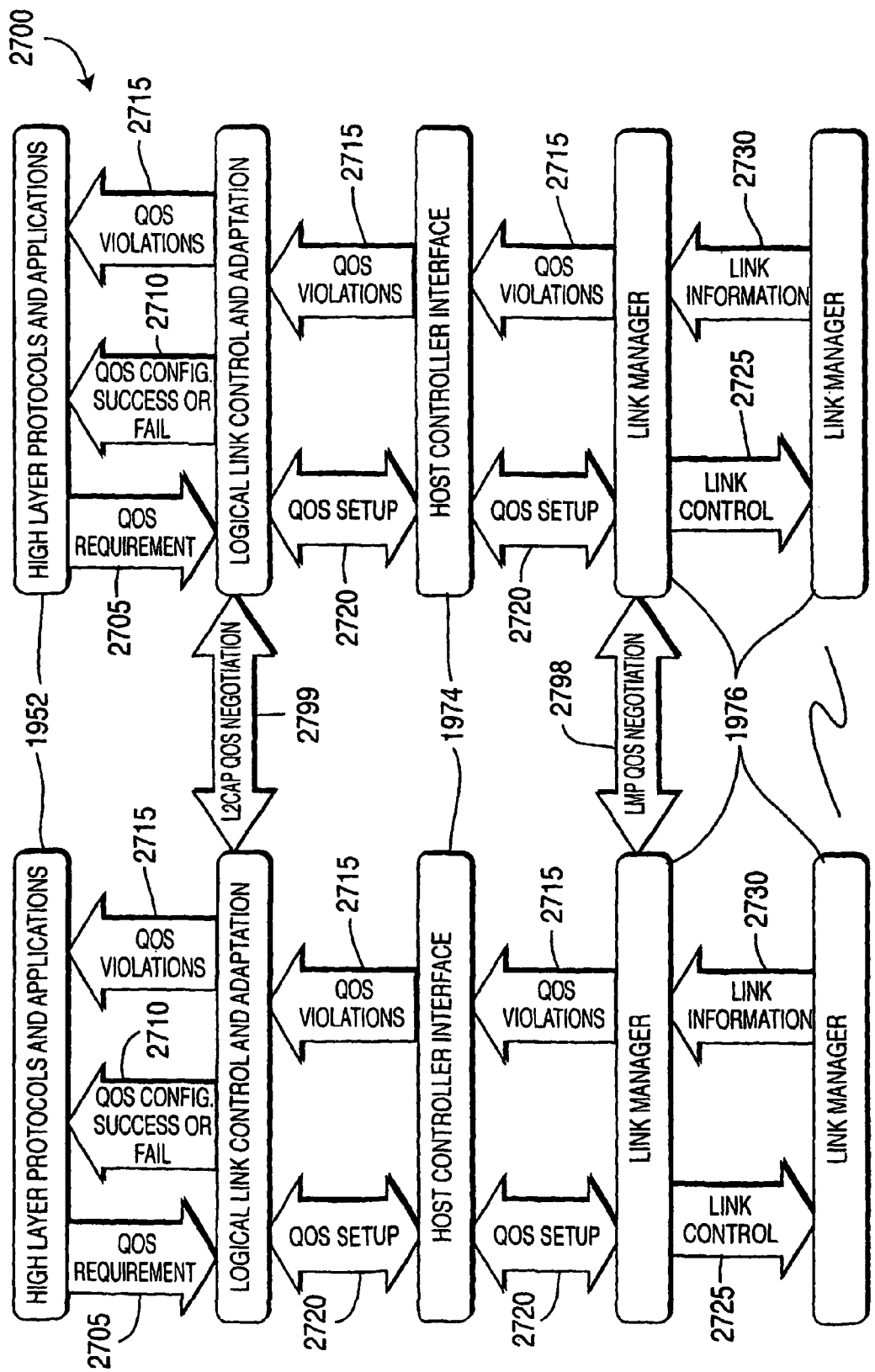
FIG. 27 is a diagram illustrating Quality of Service (QoS) messaging 2700, according to an illustrative embodiment of the present invention.

FIG. 27 is a diagram illustrating Quality of Service (QoS) messaging 2700, according to an illustrative embodiment of the present invention. That is, FIG. 27 illustrates how to use a message throughout the BLUETOOTH protocol stack to control QOS. Messages configuring and setting up QOS flow vertically up and down the layers of the stack, while the Link manager and Logical Link control and Adaptation layer (L2CAP) 1914 configures QOS in peer-to-peer negotiations. Link Manager 1976 actually implements QOS policies for it configures and controls the baseband links and has various means to try to meet the QOS which L2CAP 1914 requests.

The QoS messaging 2700 includes messages relating to QoS requirements 2705, QoS configuration success or failure 2710, QoS violations 2715, QoS setup 2720, link control 2725, and link information 2730. The messages are exchanged between, e.g., the higher layer protocols and application 1952, the L2CAP 1914, the HCI 1974, and the link manager 1976.

When a link is first set up, QOS is requested from the higher layer 1952 to L2CAP 1914. Then the negotiation packets 2799 of QOS configuration are sent between local and remote L2CAP 1914. The link manager 1976 provides QOS capabilities according to the requests from L2CAP 1914. On systems with an HCI 1974, this interaction between L2CAP 1914 and link manager 1976 is accomplished through a series of HCI commands and events. LMP commands 2798 can be used to configure the poll interval, the maximum interval between packets sent from Master to Slave, and the broadcast packet repeat times. QOS setup completion is generated when LMP has finished setting up. If LMP set up has failed, then a message will be sent back to higher layer to decide whether to try again or to give up. If LMP set up has succeeded, then the channel will open for transferring data at the desired QOS.

Even a channel has been configured, it is important that applications are aware whether their QOS is not as requested, as they may wish to either shut down the link rather than run it at an inappropriate quality, or shut down other links to improve this link. In such case, lower layers send QOS violation events to tell the higher layers and let them decide what to do about it.

Referring back to FIG. 1, a further description will now be given of some of the elements of the BLUETOOTH based integrated communication system 100 shown therein.

The BLUETOOTH Cordless Handsets 102 are bidirectional communication devices based on BLUETOOTH technology. These terminals have the capability to link with the cordless base station and exchange voice or data packets. The handsets 102 are configured in the slave mode and the cordless base station 114 is configured in the master mode. Based on the functional requirement of the Cordless handset 102, the appropriate usage profile is loaded. For example if a voice link is contemplated, then the cordless units 102 can either be assigned a hands-free profile or a more appropriate cordless telephone profile. The BLUETOOTH chip on the cordless base 114 can communicate with the Host Control Processor 124 to co-ordinate a variety of functions as dictated by the application.

The Audio Gateway 116 functions as the call agent for data exchange between the cell/PCS phone and the integrated communication System 100 and uses a BLUETOOTH device configured in a slave mode with hands-free profile. The Gateway functionally does the following things but not limited to the items listed below.

For an outgoing cell call, the audio gateway 116 makes an out going call over the cell phone 104, including: sending a command over BLUETOOTH Audio Gateway 116 to the cell phone 104 to "Dial" the number and initiate the call (the call is routed via Cellular Network rather than landline network); BLUETOOTH Voice channel set-up between the cell phone 104 and cordless handset 102.

For an outgoing cell call, the audio gateway 116 hangs-up the cell/PCS Handset, including: sending Call hang-up notification to cell phone.

For an outgoing cell call, the audio gateway 116 employs SMS/MMS/Dial up-Modem, including: the capability to upload/download Digital Images; the capability to get into Internet; the capability to send instant messages/Multimedia messages; adjusting the Audio level (volume); the ability to use Voice Recognition for dialing and control functions on the cell/PCS phone; and the ability to put Call on Hold.

For an incoming cell/PCS call, the audio gateway 116 detects the incoming call and shows CLIP information. If the User accepts/rejects the call, the cell phone is informed.

For a hang-up on a cell/PCS Handset, the audio gateway 116: sends call hang-up notification to cell phone; has the ability to put a call "on hold"; engage in a conference mode operation of the cell/PCS phone with POTS line; perform Cell/PCS Call re-routing through POTS line; has the capability to upload/download digital images; has the capability to collect information and control different products and appliances through the cellular network; has the capability to send instant messages/Multimedia messages; adjusts Audio level (volume); has the ability to put Call on Hold; has the ability to forward a voice message left by the Cell phone Caller to a designated person or group through a computer based dial up or through an independent (stand alone modem) by e-mailing an Wave or MP3 file.

Regarding the display and keyboard 118, the function of display 118 is to display various program menus as well as CLIP or other relevant information for the user. The display 118 prompts the user to pick the right cellular/PCS phone software module for inter-connectivity. It also prompts the user during software download operations. The keypad 118 allows dialing from the Access Point, selection of menus, software down load prompts, default settings, system configuration settings, instant messaging and Multimedia messaging.

Figure 28:
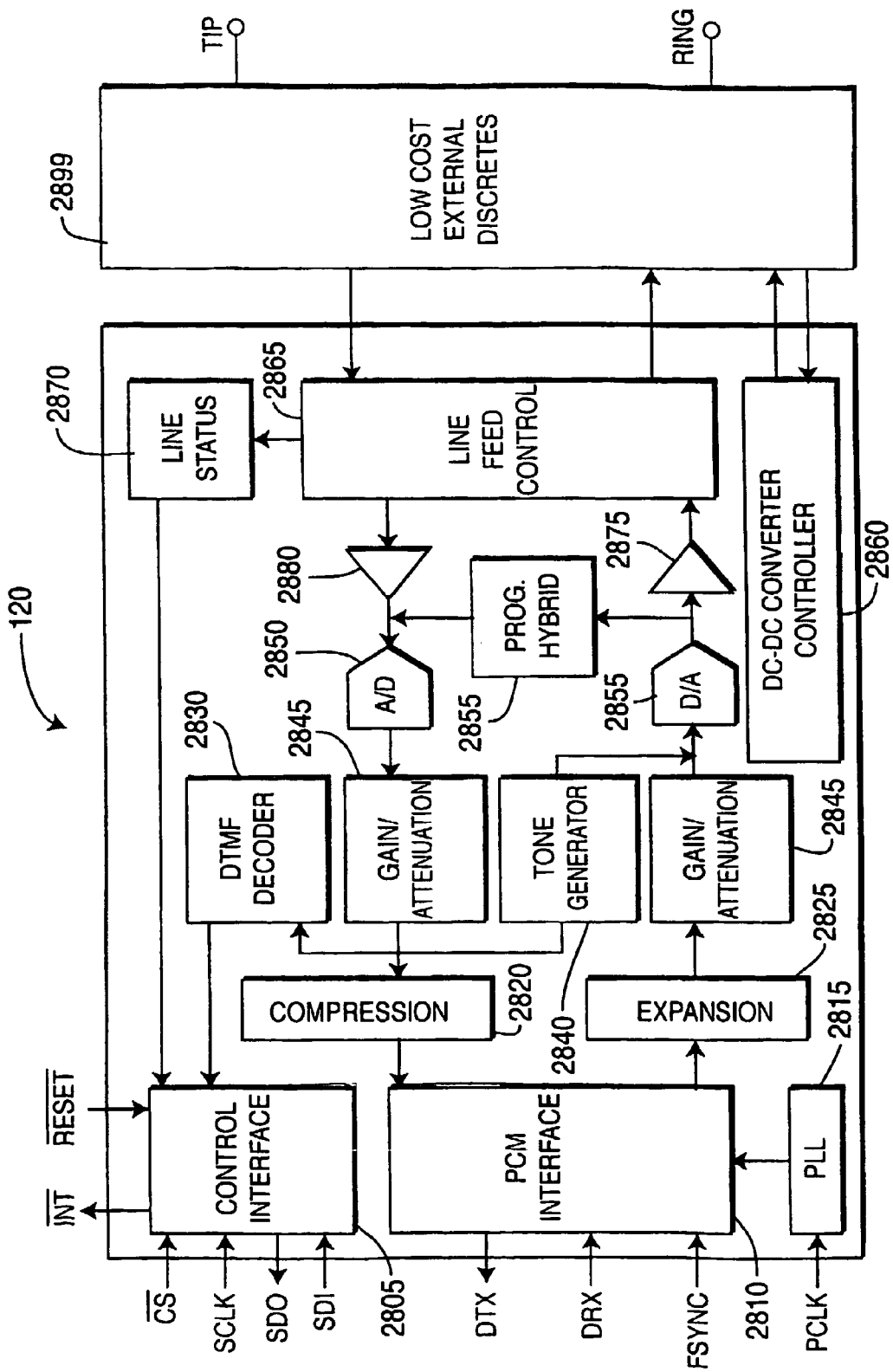
FIG. 28 is a diagram illustrating a BLUETOOTH based integrated communication system, according to an illustrative embodiment of the present invention.

FIG. 28 is a diagram further illustrating the Subscriber Line Interface Circuit (SLIC) 120 of FIG. 1, according to an illustrative embodiment of the present invention.

The SLIC 120 includes a control interface 2805, a PCM interface 2810, a PLL 2815, a compression module 2820, an expansion module 2825, a DTMF decoder 2830, a gain/attenuation module 2835, a tone generator 2840, another gain/attenuation module 2845, an Analog-to-Digital Converter 2850, a Digital-to-Analog Converter 2855, a DC-DC Converter Controller 2860, a line feed control module 2865, a line status module 2870, a first inverter 2875, a second inverter 2880, and a programming hybrid module 2885. The SLIC 120 includes and/or interfaces with, among other devices, low cost external discrete devices 2899.

The SLIC 120 provides a complete analog telephone line interface ideal for short loop (less than 2000 feet) applications. The SLIC 120 integrates the subscriber line interface circuit (SLIC), codec, and DC-to-DC converter controller 2860. The SLIC 120 also integrates a 5 REN ringing generator, DTMF decoder 2830, and dual-tone generator, further reducing the number of external components. The 5 REN ringing generator and the dual-tone generator are included in the tone generator 2840. The on-chip DC-to-DC converter controller 2860 enables the SLIC 120 to dynamically generate line voltages from a single 9V to 30V DC supply, eliminating the need for large negative voltage supplies and saving power. The SLIC 120 is programmable to meet global telephony standards, allowing single designs to be implemented worldwide for a variety of applications including cable telephony, wireless local loop, PBX, voice over IP, and ISDN terminal adapters. The SLIC 120 takes digital PCM signals and outputs an analog voltage over the POTS line and also takes an analog signal from the POTS line and converts it into a digital PCM stream for onward transmission. Besides these functions, the SLIC 120 can be programmed to send out Caller ID signals across the Tip and Ring outputs of the SLIC 120. In summary, the SLIC 120 duplicates almost all the functions that a central office traditionally does for the POTS line.

Regarding the POTS line switcher and DTMF decoder 122, the POTS line switcher is needed to connect the residential telephone to either the POTS line or the cellular line. This switching is important as the SLIC 120 cannot be connected to the Tip and Ring line while a POTS line call is being made. The isolation is needed to prevent the passage of DTMF signals on the Tip and Ring lines to the telephone central office, while signaling from a residential telephone connected to the SLIC for initiating a cell/PCS call. The POTS line switcher and DTMF decoder 122 is normally set for connectivity with the cellular network. However, this setting is user selectable and defaults to a POTS line connection during a power outage. The various connectivity options, for regular POTS phone integration with the system, will be detailed elsewhere herein. A separate DTMF decoder 122 is included in this block 122 to take in DTMF commands for the Host Controller 124, from a connected POTS telephone for the call control functions, while an active voice connection is on with a cell/PCS phone.

Regarding the Flash/SDRAM memory module 108, there are four critical functions for this module 108 as follows: 1) Software for BLUETOOTH Audio gateway 116; 2) Software for BLUETOOTH Cordless Base station 114; 3) Software for controlling the SLIC 120; and 4) Software for various Cellular Phone Profiles. The primary form of control and connectivity with the cellular telephone is established through ATtention (AT) commands that are specific to the particular cell/PCS phone that is being linked to the Access Point (AP).

The RS-232/Analog Audio Interface 112 allows the connection between the cell/PCS phone and the Access Point through hardwired means. The headset/microphone output from the cell phone (analog signals) is converted to a 13 bit linear PCM stream for onward transmission to a wireless system or to the SLIC 120 as may be appropriate. A data port is directly hard wired to the RS-232 connector on the Access Point, using the cell phone vendor's data cable or any other commercially compatible cable. In some cases, these cables would be USB terminated, in which case the USB connector 110 would be used for sending in the AT commands. In addition to this function, the RS232 port 112 and/or the USB port 110 allows an external computer to be connected for computer-enabled telephony by using the computer's telephony suite.

Figure 29:
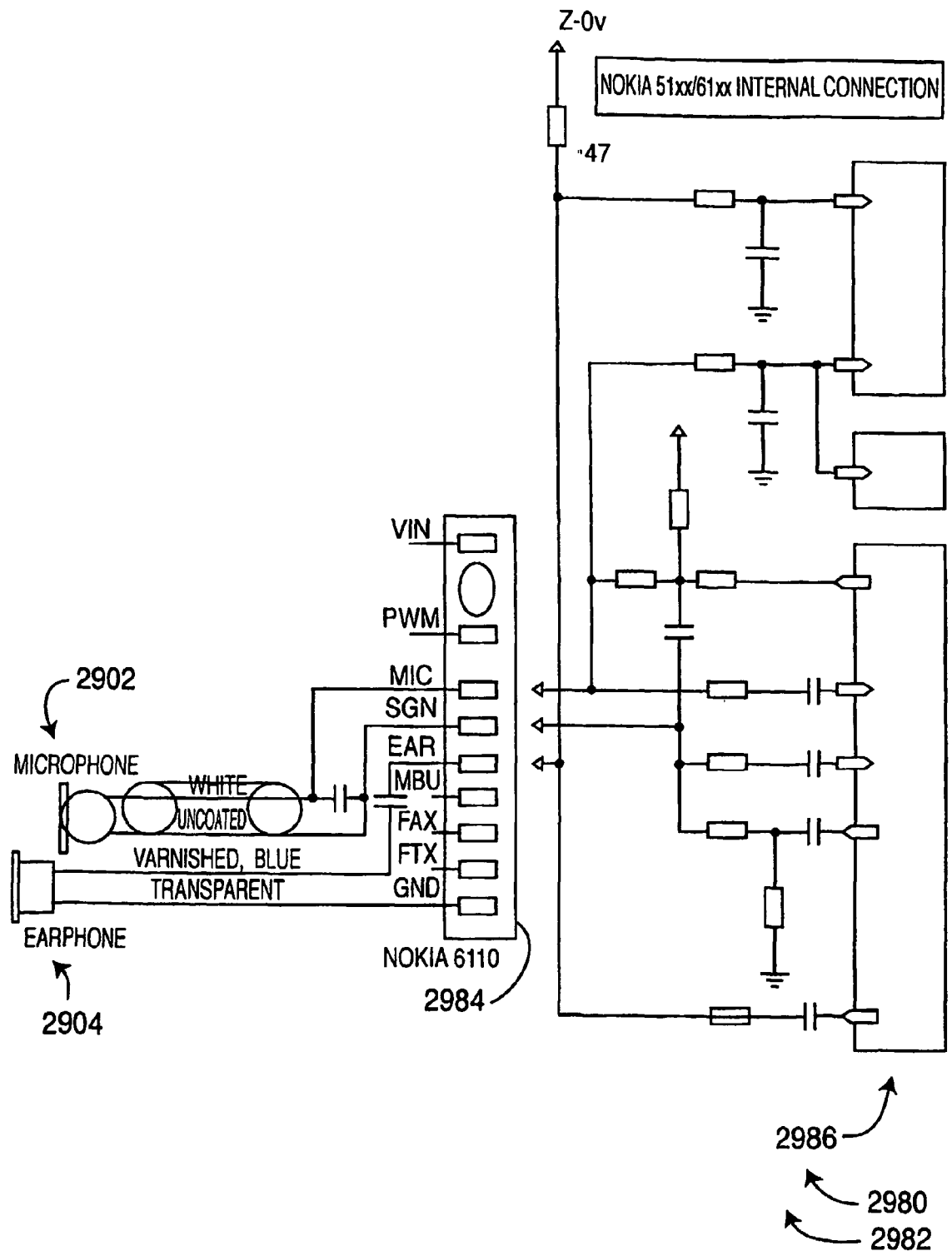
FIG. 29 is a diagram illustrating internal connections corresponding to an analog audio interface in a NOKIA 51xx/61xx cell phone 2900, according to the prior art.

Regarding the analog audio interface 112, FIG. 29 is a diagram illustrating internal connections corresponding to an analog audio interface in a NOKIA 51xx/61xx cell phone 2900, according to the prior art. The cell phone 2900 includes a microphone 2902, an earphone 2904, a plurality of capacitors 2980, a plurality of resistors 2982, a bus 2984, and a plurality of Integrated Circuits (ICs) 2986. The analog mic and audio signals can be routed to the SLIC 120, for interfacing with the POTS phone.

Figure 30:
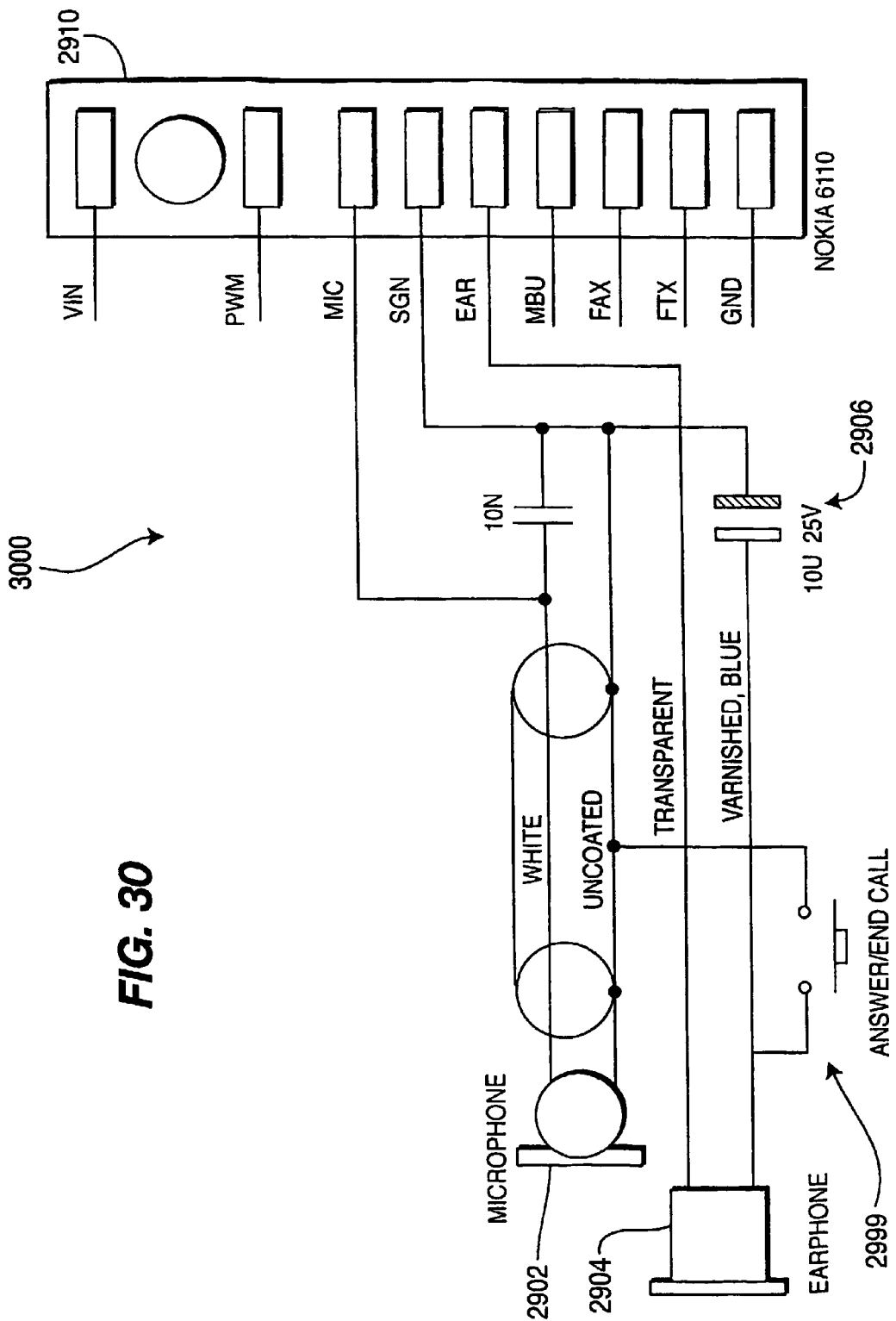
FIG. 30 is a diagram illustrating a modified NOKIA headset 3000 for an answer/end call feature, according to an illustrative embodiment of the present invention.

FIG. 30 is a diagram illustrating a modified NOKIA headset 3000 for an answer/end call feature, according to an illustrative embodiment of the present invention. The headset 3000 includes a microphone 2902, an earphone 2904, a plurality of capacitors 2906, a bus 2910, and a switch 2999.

In FIG. 30, the earphone signal is connected through switch 2999, which momentarily returns to the signal ground. When the switch 2999 is initiated, it is possible to take the cell phone from On-hook to Off-hook and vice versa. However, the configuration of FIG. 30 is not capable of extracting Calling Line Identity Presentation (CLIP) information from the cell phone unless communication is established with the cell phone's internal modem (not shown, but included in cell phone 104 shown in FIGS. 1 and 2).

For example, Nokia phones use two types of communication methods for data transmission and communications with the PCs: FBUS and M2BUS. Sending ring tones and graphics to a phone depends on whether it uses FBUS or M2BUS.

An M2BUS has the following characteristics: uses 5 pins; half-duplex communication; used in Nokia 21xx phones (data communication only); used for service and adjustment purposes; and up to 2 Mbps burst internal data speeds over the cable connection.

An FBUS has the following characteristics: high speed full-duplex communications between phone and PC; Nokia Data Suite™ v1.x and v2.x application uses only the FBUS transmission method; used in Nokia 3/5/7/8/9 series phones; used for data comms at 9/6/14.4 kbps to GSM network and PC; and used for service and adjustment operations.

When the FBUS or any other type of communication link is established with the cellular modem, either through a hardwired connection or through external BLUETOOTH, IrDA or Wi-Fi dongles, it is possible to establish connectivity to the Access Point and have the voice and data sent over the modem connection, by making use of the off-line command modes of the cellular modem. Alternatively, the modem can be used to perform data communication between the Access Point and the cell phone, whereas the audio is taken out of the analog audio and mic terminals for further processing.

Regarding Cell/PCS Modems and AT Commands: AT commands are used to: configure the phone to connect via an infrared port or the system bus; configure the phone to connect via a BLUETOOTH/Wi-Fi/IrDA port or the system bus; configure the modem to connect via an infrared port or the system bus; request information about the current configuration or operational status of the phone or the modem; and test availability in the phone or modem and, when applicable, request the range of valid parameters when applicable, for an AT command.

The built-in modem in the cell phone 104 can be set in any one of the following three modes of operation: Off-line command mode; On-line data mode; and On-line command mode.

In Off-line command mode, the built-in modem is placed in off-line command mode when first powered up and is ready for entry of AT commands.

On-line data mode allows "normal" operation of the built-in modem, exchanging data or facsimile with a remote modem.

In On-line command mode, it is possible to switch to on-line command mode when wanting to send AT commands to the built-in modem while still remaining connected to the remote modem.

Figure 31:
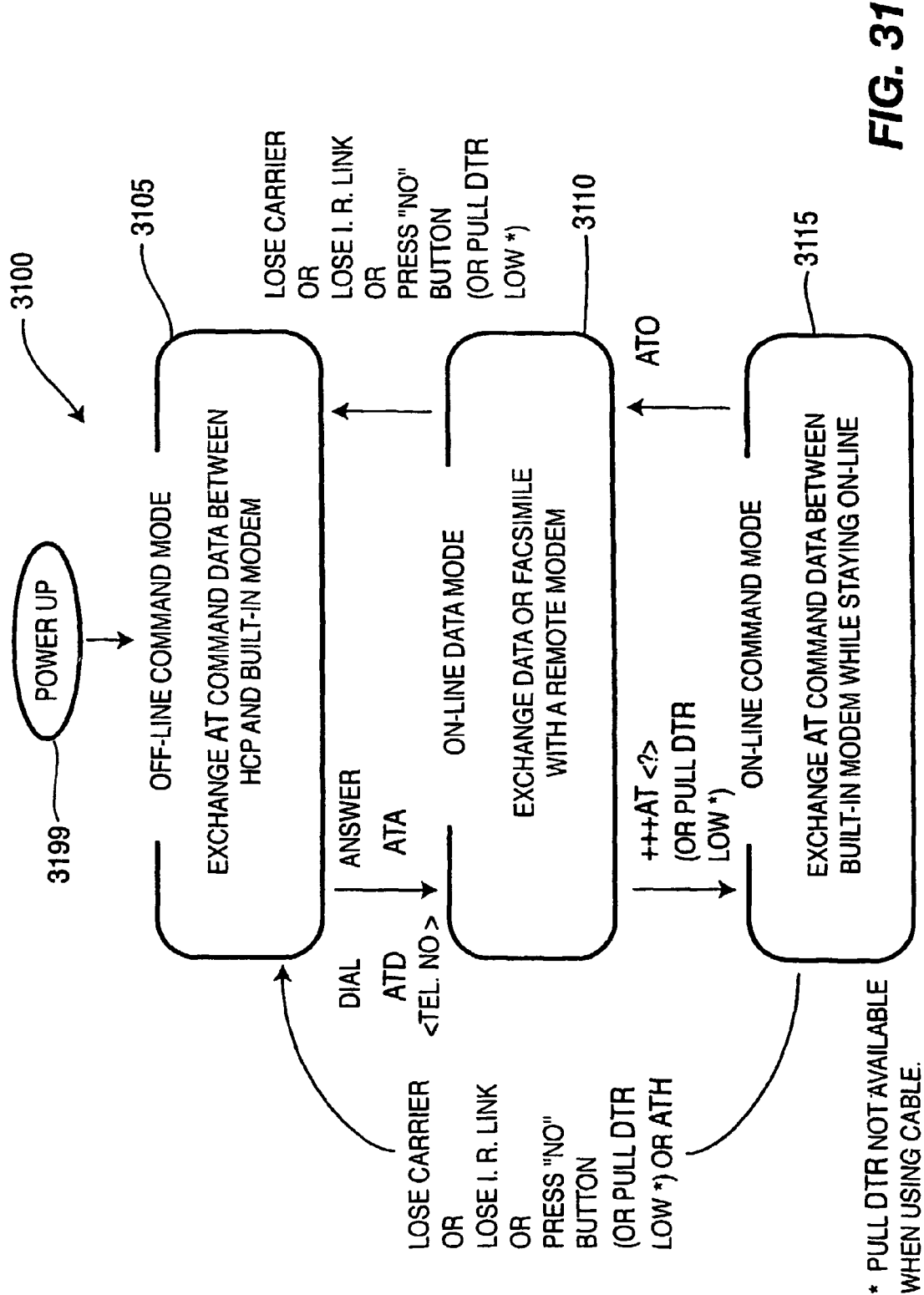
FIG. 31 is a diagram summarily illustrating methods used to switch between the three built-in modem-operating modes 3100 in an example Cell/Personal Communications System (PCS) phone (T68i) from SONY ERICSSON, according to an illustrative embodiment of the present invention.

FIG. 31 is a diagram summarily illustrating methods used to switch between the three built-in modem-operating modes 3100 in an example Cell/Personal Communications System (PCS) phone (T68i) from SONY ERICSSON, according to an illustrative embodiment of the present invention. The three built-in modem-operating modes 3100 include an off-line command mode 3105, an on-line data mode 3110, and an on-line command mode 3115. The three built-in modem-operating modes 3100 may be entered upon power up 3199.

In the off-line command mode 3105, the built-in modem accepts data as commands and not as normal communication traffic.

Regarding switching to the on-line data mode 3110, for data to be exchanged with the modem at the other end of the link, enter the ATD command followed by the telephone number to make the call. Alternatively, typing ATA to answer an incoming call will also place the built-in modem in the on-line data mode 3110.

Regarding switching back to the off-line command mode 3105, any of the following will return the built-in modem to the off-line command mode 3105 from the on-line data mode 3110: loss of the connection (NO CARRIER error); loss of the infrared link between the built-in modem and your computer; pressing the "NO" button on your mobile phone; and pulling DTR low (not available when using cable).

A description will now be given regarding using AT commands during a data connection, according to an illustrative embodiment of the present invention.

If we want to use AT commands while connected to a remote modem in the on-line data mode 3110 and maintain connection with the remote modem, first enter the on-line command mode 3105. There are two ways to switch from the on-line data mode 3110 to the on-line command mode 3115.

The first way to switch from the on-line data mode 3110 to the on-line command mode 3115 is to type the escape sequence "+++" followed by an appropriate AT command. This command must be selected from the options AT, ATE, ATH, ATI, ATL, ATM, ATQ, ATV, and ATX. Using this method, an AT function can be performed while moving into the on-line command mode 3115. For example, switching using the command

+++ATH<CR> switches the built-in modem to the on-line command mode 3115. The AT command is executed, causing the connection to be terminated (hang-up executed). Typing the escape sequence "+++" without any following command will cause the system to wait one second, switch to the on-line command mode 3115, and respond OK;

The second way to switch from the on-line data mode 3110 to the on-line command mode 3115 is to pull DTR low after previously setting AT&D=1.

To return to the on-line data mode 3110 while in the on-line command mode 3115, type:

ATO<CR>

To return the built-in modem to the off-line command mode 3105 from the on-line command mode 3115, use any of the methods described above with respect to switching back to the off-line command mode 3105; and type+++ATH<CR> to switch to the on-line command mode 3115 and hang up at once.

Regarding operating the AT commands, the following four types of commands can be issued: a set command to adjust the built-in modem's operating parameters; an execute command which directs action without the need of any parameters; a read command to view the current command settings; and a test command to view the available command parameters. Not all AT commands support all four functions.

The standard format for entering a set command is:
AT<command>=<parameters><CR>
where AT Notifies the built-in modem that a command is being entered.
<command> The name of the command being entered.
<parameters> The values to be used by the command.
<CR> All command lines are terminated by pressing the <CR> (Return or Enter) key.

Note: All command lines are completed by pressing the <CR> key on the computer keyboard.

To set the built-in modem to operate with autobaud over an asynchronous connection, the command line would be:
AT+CBST=0, 0, 1

However, the commands also have default settings. These are values that are presumed to have been entered when no actual value is placed in the command line. For example, the above command can be entered as:
AT+CBST=,,1

The default values used by the commands are indicated by bold text in the following descriptions.

When the parameter is a character string (for example "<name>"), then the value should be entered between quotes. For example "Peter". Optional parameters are shown in square brackets. For example, [<value>].

A description will now be given regarding entering an execute command.

Execute commands are very similar to set commands. They usually do not require any parameters and are used to obtain information about the mobile phone or built-in modem or to execute an event. For example, to find out information about the mobile phone battery, enter the +CBC command:
AT+CBC
The built-in modem responds:
+CBC: 0,60
indicating, that the mobile phone battery is connected (0) and that the remaining charge is 60%. To answer an incoming call, you execute the A command:
ATA A description will now be given regarding using the read command to view the command settings.

To check the current settings of a command, use the "?" option. For example, to check the current settings of the +CBST command, enter:
AT+CBST?
If CBST has been set according to the previous example, the settings are displayed as:
+CBST: 0,0,1

A description will now be given regarding using the test command to request command help.

To test the availability of a command and the range of parameters, use the ,=?™ option with the command. For example, to check the parameters available to the command line in the example above, enter:
AT+CBST=?
The line:
+CBST: (0,4,6,7,68,70,71),(0),(1)

is displayed indicating the range of valid entries that can be set for the parameters <data rate>, <bearer service>, and <connection element>.

Every cell/PCS has a set of AT commands that the phone modem supports. It is to be emphasized that different cell/PCS phones support different AT command lists. It is possible to write appropriate AT translators in the Access Point in order to establish either wired or optical/wireless connectivity between the cell/PCS phone and the Access Point.

The Host Control Processor (HCP) 124 is the "Brain" of the Access Point. The HCP 124 initiates the communication session with the rest of the connected peripherals.

The Host Control Processor 124 performs the following functions.

The Host Control Processor 124 pulls out the right cell phone signaling profile and initiates AT commands for communicating with the Cell Phone 104. AT commands are first sent to the Audio Gateway 116, which in turn, talks to the cellular data port through one of the four methods: (a) Hard wired Data Cable (either Cell phone vendor supplied or others); (b) embedded BLUETOOTH module; (c) External BLUETOOTH Dongle; and (d) Infra red (IrDA).

The Host Control Processor 124 co-ordinates the linking of multiple cell/PCS phones 104 to the Access Point.

The Host Control Processor 124 preloads the settings required on the SLIC 120 for proper functioning in the Transmit and receive modes.

The Host Control Processor 124 receives the CLIP information from the cell/PCS incoming call and displays on the local LCD screen and also formats this number for the SLIC 120 to perform Ring and Caller ID functions on a connected POTS type telephone instrument.

The Host Control Processor 124 decodes local Keypad entry

The Host Control Processor 124 co-ordinates the Audio/Command routing from the Audio Gateway 116 to the Cordless Base unit BLUETOOTH module 114.

The Host Control Processor 124 processes the DTMF signal from both the SLIC 120 as well as the external DTMF decoder 122 for translation to an appropriate AT command.

The Host Control Processor 124 allows USB and RS-232 connectivity with a computer, memory device or a stand-alone client, for new program down loads as well as other enabling services.

The Host Control Processor 124 does memory management

The Host Control Processor 124 performs AT command translation of any DTMF/any other Digital command for Call management control with cell/PCS and POTS line.

The Host Control Processor 124 performs Keypad scanning and display routines for menu services.

The Host Control Processor 124 performs configuration control for the integrated communication system.

The Host Control Processor 124 associates CLIP number of the caller on cell/PCS line with a name so that both field can be displayed on the Caller Identification (CID) display on the regular POTS telephone (cell calls only have a number but no name).

The Host Control Processor 124 generates polyphonic or distinctive ring patterns in order to differentiate between: a) a cell/PCS call and a POTS call; and b) between the different cell/PCS phones connected to the Access Point.

The USB Module 110 is primarily used to download software upgrades from a computer. As newer cell phone evolve, there would be a need to update the Cell Phone AT command library. Downloads can be through a connection to a USB smart storage device or to a computer. This connection can also be used to update cell phone ring tones, address books, CID listings and establish Internet connectivity through the cellular network. This port 110 is also important if we want to deploy Wav/MP3 based voice message e-mailing facility on this system.

A description will now be given of a connection methodology between a cell/PCS phone 104 and the Audio Gateway 116, according to an illustrative embodiment of the present invention.

Connection between the cell/PCS phone 104 and the Audio Gateway 116 is established through the link establishment of BLUETOOTH units in the cell phone 104 and the Audio Gateway 116. Both the cell phone 104 and the Audio Gateway 116 are configured in the Hands free profile so that AT commands can be passed back and forth between the Audio Gateway 116 and the cell phone 104, in either direction, while having the audio stream between the two devices go over an SCO channel. This ensures interruption free audio connectivity (separate data channel). A brief discussion on the BLUETOOTH hands-free mode of operation is described below.

Figure 32:
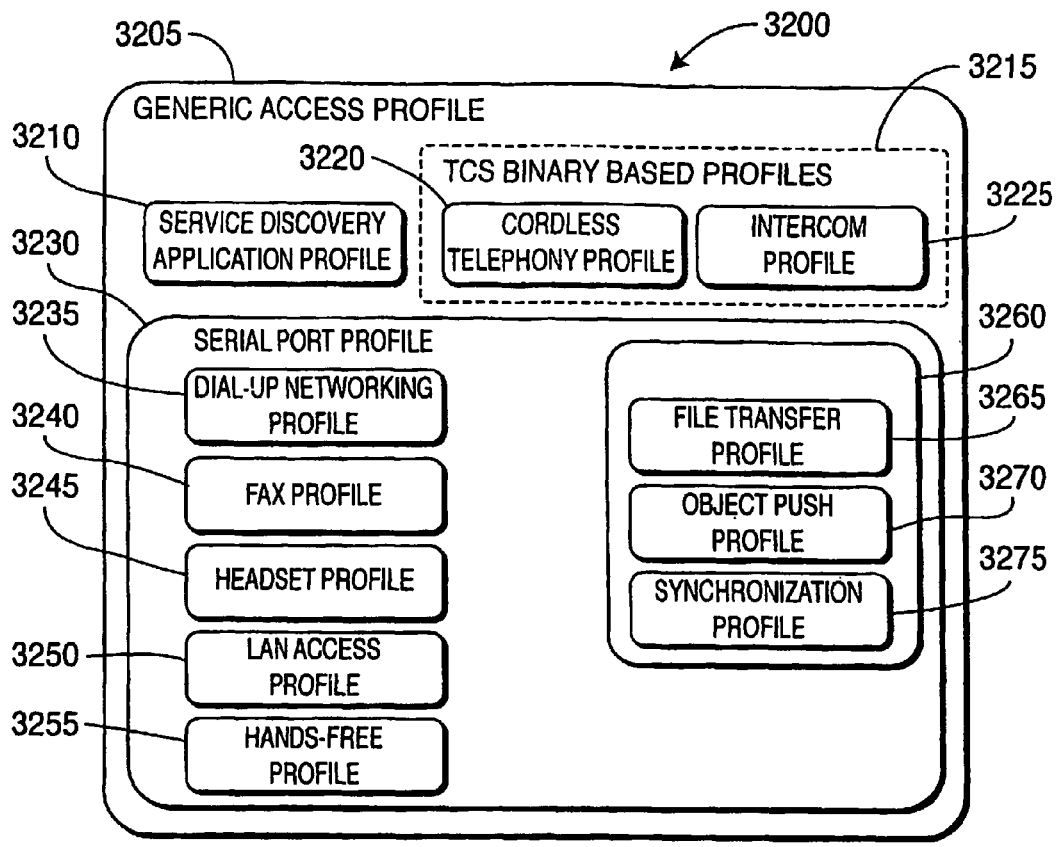
FIG. 32 is a diagram illustrating the BLUETOOTH profile structure 3200 and corresponding profile dependencies.

FIG. 32 is a diagram illustrating the BLUETOOTH profile structure 3200 and corresponding profile dependencies. A profile is dependent upon another profile if it re-uses parts of that profile, by explicitly referencing it.

The profiles include: a generic access profile 3205, a service discovery application profile 3210, TCS binary based profiles 3215, a cordless telephony profile 3220, an intercom profile 3225, a serial port profile 3230, a dial-up networking profile 3235, a fax profile 3240, a headset profile 3245, a LAN access profile 3250, a hands-free profile 3255, a generic object exchange profile 3260, a file transfer profile 3265, an object push profile 3270, and a synchronization profile 3275.

As indicated in FIG. 32, the hands-free profile 3255 is dependent upon both the serial port profile 3230 and the Generic Access Profile 3205. As another example, the object push profile 3270 is dependent upon the generic object exchange profile 3260, the serial port profile 3230, and the generic access profile 3205. Further, the intercom profile 3255 is dependent upon both the TCS binary based profiles 3215, and the generic access profile 3205.

Figure 33:
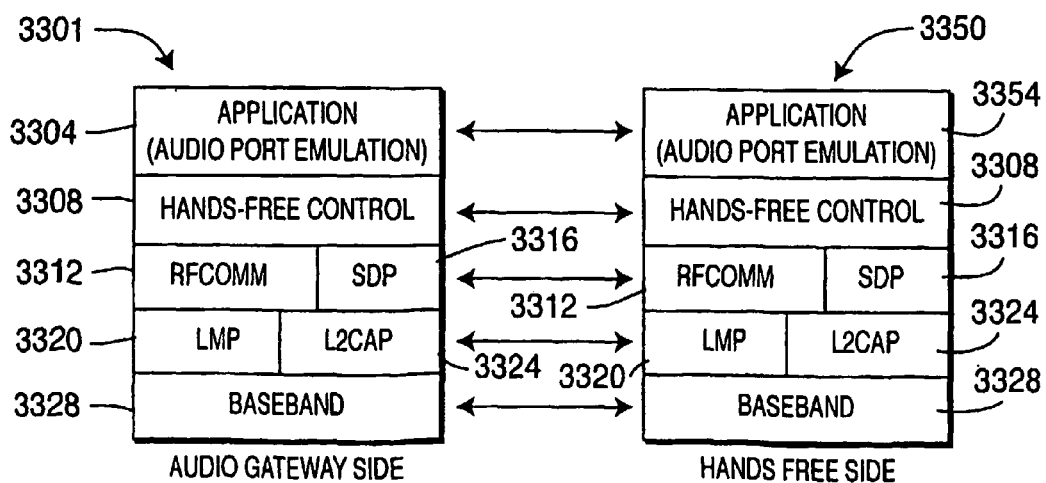
FIG. 33 is a diagram illustrating a hands-free protocol stack to which the present invention may be applied, according to an illustrative embodiment of the present invention.

FIG. 33 is a diagram illustrating a hands-free protocol stack to which the present invention may be applied, according to an illustrative embodiment of the present invention.

On an Audio Gateway side, a corresponding audio gateway protocol stack 3301 includes: an application layer (audio port emulation) 3304, a hands-free control layer 3308, an RFCOMM layer 3312, an SDP layer 3316, an LMP layer 3320, an L2CAP layer 3324, and a baseband layer 3328.

On a hands-free side, a corresponding hands-free protocol stack 3350 includes: an application layer (audio driver) 3354, a hands-free control layer 3308, an RFCOMM layer 3312, an SDP layer 3316, an LMP layer 3320, an L2CAP layer 3324, and a baseband layer 3328.

The baseband layer 3328, the LMP layer 3320, and the L2CAP layer 3324 are the Open Systems Interconnection (OSI) layer 1 and 2 BLUETOOTH protocols. The RFCOMM layer 3312 is the BLUETOOTH serial port emulation entity. The SDP layer 3316 is the BLUETOOTH Service Discovery Protocol. Compatibility to "Specification of the BLUETOOTH System", Core, Version 1.1, Feb. 22, 2001, incorporated by reference herein in its entirety, is preferred. Hands-Free control is the entity responsible for Hands-Free unit specific control signaling; this signaling is AT command based. Although not shown in the model above, it is presumed by this profile that Hands-Free Control has access to some lower layer procedures (for example, SCO link establishment).

The audio port emulation layer 3304 shown in FIG. 33 is the entity emulating the audio port on the Audio Gateway 116, and the audio driver 3354 is the driver software in the Hands-Free unit. For the shaded protocols/entities in FIG. 33, the Serial Port Profile is used as the base standard. For these protocols, all mandatory requirements stated in the Serial Port Profile apply, except in those cases where this specification explicitly states deviations.

The following roles are defined for this profile.

The Audio Gateway (AG) 116 is the device that is the gateway of the audio, both for input and output. According to the present invention, the Audio Gateway 116 acts the Access Point (AP) for integrating the cell/PCS phone 104 to the POTS line, carrying both voice as well as data between the Access Point, POTS phones and the cell/PCS phone 104 (the Cell Phone 104 has the same BLUETOOTH profile as the AG 116).

The Hands-Free unit (HF) is the device acting as the Audio Gateway's remote audio input and output mechanism. The HF also provides some remote control means. In this particular embodiment of the invention, the Hands Free unit is the external BLUETOOTH Dongle that allows a non-BLUETOOTH cell/PCS Phone to communicate with the Audio Gateway 116.

FIG. 34 is a diagram illustrating features 3400 supported in the Audio Gateway 116 and features 3450 supported in the Hands-Free unit (HF), according to an illustrative embodiment of the present invention. The features supported in the Audio Gateway 116 are shown in the left table 3470 in FIG. 34. The features supported in the Hands-Free unit (HF) are shown in the right table 3480. In FIG. 34, "M" indicates mandatory compliance and "O" indicates optional compliance to the BLUETOOTH Hands-free profile standards.

A description will now be given regarding user requirements and scenarios, according to an illustrative embodiment of the present invention.

The following rules apply to this profile:

(a) The profile states the mandatory and optional features when the "Hands-Free Profile" is active in the Audio Gateway 116 and the Cell phone 104.

(b) The profile mandates the usage of CVSD or PCM for transmission of audio (over the BLUETOOTH link). The resulting audio is monophonic, with a quality that, under normal circumstances, does not have perceived audio degradation.

(c) Between the Cell phone 104 and the Audio Gateway 116, only one audio connection at a time is supported. This means if there are two cell phones connected to the Audio Gateway 116, both of them cannot simultaneously send audio to the Audio Gateway 116.

(d) Both the Audio Gateway 116 and the cell phone 104 may initiate audio connection establishment and release. Valid speech data shall exist on the SCO link in both directions after the audio connection is established.

(e) Whenever an "audio connection" exists, a related "Service Level Connection" shall also exist.

(f) The presence of a "Service Level Connection" shall not imply that an "audio connection" exists. Releasing a "Service Level Connection" shall also release any existing "Audio Connection" related to it.

A description will now be given regarding hands-free control interoperability requirements, according to an illustrative embodiment of the present invention.

The procedures described hereinafter are primarily based on the use of a minimum set of AT commands as the control protocol. These AT commands and their result codes are described below. Moreover, how Service Level Connections are handled in general are also described below, including how the layers beneath the Hands-Free unit Control entity are used to establish and release a Service Level Connection.

A description will now be given regarding service level connection establishment, according to an illustrative embodiment of the present invention.

Upon a user action or an internal event, either the cell phone or the Audio Gateway 116 may initiate a Service Level Connection establishment procedure. A Service Level Connection establishment requires the existence of a RFCOMM connection, that is, a RFCOMM data link channel between the cell phone 104 and the Audio Gateway 116. Both the cell phone 104 and the Audio Gateway 116 may initiate the RFCOMM connection establishment. If there is no RFCOMM session between the Audio Gateway 116 and the cell phone 104, the initiating device shall first initialize RFCOMM. The RFCOMM connection establishment shall be performed as defined by the BLUETOOTH standards for Generic Access Profile 3205 and Serial Port Profile 3230.

A description will now be given regarding service level connection initialization, according to an illustrative embodiment of the present invention.

FIG. 35 is a diagram illustrating service level connection initialization 3500, according to an illustrative embodiment of the present invention.

When an RFCOMM connection has been established (3501) the Service Level Connection Initialization procedure 3500 shall be executed. First, in the initialization procedure the Audio Gateway 116 shall send the AT+BRSF=<AG supported features> command to the cell phone 104 (3504), to both notify the cell phone 104 of the supported features in the Audio Gateway 116, as well as to retrieve the supported features in the cell phone 104 using the +BRSF result code (3508). An OK message is the sent from the cell phone 104 to the Audio Gateway 116 (3512).

After having retrieved the supported features in the cell phone 104, the Audio Gateway 116 shall determine which indicators are supported by the cell phone, as well as the ordering of the supported indicators. This is because, according to the GSM 07.07 Technical Specification, Version 5.0.0, July 1996, the cell phone may support additional indicators not provided for by the Hands-Free Profile, and because the ordering of the indicators is implementation specific. The GSM 07.07 Technical Specification is incorporated by reference herein in its entirety. The Audio Gateway 116 uses the AT+CIND=? test command to retrieve information about the supported indicators and their ordering (3516). The cell phone 104 then sends a +CIND: . . . command to the Audio Gateway 116 (3520), as well as an OK message (3524).

Once the Audio Gateway 116 has the necessary supported indicator and ordering information, the Audio Gateway 116 shall retrieve the current status of the indicators in the cell phone 104 using the AT+CIND read command (3528). Retrieval of the information by the Audio Gateway 116 from the cell phone 104 also involves the cell phone 104 sending a +CIND: . . . command to the Audio Gateway 116 (3532), as well as an OK message (3536).

After having retrieved the status of the indicators in the cell phone, the AG shall then enable the "Indicators status update" function in the cell phone by issuing the AT+CMER command (3540), to which the cell phone will respond with an OK message 3544. As a result, the cell phone can send the +CIEV unsolicited result code with the corresponding indicator value whenever a change in service, call, or call setup status occurs.

When an update is required for both the call and call setup indicators, the cell phone will send the +CIEV unsolicited result code for the call indicator before sending the +CIEV unsolicited result code for the call setup indicator. The Audio Gateway 116 shall use the information provided by the +CIEV code to update its own internal and/or external indications.

Once the "Indicators status update" function has been enabled, the cell phone will keep the function enabled until either the AT+CMER command is issued to disable it, or the current Service Level Connection between the Audio Gateway 116 and the cell phone 104 is dropped for any reason. After that the Audio Gateway 116 has enabled the "Indicators status update" function in the cell phone, and if the "Call waiting and 3-way calling" bit was set in the supported features bitmap by both the cell phone 104 and the Audio Gateway 116, the Audio Gateway 116 shall issue the AT+CHLD=? test command to retrieve the information about how the call hold and multiparty services are supported in the cell phone (3548). The cell phone then sends +CHLD: . . . command 3552 to the Audio Gateway, as well as an OK message 3556. The Audio Gateway 116 shall not issue the AT+CHLD=? test command in case either the cell phone 104 or the Audio Gateway 116 does not support the "3-way calling" feature.

The Audio Gateway 116 will consider the Service Level Connection to being fully initialized, and thereby established (3580), in either of the following cases.

The Audio Gateway 116 will consider the Service Level Connection to being fully initialized, and thereby established after the Audio Gateway 116 has successfully retrieved information about how call hold and multiparty services are supported in the cell phone 104 using the AT+CHLD command, if and only if the "Call waiting and 3-way calling" bit was set in the supported features bitmap for both the cell phone 104 and the Audio Gateway 116.

The Audio Gateway 116 will consider the Service Level Connection to being fully initialized, and thereby established after the Audio Gateway 116 has successfully enabled the "Indicator status update" using the AT+CMER command, if and only if the "Call waiting and 3-way calling" bit was not set in the supported features bitmap for either the cell phone 104 or the Audio Gateway 116. The cell phone 104 will consider the Service Level Connection to be fully initialized, and thereby established, in either of the following cases.

The Audio Gateway 116 will consider the Service Level Connection to being fully initialized, and thereby established after the cell phone 104 has successfully responded with information about how call hold and multiparty services are supported in the cell phone using +CHLD as well as responded OK, if the "Call waiting and 3-way calling" bit was set in the supported features bitmap for both the cell phone 104 and the Audio Gateway 116.

The Audio Gateway 116 will consider the Service Level Connection to being fully initialized, and thereby established after the cell phone 104 has successfully responded with OK to the AT+CMER command (to enable the "Indicator status update" function), if the "Call waiting and 3-way calling" bit was hot set in the supported features bitmap for either the cell phone 104 or the Audio Gateway 116.

A description will now be given regarding link loss recovery from an Audio Gateway 116, according to an illustrative embodiment of the present invention.

The Audio Gateway 116 may reconnect with the cell phone 104 whenever there is loss of BLUETOOTH link. When a Service Level Connection is disconnected due to explicit termination at one end (using the "Service connection release" as described below), then both devices (Audio Gateway 116 and cell phone 104) shall wait for an explicit user action before an attempt is made to re-establish the Service Level Connection. If the Audio Gateway 116 determines that the Service Level Connection was disconnected due to a link supervision timeout, then the Audio Gateway 116 may execute the "Service Level Connection establishment" procedure as described above to establish a new Service Level Connection to the cell phone 104. Following a link loss due to link supervision timeout, the Audio Gateway 116 shall not assume that the service level connection state from the previous connection is valid (such as Call Status, Service Status).

A description will now be given regarding service level connection release, according to an illustrative embodiment of the present invention.

Figure 36:
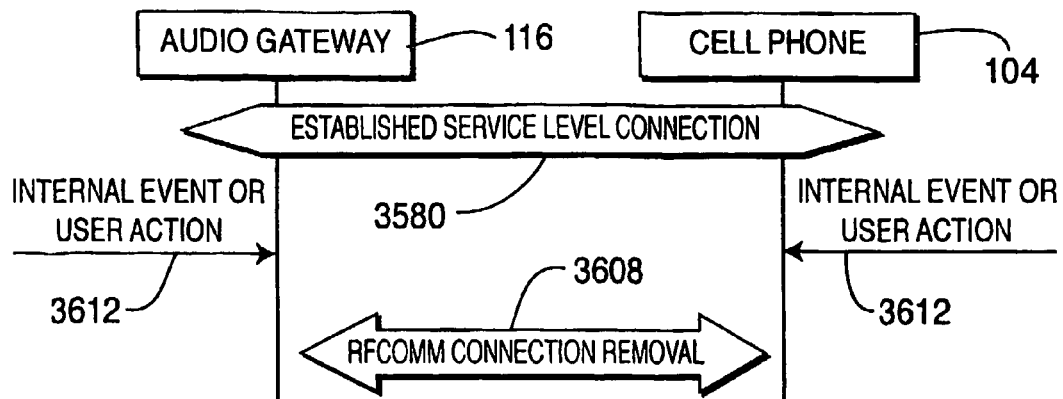
FIG. 36 is a diagram illustrating a service level connection release, according to an illustrative embodiment of the present invention.

FIG. 36 is a diagram illustrating a service level connection release, according to an illustrative embodiment of the present invention.

The disconnection of an established Service Level Connection 3580 shall immediately mean the removal of the corresponding RFCOMM data link channel between the cell phone 104 and the Audio Gateway 116 (3608). Also, an existing audio connection has to be removed as consequence of the removal of the Service Level Connection. The removal of the L2CAP 3324 and link layers is optional. An established Service Level Connection shall be released using a "Service Level Connection removal" procedure.

The "Service Level Connection removal" procedure can be initiated by an explicit user request by either the cell phone 104 or the Audio Gateway 116 (3612).

The "Service Level Connection removal" procedure shall be initiated if the BLUETOOTH functionality is disabled in either the cell phone 104 or the Audio Gateway 116.

The "Service Level Connection removal" procedure may be initiated if an "Audio Connection transfer towards the cell phone", is performed during an ongoing call in the cell phone 104. In case that the Service Level Connection is removed, the cell phone 104 will attempt to re-establish the Service Level Connection, once the call has been dropped. As a pre-condition for this procedure, an ongoing Service Level Connection between the Audio Gateway 116 and the cell phone 104 must exist.

A description will now be given regarding the transfer of registration status, according to an illustrative embodiment of the present invention.

Figure 37:
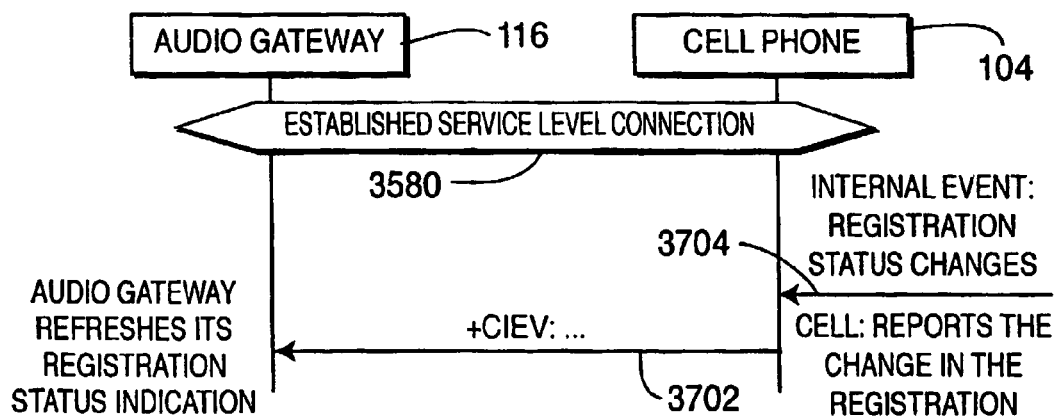
FIG. 37 is a diagram illustrating a transfer of registration status, according to an illustrative embodiment of the present invention.

FIG. 37 is a diagram illustrating a transfer of registration status, according to an illustrative embodiment of the present invention.

The AT+CMER command, as described above, enables the "Registration status update" function in the cell phone 104 (3704). When this function is enabled, the cell phone 104 will send the +CIEV unsolicited result code with the corresponding service indicator and value to the Audio Gateway 116 whenever the cell phone registration status changes (3702). The Audio Gateway 116 shall be capable of interpreting the information provided by the +CIEV result code to determine the service availability status. As a pre-condition for this procedure, an ongoing Service Level Connection 3580 between the Audio Gateway 116 and the cell phone 104 will exist. If this connection does not exist, the cell phone 104 will autonomously establish the Service Level Connection using the procedure as described above.

A description will now be given regarding transfer of call and call setup status, according to an illustrative embodiment of the present invention.

The AT+CMER command, as described above, enables the "Call Status indicators update" function in the cell phone. When this function is enabled, the cell phone will issue a +CIEV unsolicited result code with the corresponding call indicator and value whenever the cell phone's current call status changes. Likewise, the Audio Gateway 116 will issue a +CIEV unsolicited result code with the corresponding call setup indicator and value whenever the cell phone's current call setup status changes. The Audio Gateway 116 will be capable of interpreting the information provided by the +CIEV result code to determine the call status. Furthermore, the cell phone unit may also be capable of interpreting the optional call setup state information provided by the +CIEV result code.

A description will now be given regarding an audio connection setup, according to an illustrative embodiment of the present invention.

Figure 38:
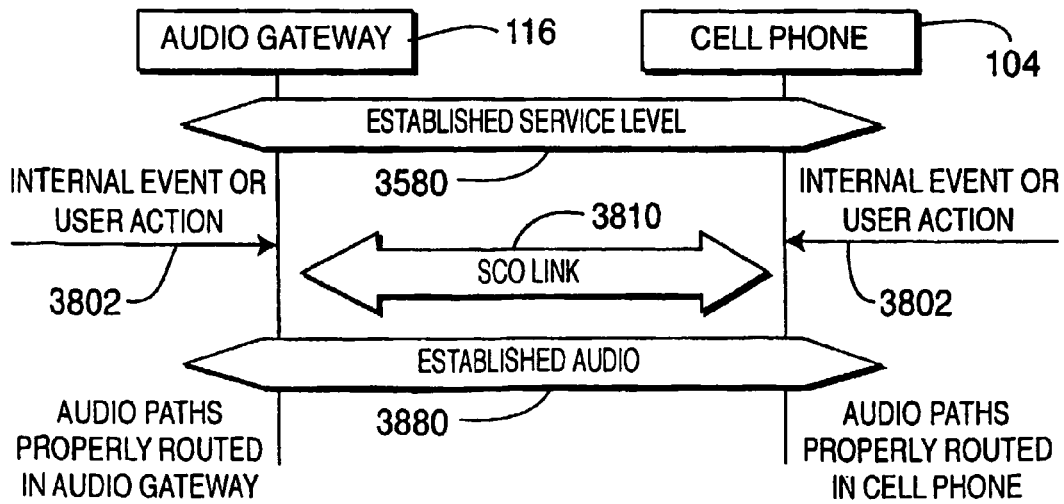
FIG. 38 is a diagram illustrating an audio connection setup, according to an illustrative embodiment of the present invention.

FIG. 38 is a diagram illustrating an audio connection setup, according to an illustrative embodiment of the present invention.

Upon a user action or an internal event (3802), either the cell phone 104 or the Audio Gateway 116 may initiate the establishment of an Audio Connection whenever necessary. Further internal actions may be needed by the cell phone 104 or the Audio Gateway 116 to internally route the audio paths. An Audio Connection set up procedure always means the establishment of a SCO link (3810) and it is always associated with an existing Service Level Connection (3580). In principle, setting up an Audio Connection by using the procedure described herein is not necessarily related to any call process. Once an Audio Connection (3880) between the cell phone 104 and the Audio Gateway 116 exists, the cell phone will utilize the Audio Gateway 116 as its sole audio port. The cell phone 104 will keep the audio paths, call related or not, routed (3820) towards the Audio Gateway 116 for all the operations (e.g. voice, alert, key press tones) involving the presence of audio.

As a pre-condition for this procedure, an ongoing Service Level Connection 3580 between the Audio Gateway 116 and the cell phone 104 shall exist. If this connection 3580 does not exist, the initiator of the procedure shall autonomously establish the Service Level Connection using the proper procedure as described above.

Both the initiator and the acceptor will notify the presence of the new Audio Connection. The incoming Audio Connection can be rejected by "releasing" it (as described below).

A description will now be given regarding audio connection release, according to an illustrative embodiment of the present invention.

Upon a user action or an internal event, either the cell phone 104 or the Audio Gateway 116 may release an existing Audio Connection 3880, whenever necessary. An Audio Connection removal always means the disconnection of its corresponding SCO link 3810. When the audio connection is released, the audio paths will be routed back to the cell/PCS phone 104. In principle, removing an Audio Connection by using the procedure described in this section is not necessarily related to any call process. As a pre-condition for this procedure, an ongoing Audio Connection 3880 between the Audio Gateway 116 and the cell phone 104 shall exist.

A description will now be given regarding answering an incoming call, according to an illustrative embodiment of the present invention.

Figure 39:
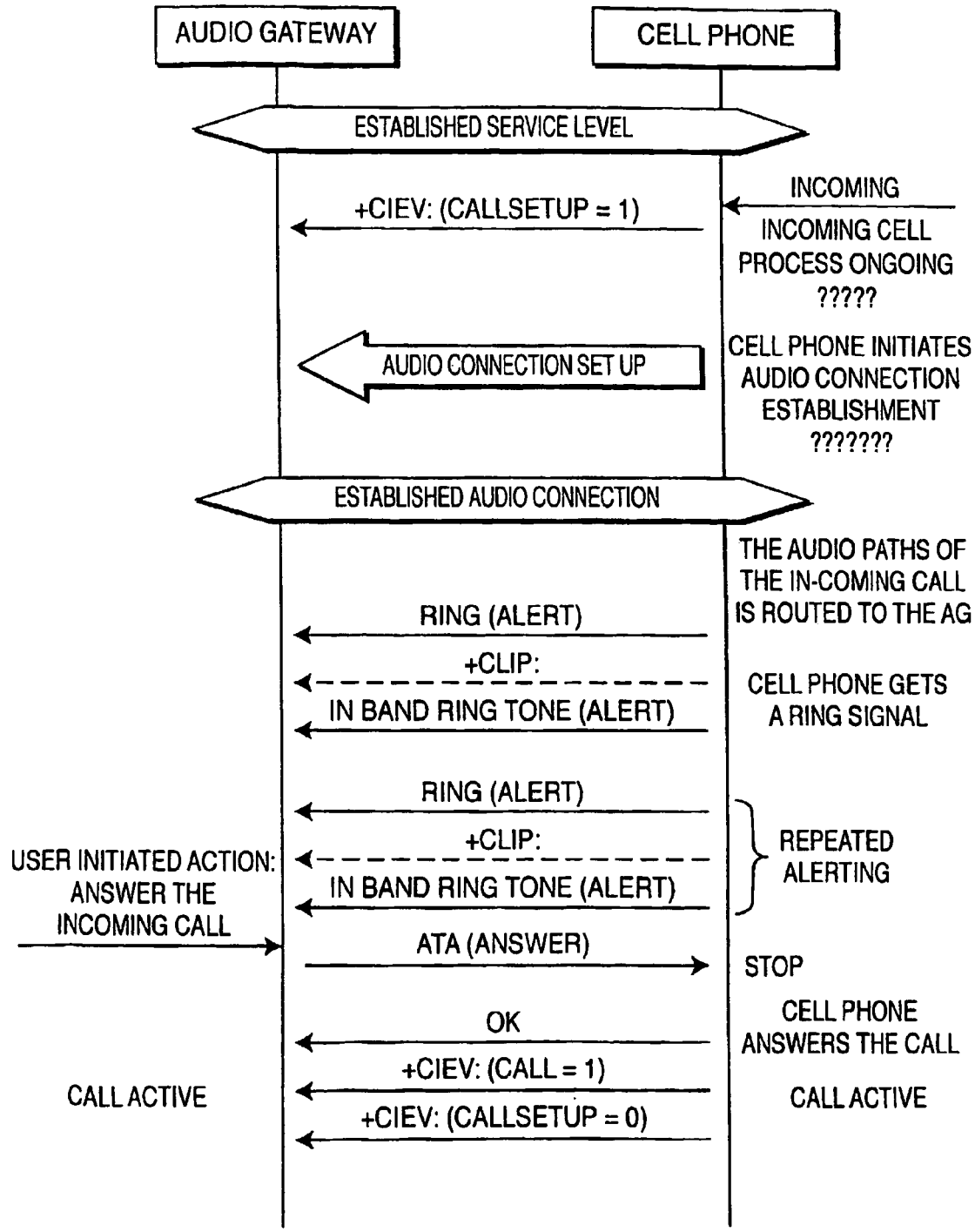
FIG. 39 is a diagram illustrating a method for answering an incoming call, according to an illustrative embodiment of the present invention.

FIG. 39 is a diagram illustrating a method for answering an incoming call, according to an illustrative embodiment of the present invention.

With an established service level (3904), an SCO link may be established between the Audio Gateway 116 and the cell phone 104 (3908). An audio connection is then established (3910).

Upon an incoming call, the cell phone 104 will send a sequence of unsolicited RING alerts to the Audio Gateway (Access Point) 116. The RING alert shall be repeated for as long as the call acceptance is pending, or until the incoming call is interrupted for any reason. The Audio Gateway 116 can produce a local alert (e.g. a ring tone) in reaction to the RING. The Audio Gateway 116 can abort the incoming ring call any time it wants.

A description will now be given regarding terminating a call process from the Audio Gateway 116, according to an illustrative embodiment of the present invention.

Figure 40:
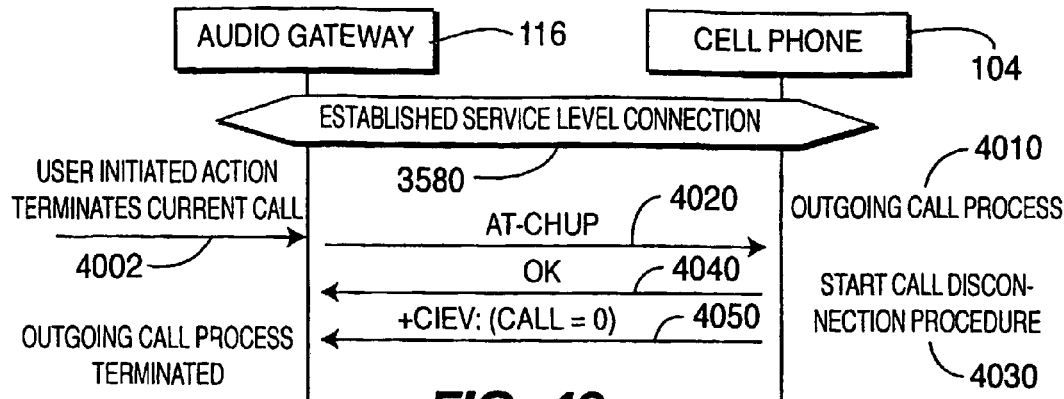
FIG. 40 is a diagram illustrating a method for terminating a call process from the Audio Gateway 116, according to an illustrative embodiment of the present invention.

FIG. 40 is a diagram illustrating a method for terminating a call process from the Audio Gateway 116, according to an illustrative embodiment of the present invention.

Either the cell phone 104 or the Audio Gateway 116, by means of a user action or any other event (4002), may terminate an ongoing call procedure. The following pre-conditions apply for this procedure. One such pre-condition is that an ongoing Service Level Connection between the Audio Gateway 116 and the cell phone 104 shall exist (3580). If this connection does not exist, the Audio Gateway 116 shall autonomously establish the Service Level Connection using the proper procedure as described above. Another such pre-condition is that a call related process (4010) is ongoing in the AG. Although not required for the call termination process, an Audio Connection is typically present between the Cell phone and AG.

The user may abort the ongoing call process using whatever means provided by the Audio Gateway 116. The Audio Gateway 116 shall send an AT+CHUP command to the cell phone 104 (4020), and the cell phone 104 will then start the procedure to terminate or interrupt the current call procedure (4030). The cell phone 104 will then send an OK message (4040) followed by the +CIEV result code, with the value indicating (call=0) (4050). Performing a similar procedure, the AT+CHUP command described above may also be used for interrupting a normal outgoing call set-up process. Although not required for the call termination process, an Audio Connection is typically present between the HF and AG.

A description will now be given regarding placing a call with a phone number supplied by an Audio Gateway 116, according to an illustrative embodiment of the present invention.

Figure 41:
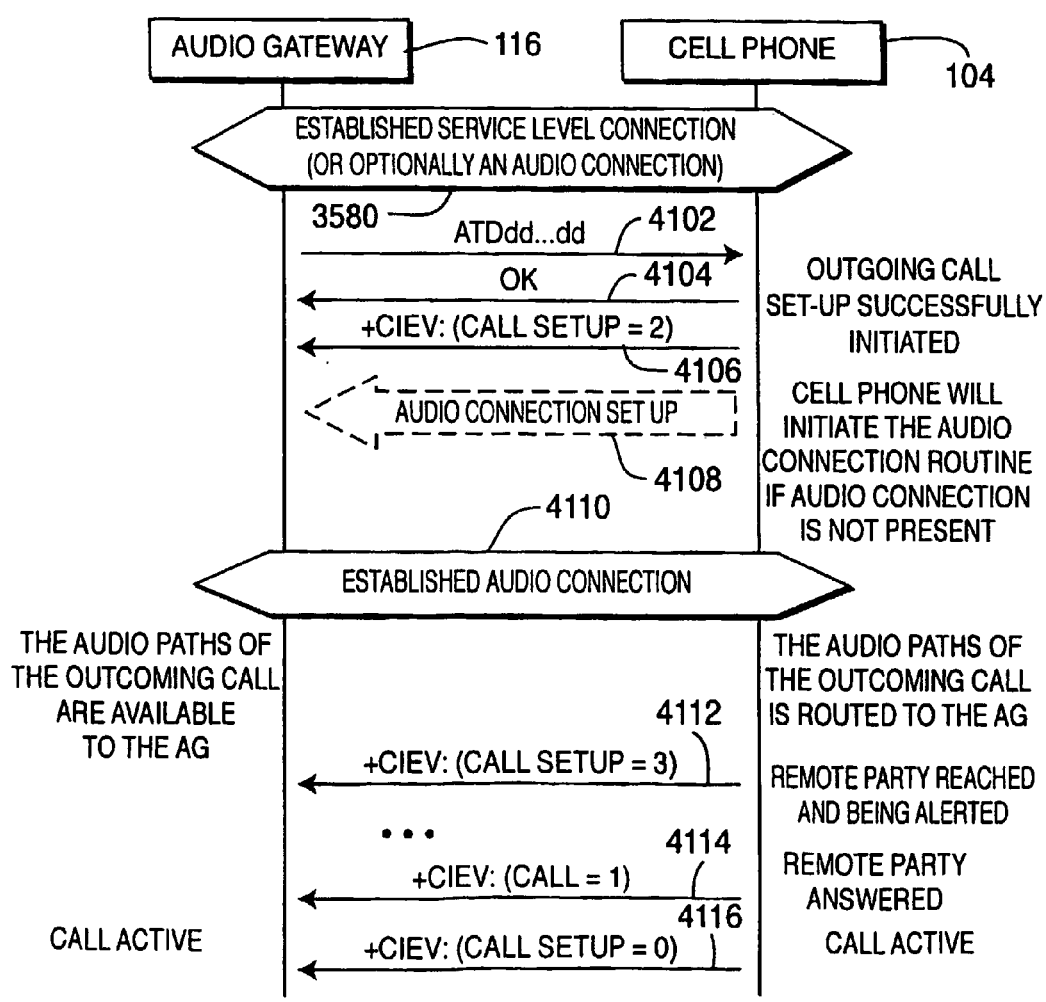
FIG. 41 is a diagram illustrating a method for placing a call with a phone number supplied by an Audio Gateway 116, according to an illustrative embodiment of the present invention.

FIG. 41 is a diagram illustrating a method for placing a call with a phone number supplied by an Audio Gateway 116, according to an illustrative embodiment of the present invention.

The Audio Gateway 116 may initiate outgoing voice calls by providing the destination phone number to the cell phone 104. To start the call set-up, the Audio Gateway 116 will initiate the Service Level Connection establishment, if necessary, and send a proper ATDdd . . . dd command to the cell phone 104 (4102). The cell phone 104 will then send an OK message to the Audio Gateway 116 (4104), start the call establishment procedure using the phone number received from the Audio Gateway 116 and issue the +CIEV result code, with the value (call setup=2) to notify the Audio Gateway 116 that the call set-up has been successfully initiated (4106).

As pre-condition for this procedure, an ongoing Service Level Connection (3580) between the Audio Gateway 116 and the cell phone 104 exists. If this connection does not exist, then the Audio Gateway 116 will autonomously establish the Service Level connection using the proper procedure as described above.

If an Audio Connection is not established, the cell phone 104 will begin setting up (4108) the audio connection to establish the proper Audio Connection (4110) and route the audio paths of the outgoing call to the Audio Gateway 116 immediately following the commencement of the ongoing call set up procedure. Once alerting of the remote party begins, the cell phone 104 will issue the +CIEV result code, with the value indicating (call setup=3) (4112). The +CIEV result code is used to report states as "call=1") (4114). If the normal outgoing call establishment procedure is interrupted for any reason, the cell phone 104 will issue the +CIEV result code, with the value indicating (call setup=0) (4116), to notify the Audio Gateway 116 of this condition. If the cell phone 104 supports the "Three-way calling" feature and if a call is already ongoing in the cell phone 104, performing this procedure shall result in a new call being placed to a third party with the current ongoing call put on hold.

A description will now be given regarding Calling Line Identification (CLI) notification, according to an illustrative embodiment of the present invention.

Figure 42:
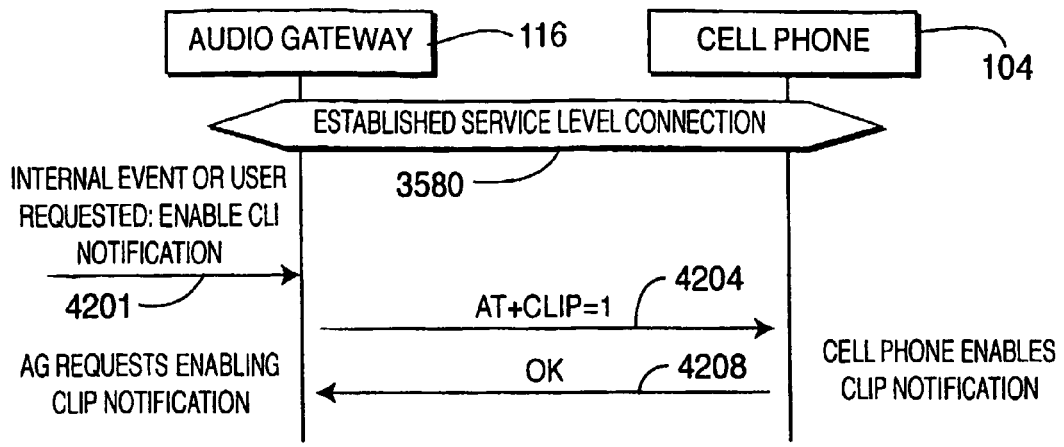
FIG. 42 is a diagram illustrating a method for performing Calling Line Identification (CLI) notification, according to an illustrative embodiment of the present invention.

FIG. 42 is a diagram illustrating a method for performing Calling Line Identification (CLI) notification, according to an illustrative embodiment of the present invention.

An internal event or a user request may be directed to enabling CLI notification (4201). The Audio Gateway 116 may issue the AT+CLIP command to enable the "Calling Line Identification notification" function in the Cell phone (4204). If the calling subscriber number information is available from the network, the Cell phone will issue the +CLIP unsolicited result code just after every RING indication when the Audio Gateway 116 is alerted in an incoming call.

Once the Audio Gateway 116 issues the AT+CLIP command, the cell phone 104 will respond with an OK message (4208). The cell phone 104 will then keep the "Calling Line Identification notification" enabled until either the AT+CLIP command is issued by the Audio Gateway 116 to disable it, or the current Service Level Connection between the Audio Gateway 116 and the cell phone 104 is dropped for any reason. As pre-condition for this method, an ongoing Service Level Connection between the Audio Gateway 116 and the Cell phone will exist (3580). If this connection does not exist, the Audio Gateway 116 will autonomously establish the Service Level Connection using the proper procedure as described earlier.

A description will now be given regarding integration of an Audio Gateway 116 into the residential telephone network, according to an illustrative embodiment of the present invention.

There are several ways by which the audio and data from the cell/PCS phone 104 may be distributed over the telephone network in the home.

Figure 43:
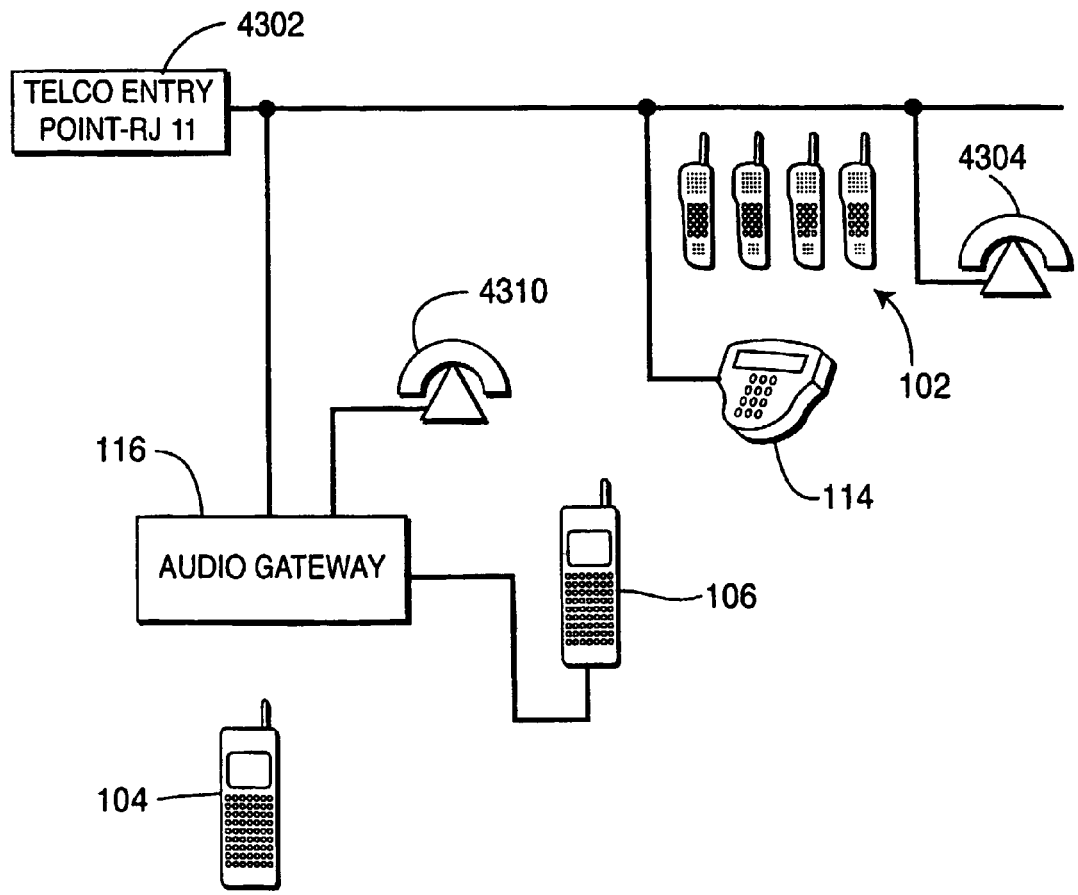
FIG. 43 is a diagram illustrating an exemplary network integration solution directed to a cell/Personal Communications System (PCS) phone and a Plain Old Telephone Service (POTS) phone, according to an illustrative embodiment of the present invention.

FIG. 43 is a diagram illustrating an exemplary network integration solution directed to a cell/PCS phone and a Plain Old Telephone Service (POTS) phone, according to an illustrative embodiment of the present invention.

An Audio Gateway 116, a cordless base station 114, and a POTS phone 4304 are connected to a Telco entry Point (RJ11) 4302. Another POTS phone 4310 and a hardwired cell/PCS phone 106 are connected to the Audio Gateway 116. A cell phone 104 is capable of wirelessly communicating with the Audio Gateway 116 and vice versa. Each of a plurality of cordless handsets 102 is capable of wirelessly communicating with the cordless base station 114 and vice versa. It is to be appreciated that the POTS phone 4304, the other POTS phone 4310, and the plurality of cordless handsets 102 (in conjunction with the cordless base station 114) are also collectively referred to hereinafter as POTS phone 4399.

The cell/PCS phone 104 is either hardwired or linked to the Access Point (Audio Gateway 116) by a BLUETOOTH connection. The Access Point has a SLIC 120 that can be switched between the regular POTS line and the cellular signal path towards the POTS phone 4399 to the Access Point. As noted above, the POTS phone 4399 can either be corded (e.g., 4304, 4310) or cordless (102 with 114). The connected POTS phone 4399 is always connected to the cellular circuit but has the ability to direct calls through the POTS line as well. For call initiation through the cellular network, the POTS phone 4399 sends a coded DTMF sequence that is understood by the Access Point that a call is being initiated. The DTMF decoder 2830 on the SLIC 120 decodes the dialed digits from the POTS phone 4399 and buffers and formats the dial number string with the appropriate AT commands. It is presumed that the necessary link and audio channel establishment procedures described above have already occurred. The link is then set up between the POTS phone 4399 and the cell phone 104.

In the case of the In-coming call, the details of the connection between the cell phone and the Access Point is described above. A "RING" signal is received from the cell phone 104, that is decoded in the Access Point, which in turn, issues the "RING" command to the SLIC 120. Whatever CLIP (Caller ID) information is received from the cell phone 104 is appropriately modulated between the ring signals (as per the existing POTS line norms), so that any generic POTS telephone 4399 (corded or cordless) with Caller ID decoding capability can decode this signal and display it. The POTS phone 4399 then picks up the call, when an appropriate AT command is issued from the Access Point to the cell phone 104 and the audio connection is established. Again, at the termination of the call, the Access Point senses the line voltage or waits for a DTMF command issued from the POTS phone 4399 to make a determination of the call status and appropriately advise the cell phone 104. In short, we are utilizing the off-line command modes in the cellular modem to accomplish this connection. It is possible by the usage of appropriate AT commands to exploit the full capability of the cellular modem. This scenario is not targeted at extending the scope of the architecture to remote POTS phone locations.

Figure 44:
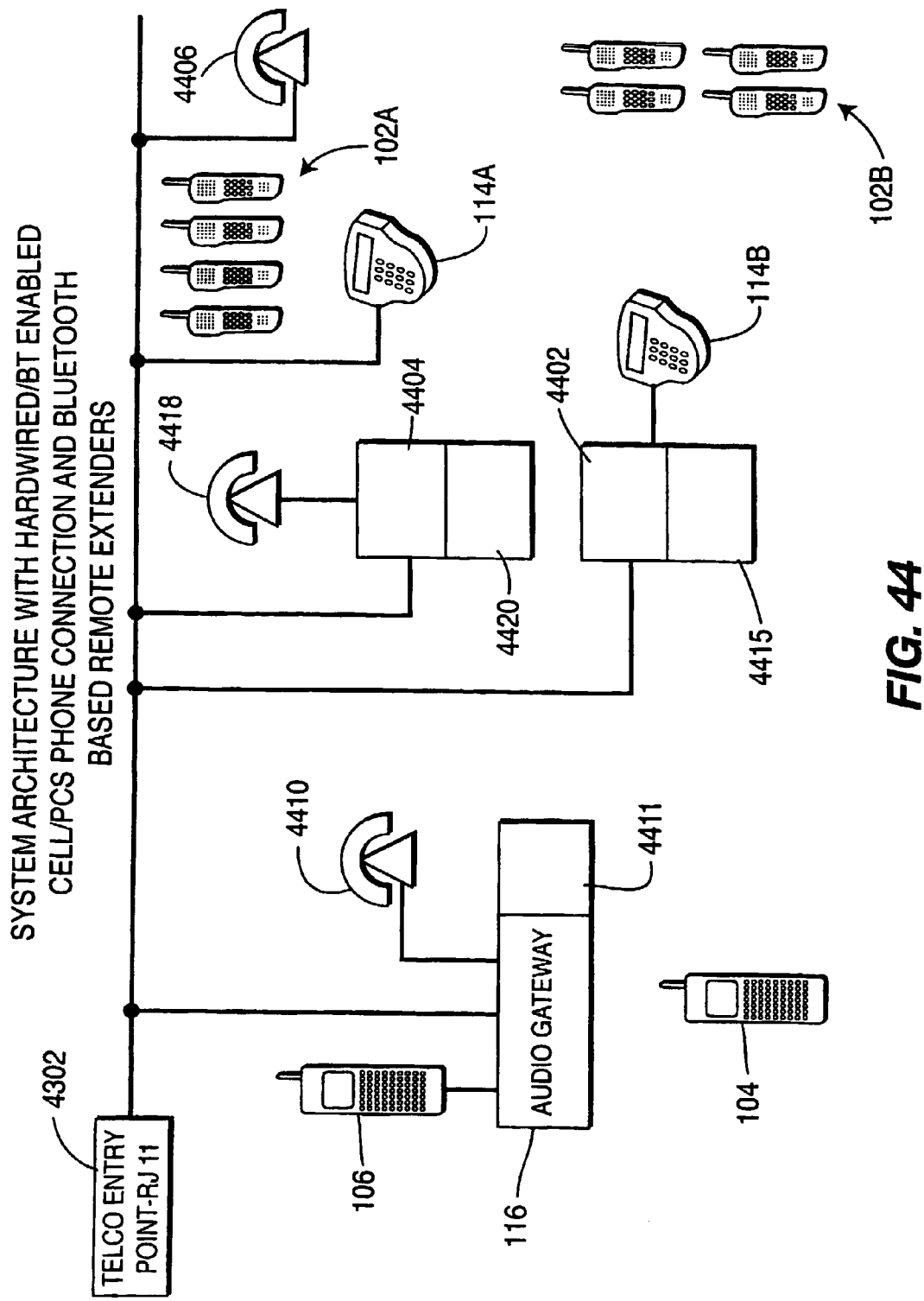
FIG. 44 is a diagram illustrating another exemplary network integration solution directed to a cell/Personal Communications System (PCS) phone and a Plain Old Telephone Service (POTS) phone, according to another illustrative embodiment of the present invention.

FIG. 44 is a diagram illustrating another exemplary network integration solution directed to a cell/PCS phone and a Plain Old Telephone Service (POTS) phone, according to another illustrative embodiment of the present invention. The diagram of FIG. 44 illustrates a system architecture with hardwired/BLUETOOTH enabled cell/PCS connection and BLUETOOTH-based remote extenders.

Figure 45:
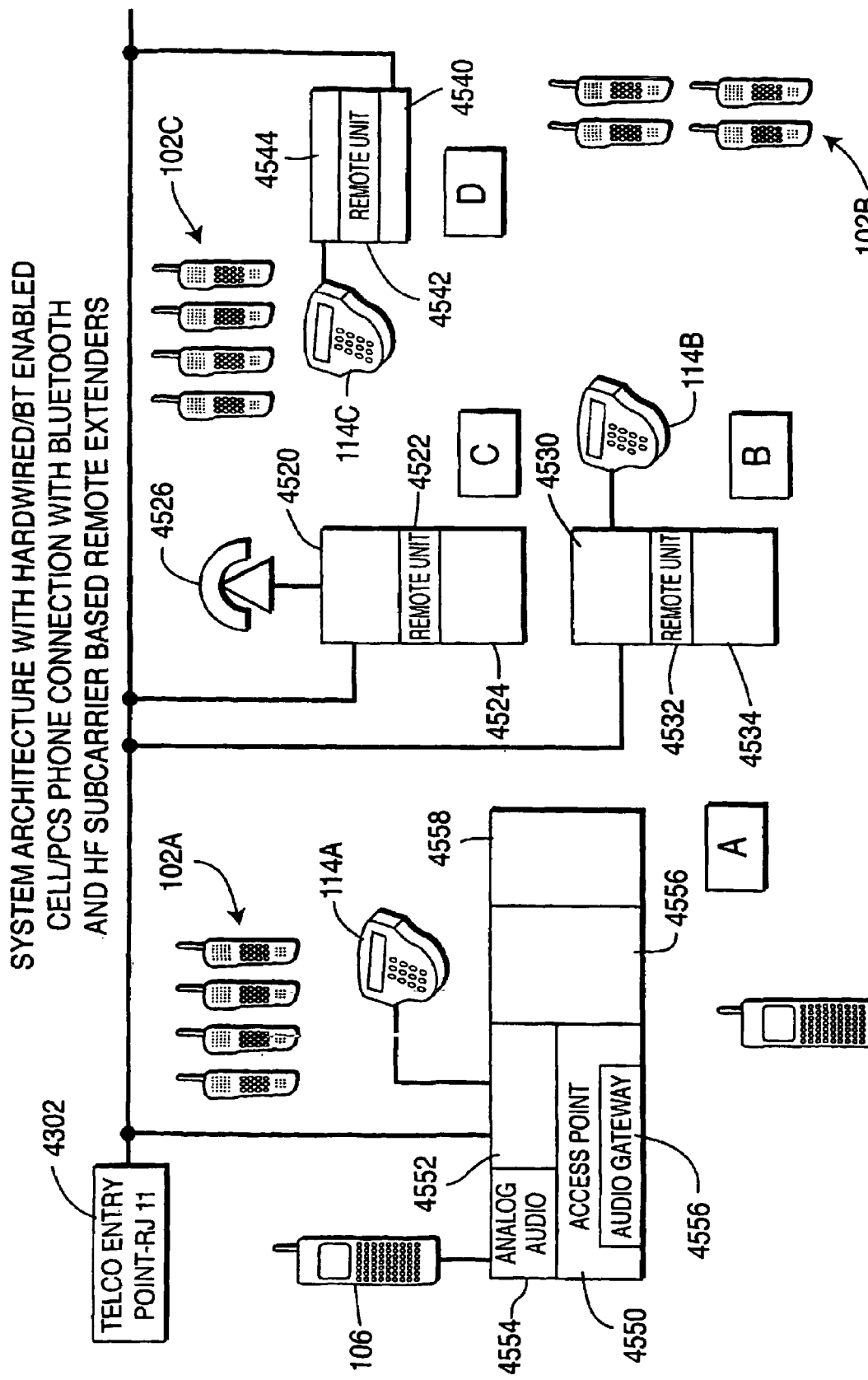
FIG. 45 is a diagram illustrating yet another exemplary network integration solution directed to a cell/Personal Communications System (PCS) phone and a Plain Old Telephone Service (POTS) phone, according to yet another illustrative embodiment of the present invention.

The system architecture shown in FIG. 44 extends the reach of the Access Point by providing remote extenders that allow signaling and communication between a remote POTS phone to either a POTS line or a cellular network, without violating any of the phone company and Federal Communications Commission (FCC) rules. There are many methods of providing this signaling extension between the Access Point and the remote POTS phones. Two methods illustrated in FIGS. 44 and 45 show the remote extensions provided by: (a) a BLUETOOTH based wireless connection; and (b) using a 400 KHz sub-carrier that carries both the bi-lateral audio as well as command and DTMF signals.

Referring to FIG. 44, an Audio Gateway 116, a first SLIC and POTS line switch 4402, a second SLIC and POTS line switch 4404, a first cordless base station 114A, and a first POTS phone 4406 are connected to a Telco entry Point (RJ11) 4302.

A second POTS phone 4410, a hardwired cell/PCS phone 106, and a BLUETOOTH cordless base station 4411 are connected to the Audio Gateway 116. A cell phone 104 is capable of wirelessly communicating with the Audio Gateway 116 and vice versa.

A second cordless base station 114B and a first BLUETOOTH cordless extension 4415 are connected to the first SLIC and POTS line switch 4402. A third POTS phone 4418 and a second BLUETOOTH cordless extension 4420 are connected to the second SLIC and POTS line switch 4404.

Each of a plurality of cordless handsets 102A is capable of wirelessly communicating with the first cordless base station 114A and vice versa. Each of another plurality of cordless handsets 102B is capable of wirelessly communicating with the second cordless base station 114B and vice versa.

The BLUETOOTH cordless base station 4411 is capable of wirelessly communicating with each of the BLUETOOTH cordless extensions 4420 and 4415, and vice versa.

FIG. 45 is a diagram illustrating yet another exemplary network integration solution directed to a cell/PCS phone and a Plain Old Telephone Service (POTS) phone, according to yet another illustrative embodiment of the present invention. The diagram of FIG. 45 illustrates a system architecture with hardwired/BLUETOOTH enabled cell/PCS connection with BLUETOOTH and High Frequency (HF)-based remote extenders.

Referring to FIG. 45, a first SLIC and POTS line switch 4520, a second SLIC and POTS line switch 4530, a first 400 KHz sub carrier module 4540, and third SLIC and POTS line switch 4552 included in an Access Point 4550 are connected to a Telco entry Point (RJ11) 4302.

The Access Point 4550 further includes an analog audio module 4554 and an Audio Gateway {BLUETOOTH} 4556. A cell phone 104 is capable of wirelessly communicating with the Audio Gateway 4556 and vice versa.

The Access Point 4510 is coupled to a second 400 KHz sub carrier module 4556 that is, in turn, coupled to a BLUETOOTH cordless base station 4558.

The third SLIC and POTS line switch 4552 included in an Access Point 4550 is further coupled to a first cordless base station 114A. Each of a plurality of cordless handsets 102A is capable of wirelessly communicating with the first cordless base station 114A and vice versa.

The analog audio module 4554 included in an Access Point 4550 is coupled to a hardwired cell/PCS phone 106.

The first SLIC and POTS line switch 4520 is coupled to a first remote unit 4522 which, in turn, is coupled to a first BLUETOOTH cordless extension 4524. The first SLIC and POTS line switch 4520 is also coupled to a first POTS phone 4526.

The second SLIC and POTS line switch 4530 is coupled to a second remote unit 4532 which, in turn, is coupled to a second BLUETOOTH cordless extension 4534. The second SLIC and POTS line switch 4530 is also coupled to a second cordless base station 114B. Each of a plurality of cordless handsets 102B is capable of wirelessly communicating with the second cordless base station 114B and vice versa.

The first 400 KHz sub carrier module 4540 is coupled to a third remote unit 4542 which, in turn, is coupled to a fourth SLIC and POTS line switch 4544. The fourth SLIC and POTS line switch 4544 is further coupled to a third cordless base station 114C. Each of a plurality of cordless handsets 102C is capable of wirelessly communicating with the third cordless base station 114C and vice versa.

The BLUETOOTH cordless base station 4558 is capable of wirelessly communicating with each of the BLUETOOTH cordless extensions 4524 and 4534, and vice versa.

Figure 46:
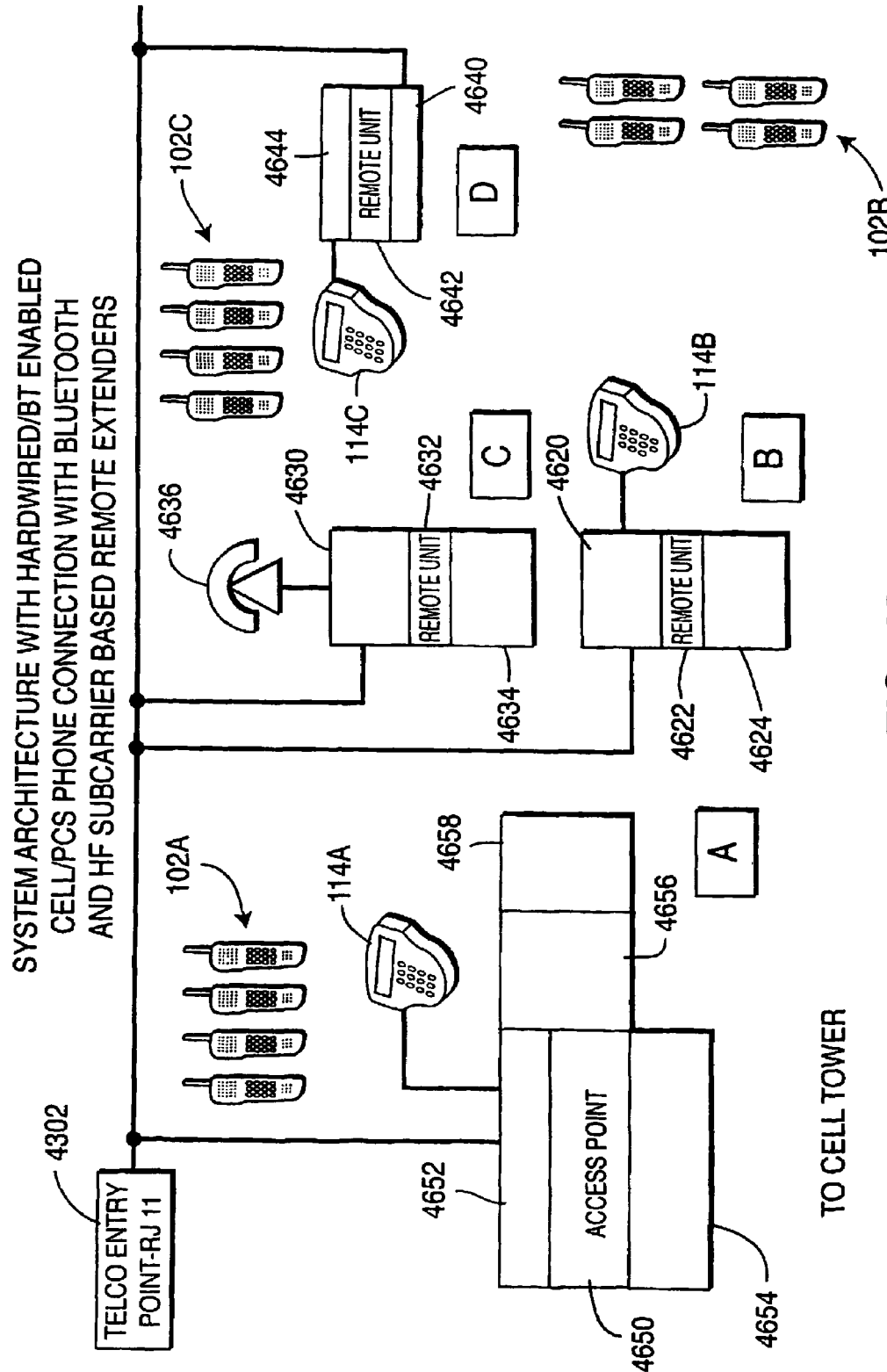
FIG. 46 is a diagram illustrating still yet another exemplary network integration solution directed to a cell/Personal Communications System (PCS) phone and a Plain Old Telephone Service (POTS) phone, according to still yet another illustrative embodiment of the present invention.

FIG. 46 is a diagram illustrating still yet another exemplary network integration solution directed to a cell/PCS phone and a Plain Old Telephone Service (POTS) phone, according to still yet another illustrative embodiment of the present invention.

In FIG. 46, instead of having a BLUETOOTH connection between the cell phone 104 and the Access Point 4650, a cell phone 104 is included in the Access Point 4650. This cell phone 104 could be either specific to a cellular/PCS standard or could be a multi-band multi-system implementation, allowing an seamless integration opportunity. The system architecture of FIG. 46 presumes the following:

(a) It is possible to swap a SIM card from the mobile unit to the Access Point and allow the mobile to be switched off.
(b) It is possible to dynamically transfer the SIM details from the mobile to the Access Point either over the air or through wired connection on the Access Point.
(c) It is possible for the Mobile SIM to be cloned on the Cell phone on the Access Point.
(d) It is possible to re-route all calls in and out of the mobile to the Cell phone embedded in the Access Point. The embedded cell phone may or may not have the same number as the mobile.
(e) The Cellular Service provider has a scheme that allows number sharing between mobile phone and the residential embedded phone.
(f) Any other scheme that a cellular service provider can come up with that will allow either the mobile or the embedded cell phone to receive a cellular to be transparent to the Access Point in terms of the ability to command, control and route the audio through the Access Point.

If any one of the above points is true, then it is possible to control the off-line modem in the cell phone 104 and control the call parameters, bi-laterally, and also route the audio to the Access Point 4650. The application layer AT commands for cell phone—Access Point inter communication are issued by the Host control Processor 124, allowing the Access Point 4650 to utilize all the features supported by the cell phone 104. The routing of the audio signals and the communication protocols and methodology are identical to the earlier cases.

Referring to FIG. 46, a first SLIC and POTS line switch 4620, a second SLIC and POTS line switch 4630, a first 400 KHz sub carrier module 4640, and third SLIC and POTS line switch 4652 included in an Access Point 4650 are connected to a Telco entry Point (RJ11) 4302.

The Access Point 4650 further includes an embedded cell phone/docking station 4654. A embedded cell phone/docking station 4654 is capable of wirelessly communicating with a cell tower (not shown).

The Access Point 4610 is coupled to a second 400 KHz sub carrier module 4656 that is, in turn, coupled to a BLUETOOTH cordless base station 4658.

The third SLIC and POTS line switch 4652 included in an Access Point 4650 is further coupled to a first cordless base station 114A. Each of a plurality of cordless handsets 102A is capable of wirelessly communicating with the first cordless base station 114A and vice versa.

The first SLIC and POTS line switch 4620 is coupled to a first remote unit 4622 which, in turn, is coupled to a first BLUETOOTH cordless extension 4624. The first SLIC and POTS line switch 4620 is also coupled to a second cordless base station 114B. Each of a plurality of cordless handsets 102B is capable of wirelessly communicating with the second cordless base station 114B and vice versa.

The second SLIC and POTS line switch 4530 is coupled to a second remote unit 4632 which, in turn, is coupled to a second BLUETOOTH cordless extension 4634. The second SLIC and POTS line switch 4630 is also coupled to a first POTS phone 4636.

The first 400 KHz sub carrier module 4640 is coupled to a third remote unit 4642 which, in turn, is coupled to a fourth SLIC and POTS line switch 4644. The fourth SLIC and POTS line switch 4644 is further coupled to a third cordless base station 114C. Each of a plurality of cordless handsets 102C is capable of wirelessly communicating with the third cordless base station 114C and vice versa.

The BLUETOOTH cordless base station 4658 is capable of wirelessly communicating with each of the BLUETOOTH cordless extensions 4624 and 4634, and vice versa.

It is to be appreciated that in the FIGS., e.g., FIGS. 44-46, a first element coupled to a second element may be separate from or part of the second element. Of course, other variations are possible and readily contemplated by one of ordinary skill in the related art, while maintaining the spirit of the present invention.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A system for integrating at least one residential Plain Old Telephone System (POTS) phone to a cellular phone network, comprising:
   a Subscriber Line Interface Circuit (SLIC) for interfacing audio from the cellular phone network to the at least one residential POTS phone;
   a line switcher, directly connected to said SLIC, for connecting the at least one residential POTS phone to any one of a POTS line or a cellular line; and
   an audio gateway, directly connected to said SLIC, for wirelessly receiving the audio from a cellular phone connected to the cellular phone network for subsequent transmission to the at least one residential POTS phone and for wirelessly transmitting the audio from the POTS line to the cellular phone, the audio gateway configured to employ a profile to provide at least one of telephone signaling and telephone functions associated with and available through the cellular phone to the at least one residential POTS phone,
   wherein the line switcher, the SLIC and the audio gateway are located at a same location as the at least one residential POTS phone.

2. The system of claim 1, wherein said SLIC comprises a Dual Tone Multi Frequency (DTMF) decoder for decoding a dialed number string initially input to the residential POTS phone, and for formatting the dialed number string for use by the cellular phone network.

3. The system of claim 2, wherein the cellular phone includes a modem, and said SLIC formats the dialed number string into ATtention (AT) commands for use by the modem included in the cellular phone.

4. The system of claim 3, wherein the cellular phone includes a modem, and said audio gateway includes an AT command translator.

5. The system of claim 1, wherein the cellular phone includes a modem, and said audio gateway includes an ATtention command translator for receiving AT commands from said SLIC and translating the AT commands into a format compatible with the modem included in the cellular phone.

6. The system of claim 1, wherein said SLIC comprises a caller ID module for receiving caller ID information from the cellular phone network and for outputting the caller ID information for use by the residential POTS phone.

7. The system of claim 1, wherein said SLIC receives Pulse Code Modulation (PCM) signals from the cellular phone network for conversion to analog signals for subsequent receipt by the residential POTS phone, and receives the analog signals from the POTS line for conversion to the PCM signals for subsequent receipt by the cellular phone.

8. The system of claim 1, wherein the at least one residential POTS phone includes a remote residential POTS phone, and said system further comprises at least one remote extender for allowing communications between the remote residential POTS phone and any one of the POTS line and the cellular line.

9. The system of claim 1, wherein said audio gateway comprises an embedded cellular phone and docking station, for allowing communications between the cellular phone and the embedded cellular phone.

10. The system of claim 1, wherein said SLIC is connected to a Telephone Access Point (TAP).

11. The system of claim 1, wherein said audio gateway is capable of communicating with the cellular phone via any one of a hard wired cable, an embedded BLUETOOTH module, an external BLUETOOTH dongle, and an InfraRed (IR) module.

12. The system of claim 1, wherein the cellular phone includes a modem, and said audio gateway issues ATtention (A) commands directed to the modem included in the cellular phone for enabling the cellular phone to receive a phone call dialed to a number of the residential POTS phone.

13. The system of claim 1, further comprising a USB interface for connecting the cellular phone to said SLIC.

14. The system of claim 1, further comprising an RS-232/Analog Audio Interface for connecting the cellular phone to said SLIC.

15. The system of claim 1, wherein the at least one residential POTS phone comprises at least one cordless phone.

16. The system of claim 15, wherein the at least residential POTS phone further comprises at least one corded phone.

17. The system of claim 1, wherein the audio gateway is capable of sensing line voltages and Dual Tone Multi Frequency commands for determining call status, and providing an indication of the call status to the cellular phone using ATtention (AT) commands.

18. The system of claim 1, wherein the telephone functions associated with and available through the cellular phone comprise instant messaging.

* * * * *